(12) United States Patent
Kim et al.

(10) Patent No.: US 12,461,572 B2
(45) Date of Patent: Nov. 4, 2025

(54) DISPLAY APPARATUS

(71) Applicant: LG DISPLAY CO., LTD., Seoul (KR)

(72) Inventors: JaeHo Kim, Paju-si (KR); SeokHyo Cho, Paju-si (KR); Homin Lee, Paju-si (KR)

(73) Assignee: LG Display Co., Ltd (KR)

( * ) Notice: Subject to any disclaimer, the term of this patent is extended or adjusted under 35 U.S.C. 154(b) by 0 days.

(21) Appl. No.: 18/668,447

(22) Filed: May 20, 2024

(65) Prior Publication Data

US 2024/0302873 A1    Sep. 12, 2024

Related U.S. Application Data

(63) Continuation of application No. 18/088,526, filed on Dec. 24, 2022, now Pat. No. 12,026,022, which is a
(Continued)

(30) Foreign Application Priority Data

Jul. 14, 2020  (KR) ......................... 10-2020-0086902

(51) Int. Cl.
*G06F 1/18* (2006.01)
*F16M 11/20* (2006.01)
(Continued)

(52) U.S. Cl.
CPC ............ *G06F 1/181* (2013.01); *G06F 1/1605* (2013.01); *G09F 9/301* (2013.01); *G10K 9/122* (2013.01);
(Continued)

(58) Field of Classification Search
CPC combination set(s) only.
See application file for complete search history.

(56) References Cited

U.S. PATENT DOCUMENTS 9,081,540 B1 *  7/2015  Cho ...................... G06F 1/1601
9,320,138 B2 *  4/2016  Lee ........................ H10K 50/84
(Continued)

FOREIGN PATENT DOCUMENTS

CN         206993387 U       2/2018
CN         108986712 A      12/2018
(Continued)

OTHER PUBLICATIONS

European Search Report dated Dec. 16, 2021 issued in counterpart Patent Application No. 21 18 5375 (9 pages).
(Continued)

*Primary Examiner* — Lisa Lea-Edmonds
(74) *Attorney, Agent, or Firm* — Fish & Richardson P.C.

(57) ABSTRACT

A display apparatus comprises a display device including a display panel and a back cover on a rear surface of the display panel, and a curvature variation device at the back cover to vary a curvature of the display device, the curvature variation device may include an arc member at a rear region of the display device parallel to a first direction, a supporting plate at the rear region of the display device, a rotation driver on the supporting plate, a rectilinear driver on the supporting plate to perform a rectilinear motion, a rotation link part coupled to a center portion of the arc member on the supporting plate to rotate the center portion of the arc member based on a rectilinear motion of the rectilinear driver, and a holder part rotatably supporting the center portion of the arc member on the supporting plate.

18 Claims, 17 Drawing Sheets

Related U.S. Application Data continuation of application No. 17/375,866, filed on Jul. 14, 2021, now Pat. No. 11,567,546.

(51) Int. Cl.
| | |
|---|---|
| *F16M 11/28* | (2006.01) |
| *G06F 1/16* | (2006.01) |
| *G09F 9/30* | (2006.01) |
| *G10K 9/122* | (2006.01) |

(52) U.S. Cl.
CPC .......... *F16M 11/2021* (2013.01); *F16M 11/28* (2013.01)

(56) References Cited

U.S. PATENT DOCUMENTS

| | | | |
|---|---|---|---|
| 9,541,952 B2* | 1/2017 | Kang | H05K 5/02 |
| 9,560,761 B2* | 1/2017 | Kishida | H05K 1/147 |
| 9,727,080 B2* | 8/2017 | Jung | H05K 5/0217 |
| 9,826,654 B2* | 11/2017 | Fujii | G09F 15/0012 |
| 9,839,145 B2* | 12/2017 | Ryu | H05K 5/03 |
| 9,854,693 B2* | 12/2017 | Seo | A47B 81/06 |
| 9,978,293 B2* | 5/2018 | Cho | G06F 1/16 |
| 9,980,399 B2* | 5/2018 | Cho | H05K 5/0017 |
| 10,004,151 B2* | 6/2018 | Jung | H05K 5/0017 |
| 10,025,347 B2* | 7/2018 | Song | G06F 1/1652 |
| 10,495,908 B2* | 12/2019 | Li | H04N 5/64 |
| 10,514,564 B2* | 12/2019 | Kawasaki | H04N 5/642 |
| 10,753,528 B2* | 8/2020 | Wu | F16M 11/22 |
| 10,845,631 B2* | 11/2020 | Kim | G02F 1/133308 |
| 10,917,985 B1* | 2/2021 | Lee | H05K 5/0017 |
| 11,226,654 B2* | 1/2022 | De Saulles | H10K 77/111 |
| 11,229,127 B2* | 1/2022 | Hwang | G06F 1/1652 |
| 11,297,439 B2* | 4/2022 | Shin | H04R 17/00 |
| 11,347,267 B2* | 5/2022 | Wolff | G06F 1/1652 |
| 11,416,034 B2* | 8/2022 | Yoo | G09F 9/301 |
| 11,567,546 B2* | 1/2023 | Kim | G09F 9/301 |
| 11,630,635 B2* | 4/2023 | Cho | G02F 1/133305 381/152 |
| 11,907,608 B2* | 2/2024 | Cho | H04R 7/04 |
| 11,924,609 B2* | 3/2024 | Kim | H04R 7/045 |
| 12,026,022 B2* | 7/2024 | Kim | G06F 1/1605 |
| 2013/0329162 A1* | 12/2013 | Fujii | G02F 1/133385 361/679.01 |
| 2014/0226266 A1* | 8/2014 | Kang | H05K 5/02 361/679.01 |
| 2014/0240906 A1* | 8/2014 | Seo | G06F 1/1652 361/679.01 |
| 2014/0354519 A1* | 12/2014 | Lee | G09F 9/301 345/76 |
| 2015/0029166 A1* | 1/2015 | Park | G06F 1/1641 345/184 |
| 2015/0130775 A1* | 5/2015 | Kim | G09G 3/035 345/82 |
| 2015/0145837 A1* | 5/2015 | Park | H04N 21/41265 345/184 |
| 2015/0185761 A1* | 7/2015 | Song | H04N 5/64 361/679.21 |
| 2015/0192952 A1 | 7/2015 | Jung et al. | |
| 2016/0050772 A1* | 2/2016 | Park | F16M 13/02 361/679.01 |
| 2016/0088743 A1* | 3/2016 | Zhang | G06F 1/1652 361/679.01 |
| 2016/0295711 A1* | 10/2016 | Ryu | H10K 59/87 |
| 2016/0353594 A1* | 12/2016 | Cho | F16M 11/08 |
| 2017/0188470 A1* | 6/2017 | Cho | G09F 9/301 |
| 2017/0193863 A1* | 7/2017 | Cho | G06F 1/16 |
| 2017/0295655 A1* | 10/2017 | Jung | G06F 1/20 |
| 2018/0033344 A1* | 2/2018 | Chen | G06F 1/1652 |
| 2020/0068311 A1* | 2/2020 | Kang | H04R 7/045 |
| 2020/0209973 A1 | 7/2020 | Kim et al. | |
| 2020/0323087 A1* | 10/2020 | Hwang | H05K 5/0247 |
| 2020/0409418 A1* | 12/2020 | Yoo | G09F 9/301 |
| 2021/0141587 A1* | 5/2021 | Cho | G02F 1/133305 |
| 2021/0181797 A1* | 6/2021 | Wolff | G06F 1/1601 |
| 2021/0191465 A1* | 6/2021 | De Saulles | G06F 1/1641 |
| 2022/0019271 A1* | 1/2022 | Kim | G10K 9/122 |
| 2022/0182766 A1* | 6/2022 | Shin | H10N 30/092 |
| 2022/0369024 A1* | 11/2022 | Lee | H04R 1/028 |
| 2023/0128581 A1* | 4/2023 | Kim | G06F 1/1605 361/679.02 |
| 2023/0195406 A1* | 6/2023 | Cho | G09F 9/301 381/152 |
| 2024/0098403 A1* | 3/2024 | Lee | H04R 17/00 |
| 2024/0155286 A1* | 5/2024 | Rhim | H04R 9/043 |
| 2024/0302873 A1* | 9/2024 | Kim | G10K 9/122 |
| 2024/0381021 A1* | 11/2024 | Lee | H04R 1/26 |

FOREIGN PATENT DOCUMENTS

| | | |
|---|---|---|
| CN | 112785923 A | 5/2021 |
| JP | 2015-210521 A | 11/2015 |
| JP | 2018-093469 A | 6/2018 |
| JP | 2018-110369 A | 7/2018 |
| KR | 20150133918 A | 12/2015 |

OTHER PUBLICATIONS

Chinese Office Action dated Mar. 7, 2024 issued in Patent Application No. 202110796796.6 (10 pages).
Japanese Office Action dated May 1, 2024 issued in Patent Application No. 2023-108493 (3 pages).
Office Action in Korean Appln. No. 10-2020-0086902, mailed on Jul. 15, 2025, 16 pages (with English translation).

* cited by examiner

DISPLAY APPARATUS

CROSS-REFERENCE TO RELATED APPLICATIONS

This application is a continuation of U.S. patent application Ser. No. 18/088,526, filed on Dec. 24, 2022, which is a continuation of U.S. patent application Ser. No. 17/375,866, filed on Jul. 14, 2021, now U.S. Pat. No. 11,567,546, issued on Jan. 31, 2023, which claims the priority of Korean Patent Application No. 10-2020-0086902 filed on Jul. 14, 2020, which are hereby incorporated by reference in their entirety.

BACKGROUND

Field of the Disclosure

The present disclosure relates to a display apparatus, and more particularly, to a curved display apparatus.

Description of the Background

With the advancement of information-oriented society, various requirements for display apparatuses for displaying an image are increasing. Recently, as a display screen of each display apparatus is enlarged with a flat type, there is a problem where a deviation between a viewing distance to a screen center region and a viewing distance to each of both side regions of the screen increases.

To decrease a viewing distance deviation and maximize the immersion of a user watching an image, a curved display apparatus where a flat display panel is curved at a certain curvature has been proposed. In a display apparatus of the related art, since a display panel maintains a state which is curved at a certain curvature, a curvature of the display panel may not vary (or change) based on a selection (or preference) of a user (or a viewer).

Moreover, in a curved display apparatus of the related art, since a sound output from a sound device for outputting a sound associated with an image travels in a forward direction or a downward direction with respect to a display panel, sound quality may be degraded due to interference between sounds reflected by walls or the ground, and due to this, it may be difficult to accurately transfer a sound and the immersion of a viewer may be reduced.

Therefore, in the curved display apparatus of the related art, the immersion of a user watching an image may be maximized through a screen which is curved at a certain curvature but it may be difficult to accurately transfer a sound, causing a reduction in acoustic immersion of the user.

SUMMARY

The inventors of the present disclosure has recognized problems of a curved display apparatus of the prior art and has performed various experiments on a display apparatus, which may vary (or change) a curvature of a display panel (or a display device), and a display apparatus which may vary a curvature of a display panel and may output a sound in a forward direction with respect to the display panel to maximize the immersion of a user (or a viewer) watching an image. Through the various experiments, the inventor has invented a display apparatus having a new structure, which may vary a curvature of a display panel, and a display apparatus having a new structure, which may maximize the immersion of a user watching an image.

Accordingly, the present disclosure is directed to providing a display apparatus that substantially obviates one or more problems due to limitations and disadvantages of the related art.

Some aspect of the present disclosure is directed to providing a display apparatus which may maintain a display panel as a flat type or may vary various curvatures of the display panel.

Some aspect of the present disclosure is directed to providing a display apparatus which may maximize the immersion of a user (or a viewer) watching an image.

Additional advantages and features of the disclosure will be set forth in part in the description which follows and in part will become apparent to those having ordinary skill in the art upon examination of the following or may be learned from practice of the disclosure. The features and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus including a display device including a display panel configured to display an image and a back cover disposed at a rear surface of the display panel, and a curvature variation device disposed at the back cover to vary a curvature of the display device. The curvature variation device comprises an arc member disposed at a rear region of the display device parallel to a first direction, a supporting plate disposed at the rear region of the display device, a rotation driver disposed at the supporting plate, a rectilinear driver disposed on the supporting plate to perform a rectilinear motion in a second direction intersecting with the first direction based on a rotation of the rotation driver, a rotation link part coupled to a center portion of the arc member on the supporting plate to perform a rotational motion based on a rectilinear motion of the rectilinear driver to rotate the center portion of the arc member, and a holder part rotatably supporting the center portion of the arc member on the supporting plate.

In another aspect of the present disclosure, there is provided a display apparatus including a display device, and a curvature variation device disposed on a rear surface of the display device to vary a curvature of the display device. The display device comprises a display panel configured to display an image, a back cover disposed on the rear surface of the display panel to support the curvature variation device, and a groove portion formed to be concave from the back cover overlapping the curvature variation device and to accommodate the curvature variation device.

The display apparatus according to the present disclosure may maintain a display panel as a flat type or may vary (or change) a curvature of the display panel.

The display apparatus according to the present disclosure may maintain a display panel as a flat type or may vary (or change) a curvature of the display panel, based on a selection (or preference) of a user (or a viewer).

Moreover, the display apparatus according to the present disclosure may vary a curvature of a display panel and may output a sound in a forward direction of the display panel, thereby simultaneously maximizing the immersion of a user (or a viewer) watching an image.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure. It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain principles of the disclosure.

In the drawings.

DETAILED DESCRIPTION

Figure 1:
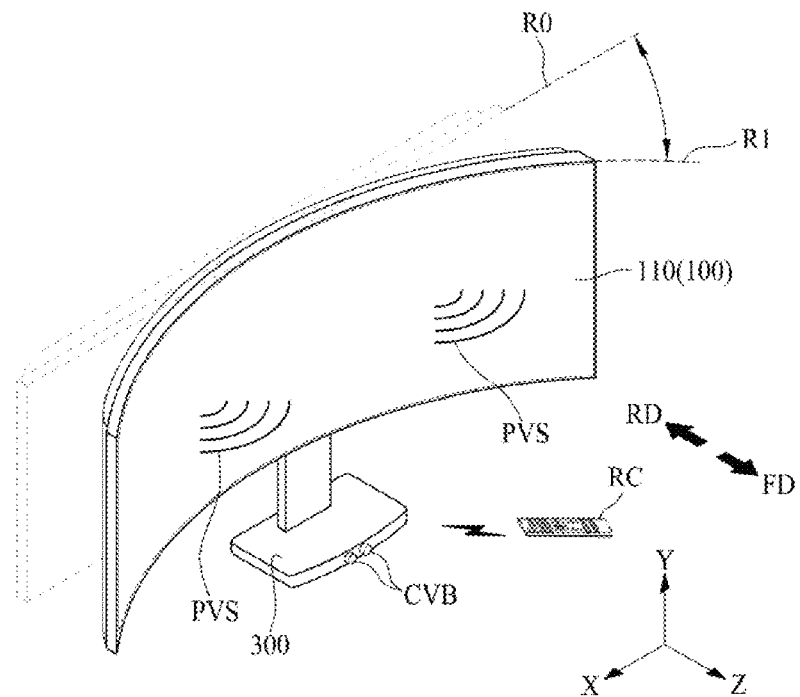
FIG. 1 is a front perspective view illustrating a display apparatus according to an aspect of the present disclosure.

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following aspects described with reference to the accompanying drawings. The present disclosure may, however, be embodied in different forms and should not be construed as limited to other aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, aspects of the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element or layer is "connected," "coupled," or "adhered" to another element or layer means that the element or layer may not only be directly connected, coupled or adhered to another element or layer, but also be indirectly connected, coupled or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

In the description of aspects, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and aspects of the present disclosure are not limited thereto, unless otherwise specified.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other, or may be carried out together in co-dependent relationship.

Hereinafter, a display apparatus according to aspects of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

Figure 2:
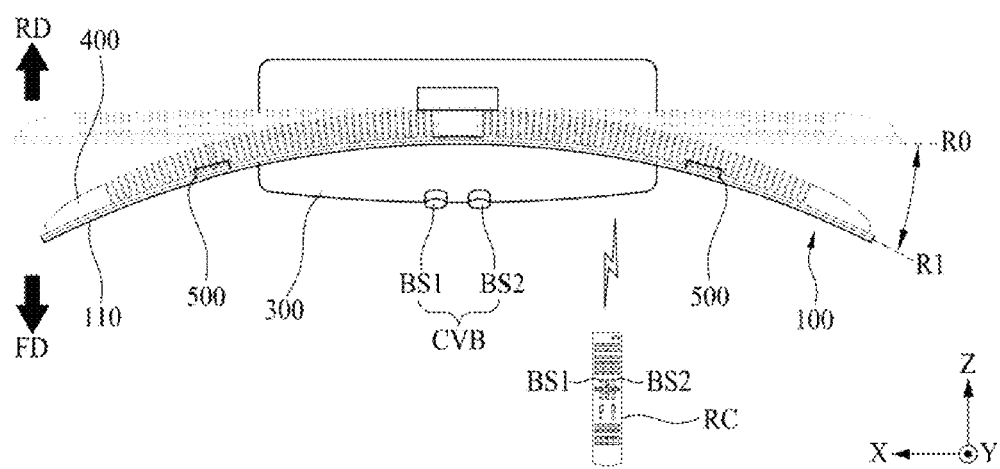
FIG. 2 is a plan view illustrating a display apparatus according to an aspect of the present disclosure.
Figure 3:
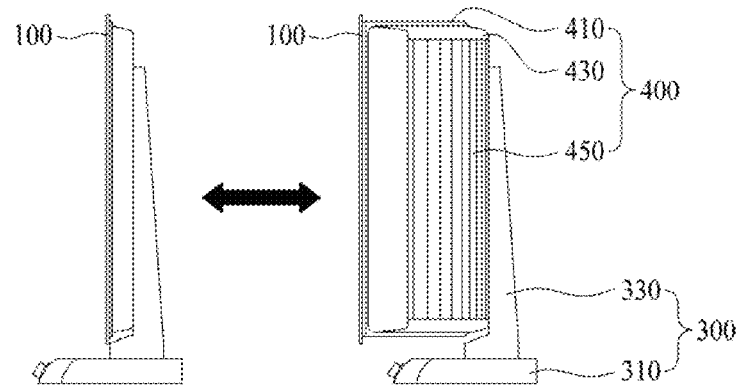
FIG. 3 is a side view illustrating a flat shape and a curved shape of a display apparatus according to an aspect of the present disclosure.

FIG. 1 is a front perspective view illustrating a display apparatus according to an aspect of the present disclosure, FIG. 2 is a plan view illustrating a display apparatus according to an aspect of the present disclosure, and FIG. 3 is a side view illustrating a flat shape and a curved shape of a display apparatus according to an aspect of the present disclosure.

With reference to FIGS. 1 to 3, the display apparatus according to an aspect of the present disclosure may include a display device (or a display unit) 100 implemented to display an image and a curvature variation device which varies the display device 100 to a flat shape (or a flat mode) or a curved shape (or a curved mode) in response to a selection (or manipulation) of a user.

The display device 100 may be mounted on a stand 300 or a wall-mounted bracket in an upright state. For example, the stand 300 or the wall-mounted bracket may be connected (or coupled) to a curvature variation device or a rear surface of the display device 100. Additionally, the display device 100 may be tilted in a forward-rearward direction or may move in an upward-downward direction, with being mounted on the stand 300 or the wall-mounted bracket.

The display device 100 according to an aspect may vary to a flat shape or a curved shape according to driving of the curvature variation device based on manipulation of a user performed through a curvature variation button part CVB disposed in the stand 300. For example, when the display device 100 has a flat shape which has a curvature (or a first curvature) R0 of 0 (zero), the curvature variation device may vary the display device 100 to a curved shape which has a curvature (or a second curvature) R1 greater than 0 (zero), in response to manipulation of the user performed through a first button switch BS1 of the curvature variation button part CVB. For example, the curvature variation device may gradually vary various curvatures of the display device 100 based on a manipulation time (or a push duration time) of the first button switch BS1, or may curve (or vary) the display device 100 at a predetermined curvature R1 based on one-time manipulation (or one-time push) of the first button switch BS1. On the other hand, when the display device 100 has a curved shape which has the curvature R1 greater than 0 (zero), the curvature variation device may vary or restore the display device 100 to a flat shape which has the curvature R0 of 0 (zero), in response to manipulation of the user performed through a second button switch BS2 of the curvature variation button part CVB.

According to another aspect, the display device 100 may vary to a flat shape or a curved shape according to driving of the curvature variation device based on manipulation of the user performed through a remote controller RC which supports a close-distance wireless interface. For example, when the display device 100 has a flat shape which has the curvature R0 of 0 (zero), the curvature variation device may gradually vary the curvature of the display device 100 based on a manipulation time (or a push duration time) of the user performed through a first button BS1 of the remote controller RC, or may curve (or vary) the display device 100 at the predetermined curvature R1 based on one-time manipulation (or one-time push) of the first button BS1. On the other hand, when the display device 100 has a curved shape which has the curvature R1 greater than 0 (zero), the curvature variation device may vary or restore the display device 100 to a flat shape which has the curvature R0 of 0 (zero), in response to manipulation of the user performed through a second button BS2 of the remote controller RC.

In display apparatus according to an aspect of the present disclosure, when the display device 100 displays an image or does not display an image, the display device 100 may perform a function of a vibration plate which outputs a sound PVS in a forward direction FD with respect to the display apparatus. To this end, the display apparatus according to an aspect of the present disclosure may further include a vibration device 500 which is disposed on the rear surface of the display device 100.

The vibration device (or a vibration unit) 500 may be implemented so that, by using the display device 100 as a vibration plate, the sound PVS generated based on a vibration of the display device 100 is output in the forward direction FD with respect to the display apparatus. For example, the vibration device 500 may vibrate a display panel 110 of the display device 100 in response to a sound signal (or a voice signal), thereby generating the sound PVS (or a panel vibration sound) based on a vibration (or a panel vibration) of the display panel 110. For example, the vibration device 500 may directly vibrate the display panel 110. For example, the vibration device 500 may be referred to as a vibration unit, a vibration device, a vibration generating apparatus, a vibration generating device, a sound apparatus, a sound device, a sound generating apparatus, a sound generating device, an actuator, an exciter, or a transducer, but aspects of the present disclosure are not limited thereto.

The vibration device 500 according to an aspect may be disposed in each of a first vibration region (or a first region) and a second vibration region (or a second region) of the display device 100. The display device 100 may output a first sound (or a left sound) and a second sound (or a right sound), respectively generated based on vibrations of the first vibration region and the second vibration region, in the forward direction FD to realize a stereo sound. For example, the vibration device 500 may directly vibrate the first vibration region and the second vibration region of the display panel 110.

The display apparatus according to an aspect of the present disclosure may further include a rear curtain device 400 which is implemented on the rear surface of the display device 100 to cover the curvature variation device.

The rear curtain device 400 may be deformed to correspond to a curvature variation of the display device 100 based on driving of the curvature variation device, thereby preventing a mechanism (or structure) disposed on the rear surface of the display device 100 from being exposed at the outside of a side surface thereof. The rear curtain device 400 will be described below.

The display apparatus according to an aspect of the present disclosure may provide the display device 100 (or a display screen) which may vary in a flat shape or a curved shape based on a selection (or preference) of a user (or a viewer) watching an image, thereby maximizing the immersion of the viewer through the display device 100 (or the display screen) which is curved in a curved shape. Also, the display apparatus according to an aspect of the present disclosure may output a sound in the forward direction FD (a direction toward a face of the viewer) with respect to the display device 100 based on a vibration of the display device 100, and thus, may provide the viewer with the sound PVS having accurate and improved sound quality without loss or distortion, thereby providing a display apparatus for increasing the acoustic immersion of a viewer. Also, the display apparatus according to an aspect of the present disclosure may output a sound in the forward direction FD (the direction toward the face of the viewer) with respect to the display device 100 based on a vibration of the display device 100 (or the display screen) which is curved in a curved shape, and thus, may prevent or minimize a sense of difference (or mismatch) caused by a distance difference between an image and a sound and may provide the viewer with the sound PVS having accurate and improved sound quality without loss or distortion, thereby maximizing the immersion of a user (or a viewer) watching an image.

Figure 4:
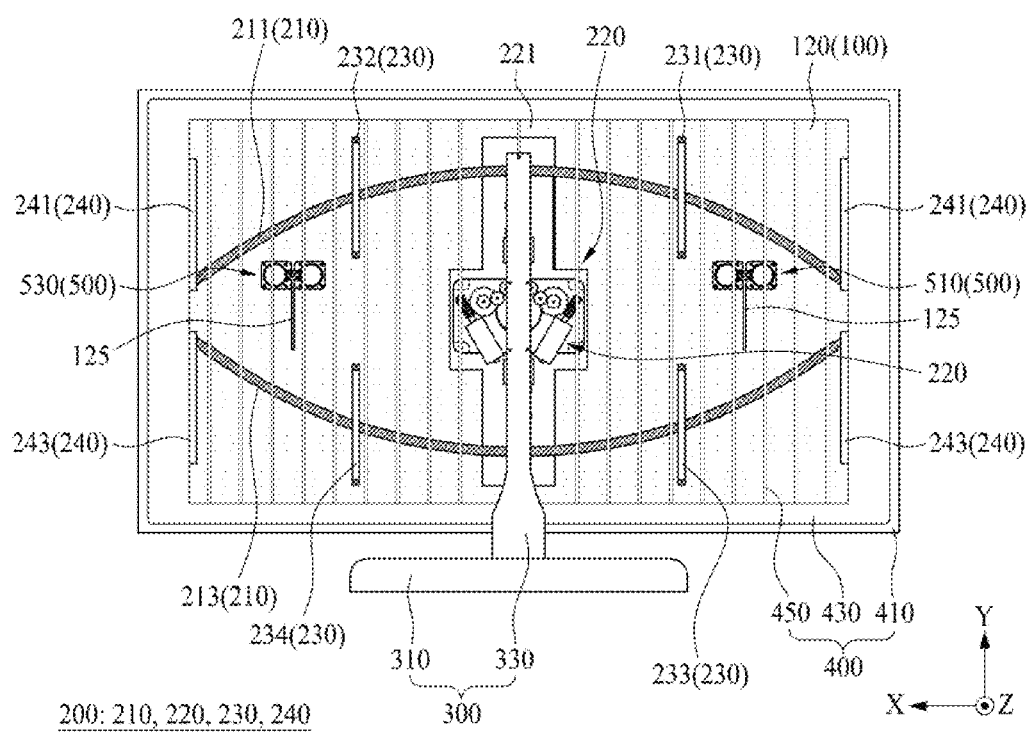
FIG. 4 is a rear view of a display apparatus according to an aspect of the present disclosure.
Figure 5:
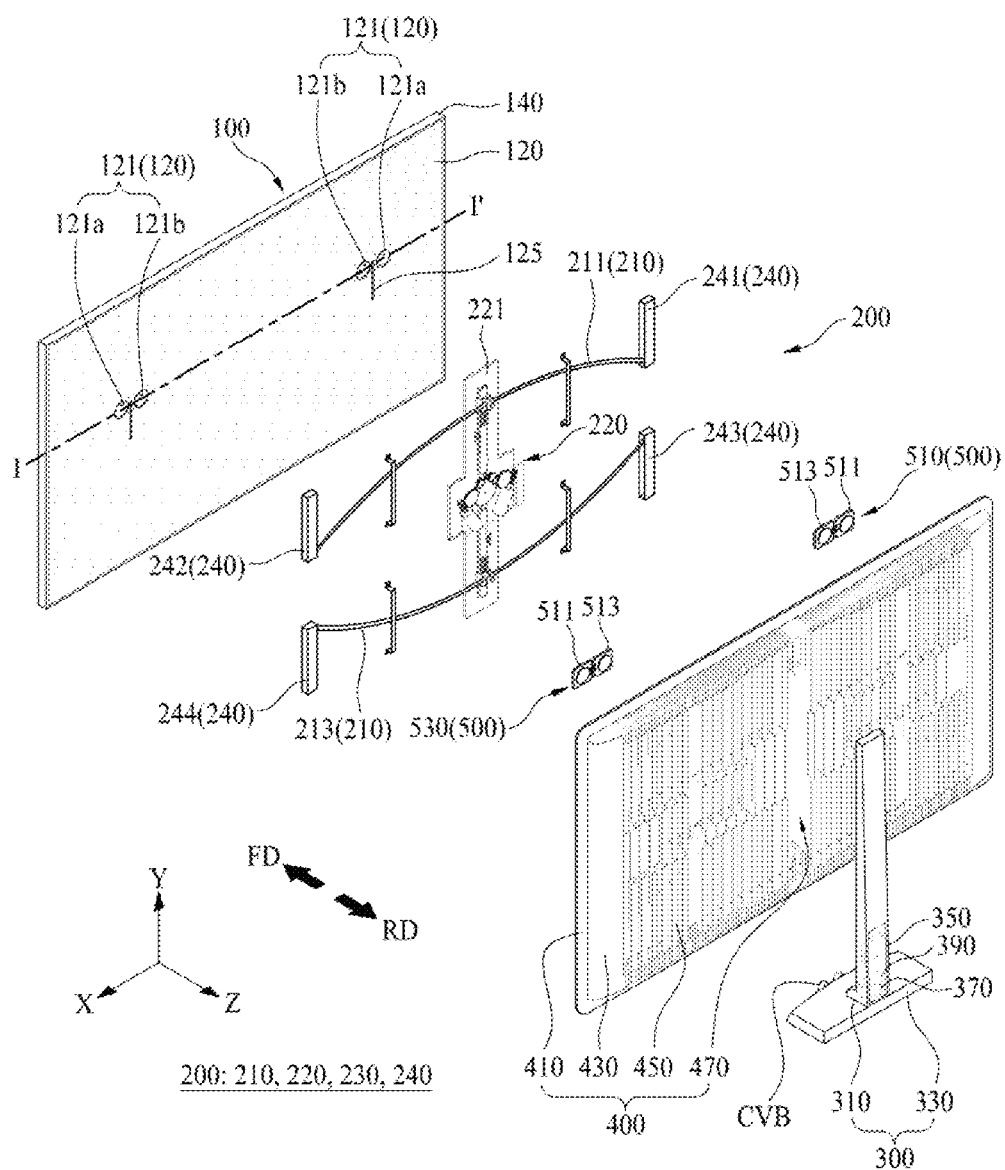
FIG. 5 is an exploded perspective view of a display apparatus according to an aspect of the present disclosure.
Figure 6:
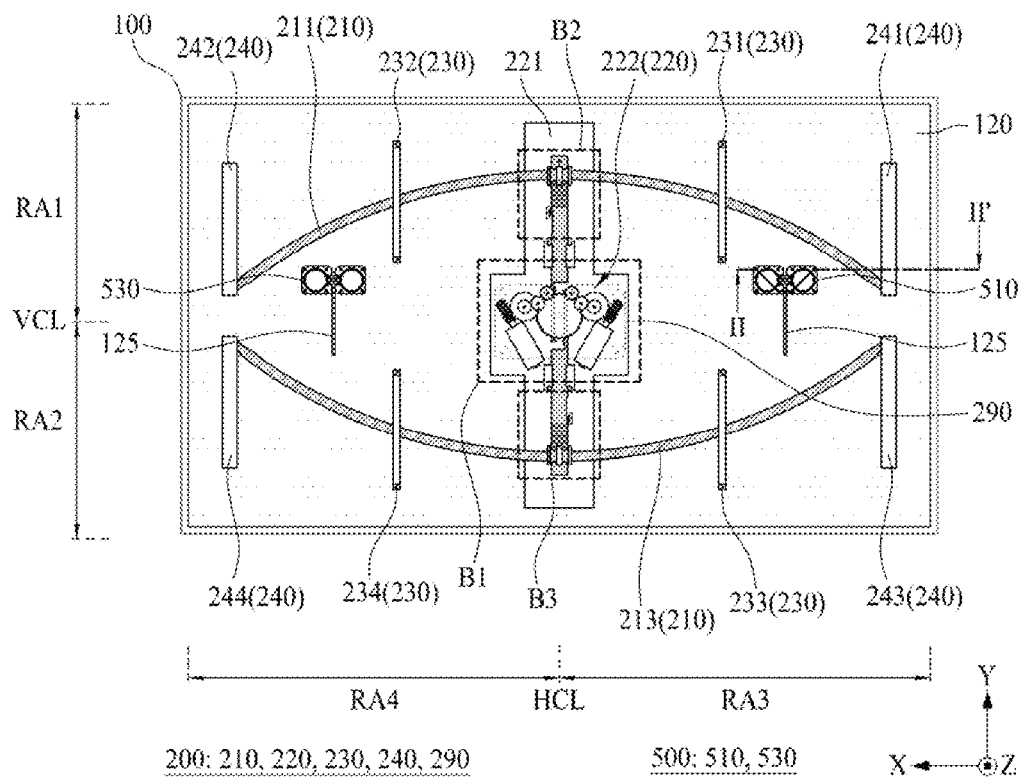
FIG. 6 illustrates a curvature variation device and a vibration device disposed on a rear surface of a display device illustrated in FIG. 5.
Figure 7:
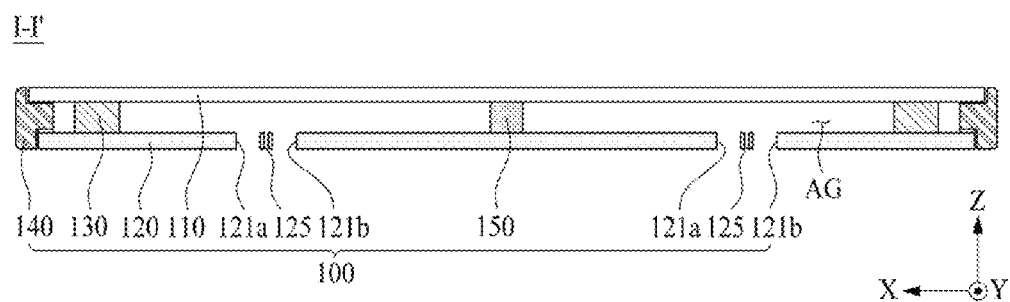
FIG. 7 is a cross-sectional view taken along line I-I' illustrated in FIG. 5.

FIG. 4 is a rear view of a display apparatus according to an aspect of the present disclosure, FIG. 5 is an exploded perspective view of a display apparatus according to an aspect of the present disclosure, FIG. 6 illustrates a curvature variation device and a vibration device each disposed on a rear surface of a display device illustrated in FIG. 5, and FIG. 7 is a cross-sectional view taken along line I-I' illustrated in FIG. 5.

With reference to FIGS. 4 to 7, the display apparatus according to an aspect of the present disclosure may include a display device 100, a curvature variation device 200, and a stand 300.

The display device 100 may be a screen of the display apparatus and may display an image. For example, the display device 100 may display an image by using a plurality of pixels each including a self-emitting display device. Additionally, the display device 100 may perform a function of a touch sensor which senses a user touch.

The display device 100 according to an aspect, as illustrated in FIG. 7, may include a display panel 110 and a back cover 120.

The display panel 110 may include a self-emitting display panel or a curved self-emitting display panel, which may be bent. For example, the display panel 110 may include a light emitting display panel, a micro light emitting diode display panel, a flexible light emitting display panel, a flexible micro light emitting diode display panel, or a quantum dot light emitting display panel, but aspects of the present disclosure are not limited thereto.

The display panel 110 according to an aspect may include a pixel array layer, which is disposed on a base substrate and includes a plurality of pixels, and an encapsulation member which covers the pixel array layer.

Each of the plurality of pixels may include a light emitting device layer. The light emitting device layer may be implemented in a top emission structure, where light passes through the encapsulation member and is discharged to the outside, or a bottom emission structure where light passes through the base substrate and is discharged to the outside. Herein, an example where the light emitting device layer is implemented in the top emission structure will be described.

The encapsulation member may be implemented to cover the pixel array layer, and thus, may include a function of protecting the light emitting device layer from oxygen and/or water. For example, the encapsulation member based on the top emission structure may be transparent, and the encapsulation member based on the bottom emission structure may be opaque.

The display panel 110 according to an aspect may further include a touch sensor layer (or a touch electrode layer) for sensing a touch position of a user. When the light emitting device layer has the top emission structure, the touch sensor layer may be disposed on the encapsulation member. When the light emitting device layer has the bottom emission structure, the touch sensor layer may be disposed on the base substrate.

The back cover 120 may implement a rear structure of the display device 100. The back cover 120 may be disposed on a rear surface of the display panel 110 and may cover or support the rear surface of the display panel 110.

The back cover 120 according to an aspect may include a metal material or a metal alloy material. For example, the back cover 120 may include one material of aluminum (Al), an Al alloy, a magnesium (Mg) alloy, an alloy of iron (Fe) and nickel (Ni), and stainless steel, an alloy material thereof, or a junction structure thereof, but aspects of the present disclosure are not limited thereto.

The back cover 120 according to an aspect may be connected (or coupled) to the rear surface of the display panel 110 by a cover connection member 130.

The cover connection member 130 may be disposed (or interposed) between the back cover 120 and the rear surface of the display panel 110. The cover connection member 130 may provide an air gap AG between the back cover 120 and the rear surface of the display panel 110.

The cover connection member 130 according to an aspect may include an adhesive resin, a double-sided tape, or a double-sided adhesive foam pad and may have elasticity for absorbing an impact.

The cover connection member 130 according to an aspect may include a magnet. For example, the cover connection member 130 may include a rubber magnet, but aspects of the present disclosure are not limited thereto.

The cover connection member 130 according to an aspect may be disposed along a rear periphery portion of the display panel 110 and a front periphery portion of the rear cover 120. For example, an air gap AG between the rear cover 120 and the rear surface of the display panel 110 may be an area or a space surrounded by the cover connection member 130.

The display device 100 according to an aspect may further include a middle frame 140.

The middle frame 140 may be disposed between a rear periphery portion of the display panel 110 and a front periphery portion of the back cover 120. The middle frame 140 may surround all of an outer surface (or an outer sidewall) of the display panel 110 and an outer surface (or an outer sidewall) of the back cover 120 to protect an outer surface of each of the display panel 110 and the back cover 120, thereby improving an outer design of a side surface of the display apparatus. For example, the middle frame 140 may be referred to as a middle cabinet, a middle cover, or a middle chassis, but aspects of the present disclosure are not limited thereto.

The middle frame 140 according to an aspect may include a supporting part, which supports a periphery portion of each of the display panel 110 and the back cover 120, and a sidewall portion which surrounds a side surface of each of the display panel 110 and the back cover 120. For example, the middle frame 140 may have a picture frame structure having a ⊢-shaped or ⊣-shaped cross-sectional structure where the supporting part and the sidewall portion are provided as one body or a single-body.

In the middle frame 140 according to an aspect, a first surface of the supporting part may be coupled to the rear periphery portion of the display panel 110 by an adhesive member, and a second surface of the supporting part may be coupled to the front periphery portion of the back cover 120 by an adhesive member.

In the middle frame 140 according to an aspect, the first surface of the supporting part may be spaced apart from the rear periphery portion of the display panel 110, and the second surface of the supporting part may be coupled to the front periphery portion of the back cover 120 by an adhesive member.

The middle frame 140 according to an aspect may include a metal material or a plastic material. For example, the middle frame 140 may include a metal material for improving an outer design of the side surface of the display apparatus and protecting the side surface of the display apparatus, but a metal material is not limited thereto.

The curvature variation device (or a curvature variation unit) 200 may be disposed on the rear surface of the display device 100 to vary a curvature of the display device 100. For example, the curvature variation device 200 may be disposed on the rear surface of the back cover 120.

The curvature variation device 200 may move (or forward move) both side portions of the display device 100 in a forward direction FD with respect to the display apparatus in response to manipulation of a user (or a viewer), and thus, the both side portions (or rear periphery portions) of the display device 100 may protrude in the forward direction FD with respect to a center portion of the display apparatus. Therefore, as the both side portions of the display device 100 protrude in the forward direction FD with respect to a center portion of the display apparatus, the display device 100 may vary in a curved shape which has a curvature greater than 0 (zero). For example, as seen from a viewer located in front of the display apparatus, the display device 100 varied in a curved shape may have a curved shape where a center portion thereof is bent concavely from both side portions thereof. The display device 100 having a curved shape may provide a user with an image which has three-dimensionality and is high in immersion. For example, the display device 100 having a curved shape may be implemented when one user instead of a plurality of users is watching an image, but aspects of the present disclosure are not limited thereto.

The curvature variation device 200 may move (or rearward move) the both side portions of the display device 100, which has protruded in the forward direction FD with respect to the display apparatus, in a rearward direction RD with respect to the display apparatus in response to manipulation of the user, and thus, may restore the both side portions of the display device 100 to the same plane as the center portion of the display device 100. Therefore, the display device 100 may vary in a flat shape which has a curvature of 0 (zero) as the both side portions and the center portion are disposed on the same plane. The display device 100 having a flat shape may be implemented when a plurality of users instead of one user are watching an image, but aspects of the present disclosure are not limited thereto.

The curvature variation device 200 according to an aspect may include an arc member 210, a driver 220, and a guider 230.

The arc member 210 may be disposed on the rear surface of the display device 100. For example, the arc member 210 may be disposed on the rear surface of the back cover 120.

The arc member 210 according to an aspect have a curved shape. For example, the arc member 210 may be referred to as a curvature variation member or a curvature changing member, a curvature variation rod, a curvature variation bar, or a curvature variation pipe, but aspects of the present disclosure are not limited thereto.

The arc member 210 may rotate based on driving of the driver 220 to move the both side portions of the display device 100 in the forward direction FD or the rearward direction RD with respect to the display apparatus. For example, based on driving of the driver 220, the arc member 210 may rotate by a maximum of 90 degrees in a first rotational direction at a fixed position (or in place) or may rotate by a maximum of 90 degrees in a second rotational direction opposite to the first rotational direction. For example, the first rotational direction may be a forward-direction rotation or a clockwise rotation and the second rotational direction may be a reverse-direction rotation or a counterclockwise rotation, but aspects of the present disclosure are not limited thereto and the directions may be defined as the opposite. For example, as the arc member 210 rotates in a first rotational direction, the display device 100 may vary (or may be changed) to a curved shape having a curvature which is greater than 0 (zero), and as the arc member 210 rotates in a second rotational direction in a state which has rotated in the first rotational direction, the arc member 210 may vary or restore (or may be changed or restored) to a flat shape having a curvature of 0 (zero).

The arc member 210 according to an aspect may include a first arc member 211 and a second arc member 213.

The first arc member 211 may be disposed in a first rear region RA1 of the display device 100 parallel to the first direction X. For example, the first arc member 211 may be disposed in a first rear region RA1 of the back cover 120. The first rear region RA1 may be an upper rear region adjacent to a first long side of the rear surface of the display device 100 with respect to an upright state or the second direction Y. For example, the first rear region RA1 of the back cover 120 may be between the first long side and a rear center region of the display device 100 parallel to the first direction X.

The first arc member 211 may have a curved shape. The first arc member 211 may have a curved shape which is convex toward the first long side of the display device 100. A center portion (or a length center portion) of the first arc member 211 may be adjacent to the first long side of the display device 100, and both ends (or both side portions) of the first arc member 211 may be adjacent to a vertical center line VCL of the display device 100. For example, in a direction facing (or viewing) the rear surface of the display device 100 having a curvature of 0 (zero), one end (or a first end) of the first arc member 211 may be adjacent to a vertical center line VCL of a first short side (or a first rear periphery portion) among the display device 100, and the other end (or a second end) of the first arc member 211 may be adjacent to a vertical center line VCL of a second short side (or a second rear periphery portion) among the display device 100.

The second arc member 213 may be disposed in a second rear region RA2 of the display device 100 parallel to the first direction X. The second arc member 213 may be disposed in a second rear region RA2 of the back cover 120. The second rear region RA2 may be a lower rear region adjacent to a second long side of the rear surface of the display device 100 with respect to an upright state or the second direction Y. The second rear region RA2 of the back cover 120 may be between the second long side and the rear center region of the display device 100.

The second arc member 213 may have a curved shape. The second arc member 213 may have a curved shape which is convex toward the second long side of the display device 100. A center portion (or a length center portion) of the second arc member 213 may be adjacent to the second long side of the display device 100, and both ends (or both side portions) of the second arc member 213 may be adjacent to a vertical center line VCL of the display device 100. For example, in a direction facing (or viewing) the rear surface of the display device 100 having a curvature of 0 (zero), one end (or a first end) of the second arc member 213 may be adjacent to a vertical center line VCL of a first short side (or a first rear periphery portion) among the display device 100, and the other end (or a second end) of the second arc member 213 may be adjacent to a vertical center line VCL of a second short side (or a second rear periphery portion) among the display device 100.

The first arc member 211 and the second arc member 213 may be disposed on the rear surface of the display device 100 to be symmetrical with each other with respect to a vertical center line VCL or the rear center region of the display device 100. Here, the vertical center line VCL of the display device 100 may be disposed at a center portion of a short-side length (or a lengthwise length) of the display device 100.

Each of the first arc member 211 and the second arc member 213 according to an aspect may include a curved shape having a curvature corresponding to a maximum curvature of the display device 100, which is to be implemented. Each of the first arc member 211 and the second arc member 213 may be an arc rod, an arc bar, or an arc pipe, which includes a circular cross-sectional surface and has a curved shape. For example, each of the first arc member 211 and the second arc member 213 may include a metal material, but aspects of the present disclosure are not limited thereto.

The first arc member 211 and the second arc member 213 may rotate in opposite directions to each other based on driving of the driver 220. Each of the first arc member 211 and the second arc member 213 according to an aspect may rotate in opposite directions to each other at a fixed position (or in place) based on driving of the driver 220. For example, the first arc member 211 may rotate in a first rotational direction at a fixed position (or in place) based on driving of the driver 220, and at the same time, the second arc member 213 may rotate in a second rotational direction at a fixed position (or in place) based on driving of the driver 220. On the other hand, the first arc member 211 may rotate in the second rotational direction at a fixed position (or in place) based on driving of the driver 220, and at the same time, the second arc member 213 may rotate in the first rotational direction at a fixed position (or in place) based on driving of the driver 220.

A center portion of the first arc member 211 and a center portion of the second arc member 213 may be disposed adjacent to a long side of the display device 100, and thus, a rear center space of the display device 100 disposed between the center portion of the first arc member 211 and the center portion of the second arc member 213 may have a relatively wide size, thereby increasing the use of a rear space, where mechanism elements or circuit elements are disposed, of the display device 100 and enabling the mechanism elements or the circuit elements to be easily disposed.

The driver 220 may be disposed in the rear center region of the display device 100. The driver 220 may be disposed between the first arc member 211 and the second arc member 213.

The driver 220 may simultaneously drive each of the first arc member 211 and the second arc member 213. The driver 220 may simultaneously rotate the first arc member 211 and the second arc member 213 in opposite rotational directions at a fixed position (or in place). For example, the driver 220 may rotate the first arc member 211 by a maximum of 90 degrees in the first rotational direction at a fixed position, and simultaneously, may rotate the second arc member 213 by a maximum of 90 degrees in the second rotational direction at a fixed position. On the other hand, the driver 220 may rotate the first arc member 211 by a maximum of 90 degrees in the second rotational direction at a fixed position, and simultaneously, may rotate the second arc member 213 by a maximum of 90 degrees in the first rotational direction at a fixed position.

The driver 220 may simultaneously rotate each of the first arc member 211 and the second arc member 213 at a fixed position through a rotational motion of the rotary motor and a rectilinear motion linked to the rotational motion of the rotary motor.

The guider 230 may be disposed on a rear surface of the display device 100 in parallel with a second direction Y and may movably support each of a first center portion and a second center portion of the arc member 210. For example, in a direction facing (or viewing) the rear surface of the display device 100 having a curvature of 0 (zero), the first center portion of the arc member 210 may be a center (or a right center) between a center portion and one end (or a first end) thereof, and the second center portion of the arc member 210 may be a center (or a left center) between a center portion and the other end (or a second end) thereof. When the arc member 210 having a curved shape is rotating, the guider 230 may prevent the arc member 210 from being partially detached (or lifted) from the rear surface of the display device 100, with respect to a thickness direction Z of the display device 100, and thus, a pressing force of the arc member 210 generated based on a rotation of the arc member 210 may be applied to both side portions of the display device 100 without being reduced (or lost). For example, the guider 230 may guide a movement of the arc member 210 and may act as a prop for the arc member 210 which is rotating.

Each of a first side (or one side) and a second side (or the other side) of the guider 230 may be fixed to the rear surface of the display device 100. Each of the first side and the second side of the guider 230 may be fixed to the rear surface of the back cover 120. A center portion between the first side and the second side of the guider 230 may be spaced apart from the rear surface of the display device 100. Therefore, the arc member 210 may be movably disposed in a separation space between the rear surface of the display device 100 and the center portion of the guider 230, and thus, the guider 230 may prevent the partial detachment or lifting of the arc member 210 when the arc member 210 is rotating and both side portions of the display device 100 may protrude in the forward direction FD with respect to the display apparatus by using the guider 230 as a supporter or a prop.

The guider 230 according to an aspect may be disposed between a third rear region RA3 (or a third region) and a fourth rear region RA4 (or a fourth region) of the display device 100 and may movably support each of the first arc member 211 and the second arc member 213.

In the display device 100, the third rear region RA3 may be a right region (or a left region) of the rear surface of the display device 100 with respect to a horizontal center line HCL of the display device 100 parallel to the second direction Y. The fourth rear region RA4 may be a left region (or a right region) of the rear surface of the display device 100 with respect to the horizontal center line HCL of the display device 100. For example, the horizontal center line HCL of the display device 100 may be disposed at a center portion of a long-side length (or a widthwise length) of the display device 100. For example, in a direction facing (or viewing) the rear surface of the display device 100 having a curvature of 0 (zero), the third rear region RA3 may be a region between the first short side and the horizontal center line HCL of the display device 100, and the fourth rear region RA4 may be a region between the second short side and the horizontal center line HCL of the display device 100.

The guider 230 according to an aspect may include first to fourth guide members 231, 232, 233, and 234.

The first guide member 231 may be disposed in the third rear region RA3 of the display device 100 and may movably support a first center portion of the first arc member 211.

Each of the first side and the second side of the first guide member 231 may be fixed to the first rear region RA1 of the display device 100 with the first arc member 211 therebetween. For example, each of the first side and the second side of the first guide member 231 may be fixed to the first rear region RA1 of the back cover 120 by a coupling member such as a screw or a bolt.

A center portion between the first side and the second side of the first guide member 231 may be disposed in the first rear region RA1 among the third rear region RA3 of the back cover 120 to intersect with the first center portion of the first arc member 211. The center portion of the first guide member 231 may be spaced apart from the rear surface of the back cover 120 by a distance which is greater than a diameter of the arc member 210 due to a height of each of the first side and the second side. Accordingly, the first center portion of the first arc member 211 may move in a separation space between the center portion of the first guide member 231 and the rear surface of the back cover 120.

The second guide member 232 may be disposed in the first rear region RA1 among the fourth rear region RA4 of the display device 100 and may movably support a second center portion of the first arc member 211. Except for that the second guide member 232 is disposed in the first rear region RA1 among the fourth rear region RA4 of the display device 100 and may movably support the second center portion of the first arc member 211, the second guide member 232 according to the present aspect may be substantially the same as the first guide member 231, and thus, their repetitive descriptions may be omitted.

The third guide member 233 may be disposed in the second rear region RA2 among the third rear region RA3 of the display device 100 and may movably support a first center portion of the second arc member 213. Except for that the third guide member 233 is disposed in the second rear region RA2 among the third rear region RA3 of the display device 100 and may movably support a first center portion of the second arc member 213, the third guide member 233 according to the present aspect may be substantially the same as the first guide member 231, and thus, their repetitive descriptions may be omitted.

The fourth guide member 234 may be disposed in the second rear region RA2 among the fourth rear region RA4 of the display device 100 and may movably support a second center portion of the second arc member 213. Except for that the fourth guide member 234 is disposed in the second rear region RA2 among the fourth rear region RA4 of the display device 100 and may movably support a second center portion of the second arc member 213, the fourth guide member 234 according to the present aspect may be substantially the same as the first guide member 231, and thus, their repetitive descriptions may be omitted.

The first guide member 231 and the third guide member 233 may be spaced apart from each other in the second direction Y. A separation space between the first guide member 231 and the third guide member 233 may be used as a rear space of the display device 100 for disposing (or arranging) mechanism elements or circuit elements of the display apparatus. In the same manner, the second guide member 232 and the fourth guide member 234 may be spaced apart from each other in the second direction Y. A separation space between the second guide member 232 and the fourth guide member 234 may be used as a rear space of the display device 100 for disposing (or arranging) mechanism elements or circuit elements of the display apparatus.

The curvature variation device 200 according to an aspect may further include a fixing bracket 240.

The fixing bracket 240 may be disposed in each of the third rear region RA3 and the fourth rear region RA4 of the display device 100 and may movably support an end of each of the first arc member 211 and the second arc member 213. The fixing bracket 240 may movably support the end of each of the first arc member 211 and the second arc member 213 and may guide the movement of the end of each of the first arc member 211 and the second arc member 213. To this end, the fixing bracket 240 may include a side groove (or a side pocket portion) having a certain depth from an inner surface thereof so that the end of each of the first arc member 211 and the second arc member 213 is movably inserted into the side groove. When each of the first arc member 211 and the second arc member 213 is rotating, the fixing bracket 240 may transfer pressure, generated at the end of each of the first arc member 211 and the second arc member 213, to each of a first rear periphery portion and a second rear periphery portion of the display device 100. In this case, the fixing bracket 240 may allow the end of each of the first arc member 211 and the second arc member 213 to surface-contact the display device 100, and thus, may prevent the local damage of the display device 100 caused by a local point-contact between the end of each of the first arc member 211 and the second arc member 213 and the display device 100.

The curvature variation device 200 according to an aspect may further include a fixing bracket 240.

The first fixing bracket 241 may be disposed in a first rear region RA1 among the third rear region RA3 of the display device 100 and may movably support the one end (or the first end) of the first arc member 211. For example, the first fixing bracket 241 may be fixed to a first rear periphery portion among the first rear region RA1 of the back cover 120.

The second fixing bracket 242 may be disposed in a first rear region RA1 among the fourth rear region RA4 of the display device 100 and may movably support the other end (or the second end) of the first arc member 211. For example, the second fixing bracket 242 may be fixed to a second rear periphery portion among the first rear region RA1 of the back cover 120.

The third fixing bracket 243 may be disposed in a second rear region RA2 among the third rear region RA3 of the display device 100 and may movably support the one end (or the first end) of the second arc member 213. For example, the third fixing bracket 243 may be fixed to a first rear periphery portion among the second rear region RA2 of the back cover 120.

The fourth fixing bracket 244 may be disposed in a second rear region RA2 among the fourth rear region RA4 of the display device 100 and may movably support the other end (or the second end) of the second arc member 212. For example, the fourth fixing bracket 244 may be fixed to a second rear periphery portion among the second rear region RA2 of the back cover 120.

Each of the first to fourth fixing brackets 241 to 244 may be disposed on the rear surface of the display device 100 in parallel with the second direction Y. For example, when the display device 110 has a flat shape, ends of the arc members 211 and 213 may be disposed adjacent to one side of each of the first to fourth fixing brackets 241 to 244 adjacent to a vertical center line VCL of the display device 100. Also, when the display device 110 is varied (or changed) from a flat shape to a curved shape, the ends of the arc members 211 and 213 may move from one side of each of the first to fourth fixing brackets 241 to 244 to the other side thereof while pressing each of the first to fourth fixing brackets 241 to 244, based on rotations of the arc members 211 and 213.

Additionally, each of the first to fourth fixing brackets 241 to 244 of the fixing bracket 240 may be disposed on the rear surface of the display device 100 to be inclined by a certain angle with respect to the second direction Y without being parallel to the second direction Y. Each of the first to fourth fixing brackets 241 to 244 according to an aspect may be disposed to be inclined to correspond to a movement trajectory of the end of each of the first and second arc members 211 and 213 when the first and second arc members 211 and 213 are rotating. For example, in each of the first to fourth fixing brackets 241 to 244, one side thereof adjacent to the vertical center line VCL of the display device 100 may be disposed closer to a horizontal center line HCL than the other side thereof.

The stand 300 may be disposed on the rear surface of the display device 100 and may support the display device 100 in an upright state. For example, the stand 300 may be supported by the curvature variation device 200.

The stand 300 according to an aspect may include a prop 310 and a post 330.

The prop 310 may be implemented to have a certain size. The prop 310 may include a curvature variation button part CVB and a curvature variation control circuit which controls the driver 220 of the curvature variation device 200 based on manipulation of a user performed through the curvature variation button part CVB.

The post 330 may be disposed vertical to the prop 310 and may be coupled to a gear box cover 290 disposed in the curvature variation device 200. Accordingly, the display device 100 may be supported or mounted on the post 330 of the stand 300 in an upright state.

The display apparatus according to an aspect of the present disclosure may further include a speaker device (or a speaker unit) 550 embedded into the stand 300. The speaker device 550 according to an aspect may be a woofer speaker, but aspects of the present disclosure are not limited thereto.

The display apparatus according to an aspect of the present disclosure may further include a power supply board 370 which is embedded into the stand 300. The power supply board 370 may generate and output a driving power for driving of each of the display device 100 and the curvature variation device 200 based on an input power input through a power cable. The power supply board 370 according to an aspect of the present disclosure may include power conversion circuits (or a power conversion module) and power management circuits (or a power management module).

The display apparatus according to an aspect of the present disclosure may further include a system board 390 which is embedded into the stand 300, and thus, the degree of design freedom of the curvature variation device 200 disposed on the rear surface of the display device 100 may be enhanced. The system board 390 (or a set main board) may include various electronic elements or various circuit for controlling each of the display device 100 and the curvature variation device 200 or for driving of the display apparatus and displaying an image by using the display device 100. For example, the system board 390 may include system control circuits (or a system control module) which controls overall driving of the display apparatus, image source processing circuits (or an image source processing module), sound processing circuits (or a sound processing module), and storage circuits (or a storage module).

The display apparatus according to an aspect of the present disclosure may further include a rear curtain device (or a rear curtain unit) 400.

With reference to FIGS. 3 to 5, the rear curtain device 400 may be implemented on the rear surface of the display device 100 to cover the curvature variation device 200. The rear curtain device 400 may implement a rear structure of the display apparatus. The rear curtain device 400 may be deformed to correspond to a curvature variation of the display device 100 based on driving of the curvature variation device 200.

The rear curtain device 400 according to an aspect may include a curtain edge frame 410, a curtain rear frame 430, and a plurality of curtain members 450.

The curtain edge frame 410 may be connected to a rear periphery portion of the display device 100 and may include a first opening portion. For example, the curtain edge frame 410 may be implemented as a picture frame type to include the first opening portion which overlaps a rear surface, greater than the rear periphery portion of the display device 100, of the display device 100. The curtain edge frame 410 may be fixed to a rear periphery portion of the back cover 120 by a coupling member such as a screw or a bolt.

The curtain rear frame 430 may be coupled to the curtain edge frame 410 and may include a second opening portion overlapping with the first opening portion. For example, the curtain rear frame 430 may be implemented as a picture frame type including the second opening portion overlapping with the first opening portion of the curtain edge frame 410. The curtain rear frame 430 may be fixed to the curtain edge frame 410 by a coupling member such as a screw or a bolt.

A plurality of curtain members 450 may be fixed to the curtain rear frame 430 to be spaced apart from one another in the first direction X in parallel with the second direction Y. The plurality of curtain members 450 may be disposed in the second opening portion of the curtain rear frame 430 to be spaced apart from one another in the first direction X in parallel with the second direction Y. For example, each of the plurality of curtain members 450 may be disposed in the second opening portion of the curtain rear frame 430 to have a certain tension and may be inclined at a certain angle to correspond to a curvature variation of the display device 100. Each of the plurality of curtain members 450 according to an aspect may include a fiber material or a fabric material, which is deformable to correspond to the curvature variation of the display device 100, but aspects of the present disclosure are not limited thereto, and each of the plurality of curtain members 450 may include a metal material or a metal alloy material.

The rear curtain device 400 according to an aspect may further include a stand connection port 470. The stand connection port 470 may be implemented by removing a center portion of each of the plurality of curtain members 450, and thus, may expose a rear center portion of the display device 100 in a rearward direction RD with respect to the display apparatus. Therefore, the stand 300 may be coupled or connected to the curvature variation device 200 through the stand connection port 470 of rear curtain device 400 to support the display device 100.

The display apparatus according to an aspect of the present disclosure may further include a vibration device 500.

With reference to FIGS. 4 to 6, the vibration device 500 may be disposed on the rear surface of the display device 100 and vibrate the display device 100 to output a sound through the vibration of the display device 100. The vibration device 500 may be disposed on the rear surface of the display device 100 and may be implemented to vibrate the display panel 110 so that a sound is output based on a vibration of the display panel 110. For example, the vibration device 500 may vibrate a first vibration region (or the third rear region RA3) and a second vibration region (or the fourth rear region RA4) of the display device 100, and thus, may output a first sound (or a left sound) and a second sound (or a right sound), respectively generated based on vibrations of the first vibration region and the second vibration region, in a forward direction FD with respect to the display apparatus, thereby realizing a stereo sound.

The vibration device 500 may be supported by the back cover 120 of the display device 100 and may be connected to the rear surface of the display panel 110 through the back cover 120. To this end, the back cover 120 may include a through hole 121 into which the vibration device 500 may be inserted. For example, the vibration device 500 may be fixed to the back cover 120 of the display device 100 and directly vibrate the display panel 110.

The vibration device 500 according to an aspect may include first and second vibration devices 510 and 530.

The first vibration device 510 may vibrate the first vibration region RA3 of the display device 100 to output the first sound (or the left sound), generated by the first vibration region of the display device 100, in the forward direction FD with respect to the display device 100. For example, the first vibration device 510 may be supported by the back cover 120 and may be connected to the rear surface of the display panel 110 through the through hole 121 provided in the back cover 120.

The second vibration device 530 may vibrate the second vibration region RA4 of the display device 100 to output the second sound (or the right sound), generated by the second vibration region of the display device 100, in the forward direction FD with respect to the display device 100. For example, the second vibration device 530 may be supported by the back cover 120 and may be connected to the rear surface of the display panel 110 through the through hole 121 provided in the back cover 120.

One or more of the first and second vibration devices 510 and 530 according to an aspect of the present disclosure, as illustrated in FIGS. 4 to 6, may be configured in a twin type structure. For example, the vibration devices 510 and 530 having the twin type structure may include two sub vibration devices, two sub vibration generators, or two sub vibrators. The twin type structure may be referred to as a 2-array (two-array) structure or a twin type vibration device, but aspects of the present disclosure are not limited thereto. One or more of the first and second vibration devices 510 and 530 according to an aspect of the present disclosure is not limited to the twin type structure and may be configured in a single type structure or may be configured in a 2 or more-array structure. For example, one or more of the first and second vibration devices 510 and 530 may be configured in a 4-array structure or a 6-array structure.

Each of the first vibration device 510 and the second vibration device 530 may include a pair of sound generating device 511 and 513 (or first and second sound generating devices 511 and 513) which are disposed in the display device 100 in parallel. For example, each of the first vibration device 510 and the second vibration device 530 may be referred to as a twin type vibration device including the first and second sound generating devices 511 and 513.

The first and second sound generating devices 511 and 513 may be supported by the back cover 120 of the display device 100 in parallel, and moreover, may pass through first and second through holes 121*a* and 121*b* of the through hole 121 provided in the back cover 120 and may be connected to the rear surface of the display panel 110.

The first sound generating device 511 of the first vibration device 510 may pass through the first through hole 121*a* provided in the back cover 120 overlapping the first vibration region RA3 of the display device 100, and thus, may be connected to the first vibration region RA3 of the display panel 110 and may be coupled to the rear surface of the back cover 120 near the first through hole 121a.

The second sound generating device 513 of the first vibration device 510 may pass through the second through hole 121b provided in the back cover 120 overlapping the first vibration region RA3 of the display device 100, and thus, may be connected to the first vibration region RA3 of the display panel 110 and may be coupled to the rear surface of the back cover 120 near the second through hole 121b.

The first sound generating device 511 of the second vibration device 530 may pass through the first through hole 121a provided in the back cover 120 overlapping the second vibration region RA4 of the display device 100, and thus, may be connected to the second vibration region RA4 of the display panel 110 and may be coupled to the rear surface of the back cover 120 near the first through hole 121a.

The second sound generating device 513 of the second vibration device 530 may pass through the second through hole 121b provided in the back cover 120 overlapping the second vibration region RA4 of the display device 100, and thus, may be connected to the second vibration region RA4 of the display panel 110 and may be coupled to the rear surface of the back cover 120 near the second through hole 121b.

With reference to FIG. 7, the display device 100 according to an aspect of the present disclosure may further include an intermediate member 150.

The intermediate member 150 may be implemented inside the display device 100 to overlap the curvature variation device 200. The intermediate member 150 may prevent a vibration, generated based on driving of the curvature variation device 200, from being transferred to the display panel 110. Also, the intermediate member 150 may prevent a physical contact between the display panel 110 and the back cover 120 when a curvature of the display device 100 is varied by the curvature variation device 200.

The intermediate member 150 according to an aspect may be disposed between the display panel 110 and the back cover 120 to overlap the curvature variation device 200. For example, the intermediate member 150 may be disposed between the display panel 110 and the back cover 120 to overlap the horizontal center line HCL of the display device 100. For example, the intermediate member 150 may have a line shape parallel to the second direction Y. As another example, the intermediate member 150 may have the same shape as a contact surface of the curvature variation device 200 contacting a rear surface of the back cover 120. The intermediate member 150 may be disposed between a first vibration region (or a third rear region) RA3 and a second vibration region (or a fourth rear region) RA4 of the display device 100, and thus, may spatially divide the first vibration region and the second vibration region, thereby preventing interference between the first vibration region and the second vibration region.

The intermediate member 150 according to an aspect of the present disclosure may include a material which is the same as or different from the cover connection member 130. For example, the intermediate member 150 may include an adhesive resin, a double-sided tape, or a double-sided adhesive foam pad and may have elasticity for absorbing an impact. The intermediate member 150 may be referred to as a buffering member, a reinforcement member, a region division member, or a partition member, but aspects of the present disclosure are not limited thereto.

Figure 8:
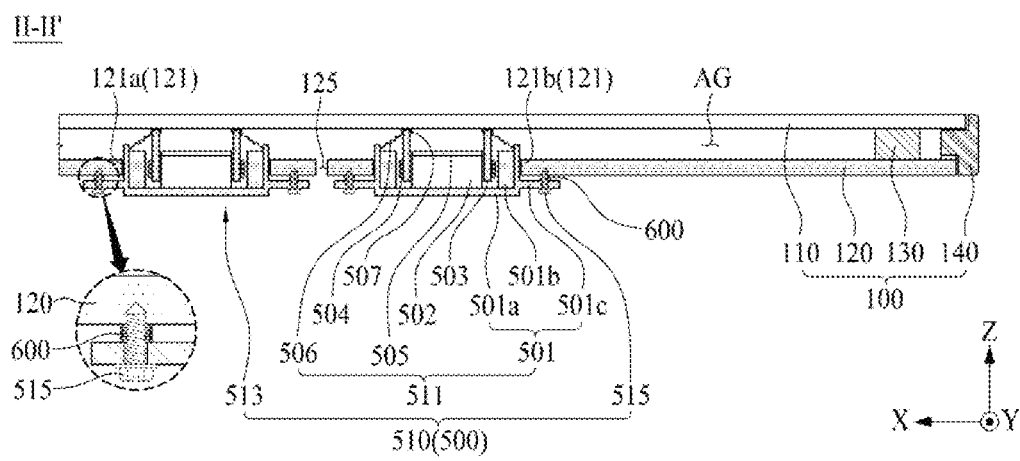
FIG. 8 is a cross-sectional view taken along line II-II' illustrated in FIG. 5.

FIG. 8 is a cross-sectional view taken along line II-II' illustrated in FIG. 6 and is a cross-sectional view illustrating the first vibration device illustrated in FIGS. 4 to 6.

With reference to FIGS. 4 to 6, and 8, each of the first vibration device 510 and the second vibration device 530 according to an aspect of the present disclosure may include first and second sound generating devices 511 and 513. Each of the first and second sound generating devices 511 and 513 may include a base frame 501, a magnet 502, a bobbin 503, a coil 504, a center pole 505, and a damper 506.

The base frame 501 may be referred to as a fixing part fixed to the back cover 120, and each of the magnet 502, the bobbin 503, the coil 504, the center pole 505, and the damper 506 may be referred to as a vibration part for vibrating the display panel 110. However, aspects of the present disclosure are not limited thereto.

The base frame 501 according to an aspect may include a frame body 501a, an upper plate 501b, and a protrusion bracket 501c.

The frame body 501a may be fixed to the back cover 120. The frame body 501a may act as a lower plate which supports the magnet 502.

The upper plate 501b may protrude to a front periphery portion of the frame body 501a to have a cylindrical shape including a hollow portion. Therefore, the frame body 501a and the upper plate 501b may be provided as one body having a U-shape. For example, the frame body 501a and the upper plate 501b are not limited to the terms and may each be referred to as another term such as a yoke.

The protrusion bracket 501c may protrude from a side surface of the upper plate 501b. The protrusion bracket 501c may be fixed to the rear surface of the back cover 120 by a fastening member 515, and thus, the base frame 501 may be fixed to the back cover 120.

The fastening member 515 may be a screw or a bolt which passes through the protrusion bracket 501c and is fastened to the rear surface of the back cover 120. In this case, a buffering member 600 may be disposed between the rear surface of the back cover 120 and the protrusion bracket 501c.

When a curvature of the display panel 110 varies, the buffering member 600 may tilt the base frame 501 based on the curvature of the display panel 110 to maintain a contact state between the first and second sound generating devices 511 and 513 and the display panel 110. For example, the buffering member 600 may include an elastic spring or an elastic pad, but aspects of the present disclosure are not limited thereto.

The magnet 502, the bobbin 503, and the coil 504 may each be referred to as a magnetic circuit part or a magnetic vibration part, which is disposed on the base frame 501 to vibrate the display panel 110.

The magnetic circuit part according to an aspect may have a dynamic type structure or an external magnetic type structure, which includes a magnet 502 disposed outside the coil 504, or may have a micro type structure or an internal magnetic type structure, which includes a magnet 502 disposed in the coil 504. Each of the first and second sound generating devices 511 and 513 including the magnetic circuit device having the internal magnetic type structure may be low in leakage magnetic flux and totally small in size. Each of the first and second sound generating devices 511 and 513 according to the present disclosure may have the external magnetic type structure or the internal magnetic type structure. Hereinafter, an example where each of the first and second sound generating devices 511 and 513 according to the present disclosure has the internal magnetic type structure will be described.

The magnet 502 may be disposed in a groove portion of the base frame 501. The magnet 502 may be a permanent magnet having a cylindrical shape to be inserted into the bobbin 503.

The bobbin 503 may be disposed on the base frame 501 to surround the magnet 502 and may be coupled to the rear surface of the display panel 110. The bobbin 503 according to an aspect may have a circular shape or an elliptical shape (or oval shape), but aspects of the present disclosure are not limited thereto. The bobbin 503 having the oval shape may have an elliptical shape, a corners-rounded rectangular shape, or a non-circular curved shape having a width different from its length, but aspects of the present disclosure are not limited thereto. For example, in the bobbin 503 having the oval shape, a ratio of a long-axis diameter and a short-axis diameter may be 1.3:1 to 2:1. The bobbin 503 having the oval shape may more improve a sound of the high-pitched sound band than the circular shape and may reduce heat caused by a vibration, and thus, the bobbin 503 having the oval shape may have a good heat dissipation characteristic.

The coil 504 may be wound to surround an outer circumference surface of the bobbin 503 and may be supplied with a current of a driving signal (or a voice current) from the outside. The coil 504 may be referred to as a voice coil, but aspects of the present disclosure are not limited thereto. When a current (or a sound signal) is applied to the coil 504, a whole portion of the bobbin 503 may vibrate, for example, may perform a vertical reciprocating motion, according to Fleming's left hand rule based on an application magnetic field generated around the coil 504 and an external magnetic field generated around the magnet 502, and a sound (or a panel vibration sound) may be generated based on a vibration of the display panel 110 performed by the vertical movement (or vibration) of the bobbin 503 and may be output in the forward direction FD with respect to the display device 100.

The center pole 505 may be disposed on the magnet 502 to guide a vibration of the bobbin 503. For example, the center pole 505 may be inserted into the hollow portion of the bobbin 503 and may be surrounded by the bobbin 503. For example, the center pole 505 may be referred to as an elevation guider or pole pieces, but aspects of the present disclosure are not limited thereto.

The damper 506 may be disposed between the base frame 501 and the bobbin 503. For example, the damper 506 according to an aspect may be disposed between an upper outer circumference surface of the bobbin 503 and a protrusion frame which protrudes from the frame body 501a of the base frame 501 to surround the upper plate 501b. The damper 506 may be provided in a creased structure which is creased between one end and the other end thereof and may be contracted and relaxed based on a vibration of the bobbin 503. A vibration distance (or a vertical movement distance) of the bobbin 503 may be limited by a restoring force of the damper 506. For example, when the bobbin 503 vibrates by a certain distance or more or vibrates by a certain distance or less, the bobbin 503 may be restored to an original position by the restoring force of the damper 506. Also, the damper 506 may be referred to as a spider, a suspension, or an edge, but aspects of the present disclosure are not limited thereto.

Each of the first and second sound generating devices 511 and 513 according to an aspect may further include a bobbin protection member 507 disposed on the bobbin 503. For example, the bobbin protection member 507 may be referred to as a bobbin ring or a bobbin cap, but aspects of the present disclosure are not limited thereto.

The bobbin protection member 507 may be disposed on a front surface (or a front end portion) of the bobbin 503 and may transfer a raising and lowering motion (or vibration) of the bobbin 503 to the rear surface of the display panel 110. The bobbin protection member 507 according to an aspect may have a ring shape disposed on the front surface of the bobbin 503, a disc shape covering the whole front surface of the bobbin 503, or a cap shape surrounding the front surface and an upper outer surface of the bobbin 503, but the shape is not limited thereto.

The bobbin protection member 507 may be disposed on (or coupled to) the rear surface of the display panel 110 by using a first adhesive member. The first adhesive member may be disposed between the rear surface of the display panel 110 and the bobbin protection member 507. The first adhesive member according to an aspect may include an adhesive or a double-sided tape, but aspects of the present disclosure are not limited thereto.

The bobbin protection member 507 according to an aspect may be provided in a molding form of an injection material or metal. For example, the bobbin protection member 507 may include a textile reinforced material, a composite resin including a textile reinforced material, or metal, and in this case, may have a heat dissipation function of dissipating heat occurring when the first and second sound generating devices 511 and 513 are being driven.

With reference to FIGS. 4 to 8, the display apparatus according to the present disclosure may further include a slit 125.

The slit 125 may be implemented so that stress applied to the vibration device 500 is reduced when a curvature of the display device 100 varies. Also, the slit 125 may be implemented to minimize the degradation in sound quality caused by a position-based air gap (AG) variation (or deviation) between the display panel 110 and the back cover 120 based on a curvature of the display device 100.

The slit 125 may be disposed in the back cover 120 overlapping the vibration device 500. The slit 125 according to an aspect may be implemented to pass through the back cover 120 overlapping a region between a pair of sound generating devices 511 and 513. For example, the slit 125 may be implemented to pass through the back cover 120 at between the first through hole 121a and the second through hole 121b provided in the back cover 120.

The slit 125 may have a length parallel to the second direction Y. A length of the slit 125 may be longer than that of each of the sound generating devices 511 and 513. One end of the slit 125 may be disposed between the pair of sound generating devices 511 and 513.

The slit 125 may be formed to vertically pass through the back cover 120 in the thickness direction Z of the display device 100 and may allow an air gap AG (or an internal air gap) between the display panel 110 and the back cover 120 to communicate with a rear outer portion (or an external air gap) of the back cover 120. The slit 125 may allow the air gap AG between the display panel 110 and the back cover 120 to communicate with the external air gap, and thus, when the display panel 110 is vibrating (or shaking), an air may smoothly flow between the internal air gap AG and the external air gap. Therefore, the display panel 110 may stably vibrate, and thus, a frequency characteristic and a sound pressure characteristic of a low-pitched sound band based on a vibration of the display panel 100 may increase. For example, a frequency of the low-pitched sound band may be 800 Hz or less, but aspects of the present disclosure are not limited thereto.

Figure 9:
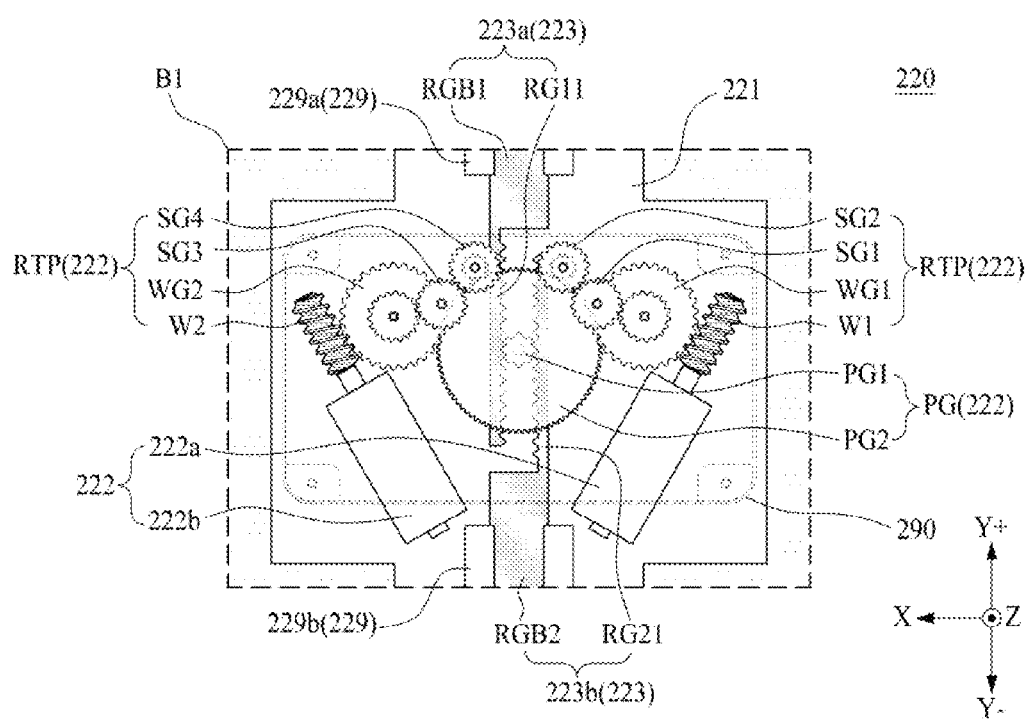
FIG. 9 is an enlarged view of region 'B1' illustrated in FIG. 6.
Figure 10:
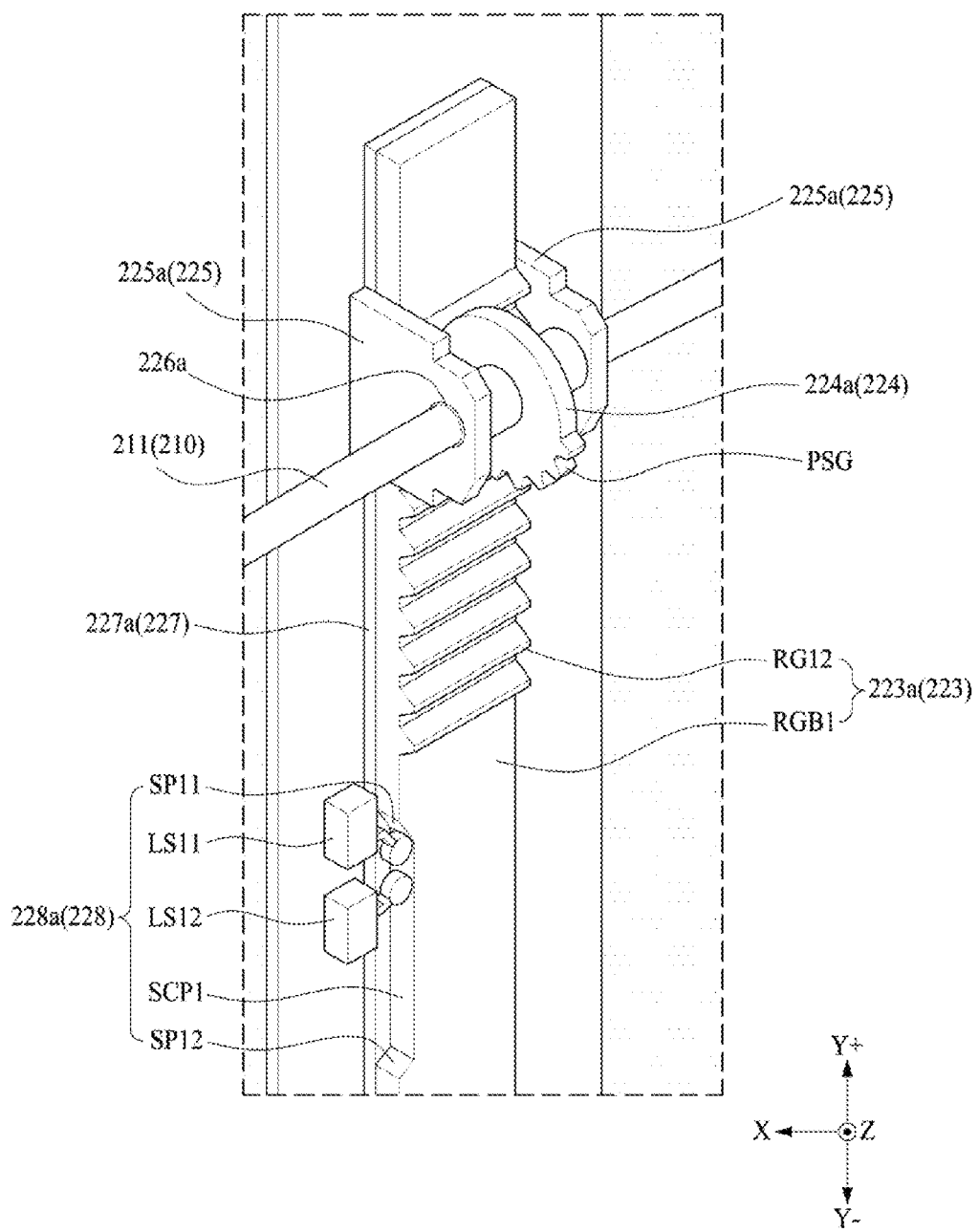
FIG. 10 is an enlarged view of region 'B2' illustrated in FIG. 6.
Figure 11:
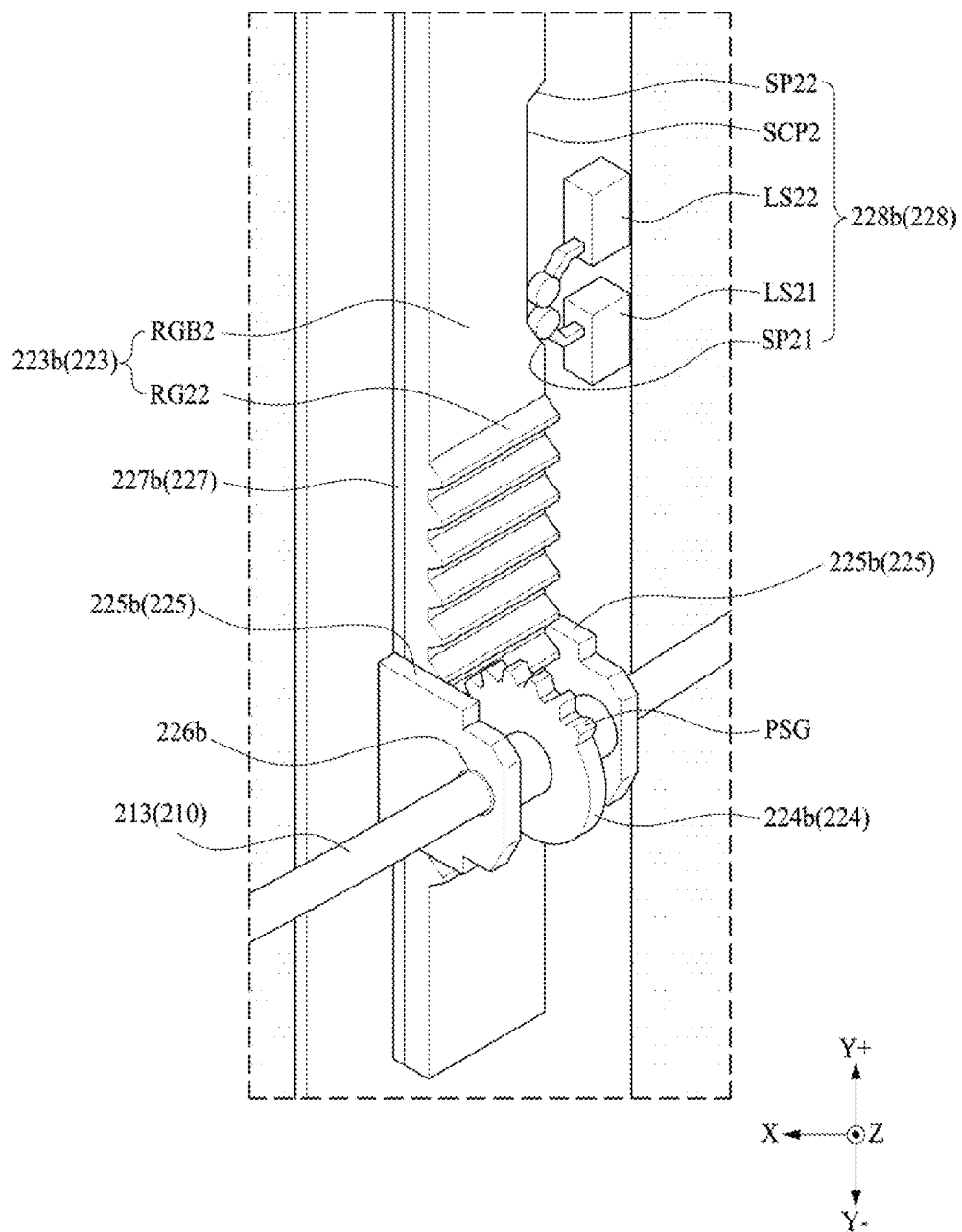
FIG. 11 is an enlarged view of region 'B3' illustrated in FIG. 6.

FIG. 9 is an enlarged view of region 'B1' illustrated in FIG. 6, FIG. 10 is an enlarged view of region 'B2' illustrated in FIG. 6, and FIG. 11 is an enlarged view of region 'B3' illustrated in FIG. 6. FIGS. 9 to 11 are diagrams for describing a driver of a curvature variation device.

With reference to FIGS. 9 to 11 in conjunction with FIG. 6, a driver 220 of a curvature variation device 200 according to an aspect of the present disclosure may include a supporting plate 221, a rotation driver 222, a rectilinear driver 223, a rotation link part 224, and a holder part 225.

The supporting plate 221 may be disposed to overlap a center portion of a rear surface of the display device 100. For example, the supporting plate 221 may be implemented to have a certain width parallel to a first direction X and a certain length parallel to a second direction Y and may be disposed on (or coupled to) the rear surface of the back cover 120 to overlap a center portion (or a length center portion) of each of the first arc member 211 and the second arc member 213. The supporting plate 221 may support the rotation driver 222, the rectilinear driver 223, the rotation link part 224, and the holder part 225.

The supporting plate 221 according to an aspect of the present disclosure may be disposed on (or coupled to) the rear surface of the back cover 120 by a plate fixing member. For example, the plate fixing member may be a screw or a bolt. As another example, the plate fixing member may include an adhesive resin, a double-sided tape, or a double-sided adhesive foam pad, which has elasticity for absorbing an impact. When the plate fixing member has elasticity, the transfer of a vibration, generated based on driving of the curvature variation device 200, to the back cover 120 may be prevented or minimized.

The rotation driver 222 may be disposed at a rear region of the display device 100 and may allow the rectilinear driver 223 to perform a rectilinear motion based on a rotational motion. For example, the rotation driver 222 may be disposed at a center portion of a rear surface of the supporting plate 221.

The rotation driver 222 according to an aspect of the present disclosure may include at least one rotary motors 222a and 222b, a rotation transfer part RTP, and a pinion gear PG.

The at least one rotary motors 222a and 222b may be disposed at a rear center region of the display device 100 and may be supported by the supporting plate 221. The at least one rotary motors 222a and 222b may provide a rotational force to the rotation transfer part RTP in response to manipulation of a user for varying a curvature of the display device 100.

The driver 220 according to the present aspect may include first and second rotary motors 222a and 222b (or a pair of rotary motors), for maintaining balance, decreasing noise, and securing a driving force (or a rotational force) margin.

The first and second rotary motors 222a and 222b may be disposed with the rotation transfer part RTP therebetween in parallel. Each of a driving shaft (or a rotational shaft) of the first rotary motor 222a and a driving shaft (or a rotational shaft) of the second rotary motor 222b may be disposed adjacent to the first arc member 211, or may be disposed to face the first arc member 211. In this case, the first and second rotary motors 222a and 222b may rotate in the same direction to each other.

The driving shaft (or the rotational shaft) of each of the first and second rotary motors 222a and 222b according to an aspect of the present disclosure may be disposed in a state which has rotated by a certain angle to face a short side of the display device 100, over the rear surface of the display device 100.

The rotation transfer part RTP may be disposed on the supporting plate 221 and may be rotatably connected to the at least one rotary motors 222a and 222b. For example, the rotation transfer part RTP may be connected between the first rotary motor 222a and the second rotary motor 222b. The rotation transfer part RTP may rotate based on rotations of the at least one rotary motors 222a and 222b or rotations of the first and second rotary motors 222a and 222b, and thus, may allow the pinion gear PG to perform a rotational motion. For example, the rotation transfer part RTP may be referred to as a gear assembly, a gear assembly body, or a deceleration gear part, but aspects of the present disclosure are not limited thereto.

The rotation transfer part RTP according to an aspect of the present disclosure may transfer a rotational motion of each of the first and second rotary motors 222a and 222b to the pinion gear PG. The rotation transfer part RTP may decrease a rotation speed of each of the first and second rotary motors 222a and 222b to rotate the pinion PG. For example, the rotation transfer part RTP may transfer, to the pinion gear PG, a rotational motion of each of the first and second rotary motors 222a and 222b in a first rotational direction (or a clockwise direction), and thus, may rotate the pinion gear PG in the first rotational direction. On the other hand, the rotation transfer part RTP may transfer, to the pinion gear PG, a rotational motion of each of the first and second rotary motors 222a and 222b in a second rotational direction (or a counterclockwise direction), and thus, may rotate the pinion gear PG in the second rotational direction.

The rotation transfer part RTP according to an aspect of the present disclosure may include a first worm W1, a first worm gear WG1, a first spur gear SG1, and a second spur gear SG2, for transferring a rotational motion of the first rotary motor 222a to the pinion gear PG.

The first worm W1 may be connected to the driving shaft of the first rotary motor 222a. The first worm W1 may rotate in the first rotational direction based on a rotation of the first rotary motor 222a performed in the first rotational direction, or may rotate in the second rotational direction based on a rotation of the first rotary motor 222a performed in the second rotational direction.

The first worm gear WG1 may be connected (or engaged) to the first worm W1 and may rotate based on a rotational motion of the first worm W1. For example, the first worm gear WG1 may rotate by one gear when the first worm W1 rotates once. With respect to a thickness direction Z of the first worm gear WG1, a rotational-shaft direction of the first worm gear WG1 may be perpendicular to a rotational-shaft direction of the first worm W1. For example, the rotational-shaft direction of the first worm W1 may be parallel to the second direction Y or may be inclined from the second direction Y, and the rotational-shaft direction of the first worm gear WG1 may be parallel to the thickness direction Z of the back cover 120.

The first worm gear WG1 according to an aspect of the present disclosure may include a double gear structure which includes a lower worm gear having a first size and an upper worm gear having a second size which is less than the first size. For example, in the first worm gear WG1 having the double gear structure, the lower worm gear may be connected (or engaged) to the first worm W1, and the upper worm gear may be connected (or engaged) to the first spur gear SG1.

The first spur gear SG1 may be connected (or engaged) to the first worm gear WG1 and may perform a rotational motion in a direction opposite to a rotational-motion direction of the first worm gear WG1. For example, the first spur gear SG1 may be connected (or engaged) between the upper worm gear of the first worm gear WG1 and the second spur gear SG2.

The second spur gear SG2 may be connected (or engaged) to the first spur gear SG1 and may be connected (or engaged) to the pinion gear PG. The second spur gear SG2 may perform a rotational motion in a direction opposite to a rotational-motion direction of the first spur gear SG1, and thus, may allow the pinion gear PG to perform a rotational motion.

The second spur gear SG2 according to an aspect of the present disclosure may include a double gear structure which includes a lower spur gear having a first size and an upper spur gear having a second size which is greater than the first size. For example, in the second spur gear SG2 having the double gear structure, the lower spur gear may be connected (or engaged) to the pinion gear PG, and the upper spur gear may be connected (or engaged) to the first spur gear SG1.

The rotation transfer part RTP according to an aspect of the present disclosure may further include a second worm W2, a second worm gear WG2, a third spur gear SG3, and a fourth spur gear SG4, for transferring a rotational motion of the second rotary motor 222b to the pinion gear PG.

The second worm W2 may be connected to the driving shaft of the second rotary motor 222b. The second worm W2 may rotate in the first rotational direction based on a rotation of the second rotary motor 222b performed in the first rotational direction, or may rotate in the second rotational direction based on a rotation of the second rotary motor 222b performed in the second rotational direction.

The second worm gear WG2 may be connected (or engaged) to the second worm W2 and may rotate based on a rotational motion of the second worm W2. For example, the second worm gear WG2 may rotate by one gear when the second worm W2 rotates once. With respect to a thickness direction Z of the second worm gear WG2, a rotational-shaft direction of the second worm gear WG2 may be perpendicular to a rotational-shaft direction of the second worm W2. For example, the rotational-shaft direction of the second worm W2 may be parallel to the second direction Y or may be inclined from the second direction Y, and the rotational-shaft direction of the second worm gear WG2 may be parallel to the thickness direction Z of the back cover 120.

The second worm gear WG2 according to an aspect of the present disclosure may include a double gear structure which includes a lower worm gear having a first size and an upper worm gear having a second size which is less than the first size. For example, in the second worm gear WG2 having the double gear structure, the lower worm gear may be connected (or engaged) to the second worm W2, and the upper worm gear may be connected (or engaged) to the third spur gear SG3.

The third spur gear SG3 may be connected (or engaged) to the second worm gear WG2 and may perform a rotational motion in a direction opposite to a rotational-motion direction of the second worm gear WG2. For example, the third spur gear SG3 may be connected (or engaged) between the upper worm gear of the second worm gear WG2 and the fourth spur gear SG4.

The fourth spur gear SG4 may be connected (or engaged) to the third spur gear SG3 and may be connected (or engaged) to the pinion gear PG. The fourth spur gear SG4 may perform a rotational motion in a direction opposite to a rotational-motion direction of the third spur gear SG3, and thus, may allow the pinion gear PG to perform a rotational motion.

The fourth spur gear SG4 according to an aspect of the present disclosure may include a double gear structure which includes a lower spur gear having a first size and an upper spur gear having a second size which is greater than the first size. For example, in the fourth spur gear SG4 having the double gear structure, the lower spur gear may be connected (or engaged) to the pinion gear PG, and the upper spur gear may be connected (or engaged) to the third spur gear SG3.

The pinion gear PG may perform a rotational motion based on a rotational motion transferred by the rotation transfer part RTP, and thus, may allow the rectilinear driver 223 to perform a rectilinear motion.

The pinion gear PG according to an aspect of the present disclosure may include a double gear structure which includes a first pinion gear PG1 having a first size and a second pinion gear PG2 having a second size which is greater than the first size.

The first pinion gear PG1 may be connected (or engaged) to the rectilinear driver 223. The first pinion gear PG1 may perform a rotational motion based on a rotational motion transferred by the rotation transfer part RTP, and thus, may allow the rectilinear driver 223 to perform a rectilinear motion.

The second pinion gear PG2 may be connected (or engaged) to the rotation transfer part RTP. The second pinion gear PG2 may be connected (or engaged) to the second spur gear SG2 of the rotation transfer part RTP. For example, the second pinion gear PG2 may be connected (or engaged) to a lower spur gear of the second spur gear SG2 of the rotation transfer part RTP. The second pinion gear PG2 may be additionally connected (or engaged) to the fourth spur gear SG4 of the rotation transfer part RTP. For example, the second pinion gear PG2 may be connected (or engaged) to a lower spur gear of the fourth spur gear SG4 of the rotation transfer part RTP. The second pinion gear PG2 may perform a rotational motion based on a rotational motion of the second spur gear SG2 of the rotation transfer part RTP, or may perform a rotational motion based on a rotational motion of each of the second spur gear SG2 and the fourth spur gear SG4 of the rotation transfer part RTP.

The rectilinear driver 223 may perform a rectilinear motion based on a rotational motion of the rotation driver 222, and thus, may rotate the rotation link part 224.

The rectilinear driver 223 according to an aspect of the present disclosure may include a first rack gear part 223a and a second rack gear part 223b.

The first rack gear part 223a may perform a rectilinear motion in the second direction Y in the first rear region RA1 of the display device 100 based on a rotational motion of the pinion gear PG included in the rotation driver 222 to rotate the rotation link part 224, and thus, may rotate the first arc member 211. For example, the first rack gear part 223a may perform a rectilinear motion in a first rectilinear direction Y+ of the second direction Y based on a rotational motion of the pinion gear PG performed in the first rotational direction. On the other hand, the first rack gear part 223a may perform a rectilinear motion in a second rectilinear direction Y−, which is opposite to the first rectilinear direction Y+, of the second direction Y based on a rotational motion of the pinion gear PG performed in the second rotational direction.

The first rack gear part 223a according to an aspect of the present disclosure may include a first rack gear bar RGB1, a 1-1$^{th}$ rack gear RG11, and a 1-2$^{th}$ rack gear RG12.

The first rack gear bar RGB1 may be disposed at the supporting plate 221 disposed in the first rear region RA1 of the display device 100 to be slid (or a rectilinear motion) in the second direction Y.

The 1-1$^{th}$ rack gear RG11 may protrude (or extend) from one side (or a lower portion) of the first rack gear bar RGB1 and may be connected (or engaged) to the pinion gear PG. For example, the 1-1$^{th}$ rack gear RG11 may protrude (or extend) in the second direction Y from the one side (or the lower portion) of the first rack gear bar RGB1 to overlap the second pinion gear PG2 of the pinion gear PG and may be connected (or engaged) to the first pinion gear PG1 of the pinion gear PG.

The 1-1$^{th}$ rack gear RG11 according to an aspect of the present disclosure may be provided on an inner surface of a first protrusion portion which protrudes (or extends) from the one side (or the lower portion) of the first rack gear bar RGB1 and may be connected (or engaged) to one surface of the first pinion gear PG1 of the pinion gear PG.

The 1-2$^{th}$ rack gear RG12 may be provided at the other (or upper) periphery portion of the first rack gear bar RGB1 and may be connected (or engaged) to the rotation link part 224. For example, the 1-2$^{th}$ rack gear RG12 may be provided at the other (or upper) periphery portion of the first rack gear bar RGB1 to have the predetermined pitch in the second direction Y and may be connected (or engaged) to the rotation link part 224. The 1-2$^{th}$ rack gear RG12 may allow the rotation link part 224 to perform a rotational motion based on a rectilinear motion of the first rack gear bar RGB1.

The second rack gear part 223b may perform a rectilinear motion in a direction opposite to the first rack gear part 223a in the second direction Y in the second rear region RA2 of the display device 100 based on a rotational motion of the pinion gear PG included in the rotation driver 222, and thus, may rotate the second arc member 213.

The second rack gear part 223b may be disposed in parallel with the first rack gear part 223a with the pinion gear PG therebetween. The second rack gear part 223b may perform a rectilinear motion in a direction opposite to the first rack gear part 223a based on a rotational motion of the pinion gear PG. For example, the second rack gear part 223b may perform a rectilinear motion in the second rectilinear direction Y− of the second direction Y based on a rotational motion of the pinion gear PG performed in the first rotational direction. On the other hand, the second rack gear part 223b may perform a rectilinear motion in the first rectilinear direction Y+ of the second direction Y based on a rotational motion of the pinion gear PG performed in the second rotational direction.

The second rack gear part 223b according to an aspect of the present disclosure may include a second rack gear bar RGB2, a 2-1$^{th}$ rack gear RG21, and a 2-2$^{th}$ rack gear RG22.

The second rack gear bar RGB2 may be disposed on the supporting plate 221 disposed in the second rear region RA2 of the display device 100 to be slid (or a rectilinear motion) in the second direction Y.

The 2-1$^{th}$ rack gear RG21 may protrude (or extend) from the other side (or an upper portion) of the second rack gear bar RGB2 and may be connected (or engaged) to the pinion gear PG. For example, the 2-1$^{th}$ rack gear RG21 may protrude (or extend) in the second direction Y from the other side (or the upper portion) of the second rack gear bar RGB2 to overlap the second pinion gear PG2 of the pinion gear PG and may be connected (or engaged) to the first pinion gear PG1 of the pinion gear PG.

The 2-1$^{th}$ rack gear RG21 according to an aspect of the present disclosure may be provided on an inner surface of a second protrusion portion which protrudes (or extends) from the other side (or the upper portion) of the second rack gear bar RGB2 and may be connected (or engaged) to one surface of the first pinion gear PG1 of the pinion gear PG.

The 2-2$^{th}$ rack gear RG22 may be provided at one (or lower) periphery portion of the second rack gear bar RGB2 and may be connected (or engaged) to the rotation link part 224. For example, the 2-2$^{th}$ rack gear RG22 may be provided at the one (or lower) periphery portion of the second rack gear bar RGB2 to have a predetermined pitch in the second direction Y and may be connected (or engaged) to the rotation link part 224. The 2-2$^{th}$ rack gear RG22 may allow the rotation link part 224 to perform a rotational motion based on a rectilinear motion of the second rack gear bar RGB2.

The first pinion gear PG1 of the pinion gear PG may be connected (or engaged) between the first rack gear part 223a and the second rack gear part 223b. For example, the first pinion gear PG1 of the pinion gear PG may be connected (or engaged) between the 1-1$^{th}$ rack gear RG11 of the first rack gear part 223a and the 2-1$^{th}$ rack gear RG21 of the second rack gear part 223b. Therefore, the first rack gear part 223a and the second rack gear part 223b may respectively perform a rectilinear motion in rectilinear directions Y+ and Y− opposite to each other based on a rotational motion of the first pinion gear PG1 of the pinion gear PG.

The rotation link part 224 may perform a rotational motion based on a rectilinear motion of the rectilinear driver 223 to rotate the arc member 210. The rotation link part 224 may be rotatably fixed to a center portion of the arc member 210 and may perform a rotational motion based on a rectilinear motion of the rectilinear driver 223 to rotate the arc member 210.

The rotation link part 224 according to an aspect of the present disclosure may include a first rotation link gear 224a and a second rotation link gear 224b.

The first rotation link gear 224a may be fixed to a center portion of the first arc member 211 of the arc member 210 and may perform a rotational motion based on a rectilinear motion of the first rack gear part 223a of the rectilinear driver 223 to rotate the first arc member 211. For example, the first rotation link gear 224a may rotate in the first rotational direction based on a rectilinear motion of the first rack gear part 223a performed in the first rectilinear direction Y+, and thus, may rotate the first arc member 211 by 90 degrees in the first rotational direction. On the other hand, the first rotation link gear 224a may rotate in the second rotational direction based on a rectilinear motion of the first rack gear part 223a performed in the second rectilinear direction Y−, and thus, may rotate the first arc member 211 by 90 degrees in the second rotational direction. For example, the first rear region RA1 of the display device 100 may be changed to a curved shape having a curvature which is greater than 0 (zero), based on a rotation of the first arc member 211 performed in the first rotational direction based on a rotation of the first rotation link gear 224a performed in the first rotational direction, and in a state where the first arc member 211 has rotated in the first rotational direction, the first rear region RA1 of the display device 100 may be changed or restored to a flat shape having a curvature of 0

(zero) based on a rotation of the first arc member 211 performed in the second rotational direction based on a rotation of the first rotation link gear 224a performed in the second rotational direction.

The first rotation link gear 224a according to an aspect of the present disclosure may include a plurality of pinion spur gears PSG connected (or engaged) to the first rack gear part 223a. For example, the first rotation link gear 224a may include the plurality of pinion spur gears PSG implemented on a circumference surface corresponding to half or less of a circumference surface thereof, and thus, may rotate within a ±90-degree range based on a rectilinear motion of the first rack gear part 223a.

The second rotation link gear 224b may be fixed to a center portion of the second arc member 213 of the arc member 210 and may perform a rotational motion based on a rectilinear motion of the second rack gear part 223b of the rectilinear driver 223 to rotate the second arc member 213. For example, the second rotation link gear 224b may rotate in the second rotational direction based on a rectilinear motion of the second rack gear part 223b performed in the second rectilinear direction Y−, and thus, may rotate the second arc member 213 by 90 degrees in the second rotational direction. On the other hand, the second rotation link gear 224b may rotate in the first rotational direction based on a rectilinear motion of the second rack gear part 223b performed in the first rectilinear direction Y+, and thus, may rotate the second arc member 213 by 90 degrees in the first rotational direction. For example, the second rear region RA2 of the display device 100 may be changed to a curved shape having a curvature which is greater than 0 (zero), based on a rotation of the second arc member 213 performed in the second rotational direction based on a rotation of the second rotation link gear 224b performed in the second rotational direction, and in a state where the second arc member 213 has rotated in the second rotational direction, the second rear region RA2 of the display device 100 may be changed or restored to a flat shape having a curvature of 0 (zero) based on a rotation of the second arc member 213 performed in the first rotational direction based on a rotation of the second rotation link gear 224b performed in the first rotational direction.

The second rotation link gear 224b according to an aspect of the present disclosure may include a plurality of pinion spur gears PSG connected (or engaged) to the second rack gear part 223b. For example, the second rotation link gear 224b may include the plurality of pinion spur gears PSG implemented on a circumference surface corresponding to half or less of a circumference surface thereof, and thus, may rotate within a ±90-degree range based on a rectilinear motion of the second rack gear part 223b.

The holder part 225 may be disposed at the supporting plate 221 and may rotatably support the arc member 210. For example, the holder part 225 may be disposed at the supporting plate 221 and may rotatably support the first arc member 211 and the second arc member 213 of the arc member 210.

The holder part 225 according to an aspect of the present disclosure may include a pair of first holders 225a and a pair of second holders 225b.

The pair of first holders 225a may be disposed in parallel at the supporting plate 221 with each of the first rack gear part 223a and the first rotation link gear 224a therebetween and may rotatably support the first arc member 211 of the arc member 210. For example, the first arc member 211 may pass through each of the pair of first holders 225a and may be rotatably supported by each of the pair of first holders 225a.

The pair of second holders 225b may be disposed in parallel at the supporting plate 221 with each of the second rack gear part 223b and the second rotation link gear 224b therebetween and may rotatably support the second arc member 213 of the arc member 210. For example, the second arc member 213 may pass through each of the pair of second holders 225b and may be rotatably supported by each of the pair of second holders 225b.

The holder part 225 according to an aspect of the present disclosure may further include a first bearing 226a disposed between each of the pair of first holders 225a and the first arc member 211 and a second bearing 226b disposed between each of the pair of second holders 225b and the second arc member 213.

The driver 220 of the curvature variation device 200 according to an aspect of the present disclosure may further include a guide rail part 227.

The guide rail part 227 may be disposed between the supporting plate 221 and the rectilinear driver 223 and may guide a rectilinear motion of the rectilinear driver 223.

The guide rail part 227 according to an aspect of the present disclosure may include a first guide rail 227a disposed between the supporting plate 221 and the first rack gear part 223a of the rectilinear driver 223 and a second guide rail 227b disposed between the supporting plate 221 and the second rack gear part 223b of the rectilinear driver 223.

The first guide rail 227a may guide sliding of the first rack gear bar RGB1 of the first rack gear part 223a. For example, the first guide rail 227a may be disposed on the supporting plate 221 to include a guide groove. In this case, the first rack gear bar RGB1 of the first rack gear part 223a may include a sliding projection which is slidable inserted into the guide groove of the first guide rail 227a. Therefore, the first rack gear part 223a may perform a rectilinear motion on the first guide rail 227a based on a rotation of the pinion gear PG.

The second guide rail 227b may guide sliding of the second rack gear bar RGB2 of the second rack gear part 223b. For example, the second guide rail 227b may be disposed on the supporting plate 221 to include a guide groove. In this case, the second rack gear bar RGB2 of the second rack gear part 223b may include a sliding projection which is slidably inserted into the guide groove of the second guide rail 227b. Therefore, the second rack gear part 223b may perform a rectilinear motion on the second guide rail 227b based on a rotation of the pinion gear PG.

The driver 220 of the curvature variation device 200 according to an aspect of the present disclosure may further include a limit switch portion 228.

The limit switch portion 228 may be disposed on the supporting plate 221 adjacent to the rectilinear driver 223 and may limit a distance of a rectilinear motion of the rectilinear driver 223. For example, the limit switch portion 228 may be implemented to limit a maximum distance of a rectilinear motion of the rectilinear driver 223 based on a physical contact with the rectilinear driver 223.

The limit switch portion 228 according to an aspect may include a first limit switch portion 228a and a second limit switch portion 228b.

The first limit switch portion 228a may limit a maximum rectilinear motion distance of the first rack gear part 223a performing a rectilinear motion along the second direction Y. The first limit switch portion 228a may limit a maximum rotational angle of the first arc member 211, or may limit a maximum curvature of the display device 100.

The first limit switch portion 228a according to an aspect of the present disclosure may include a first switch contact portion SCP1 formed on an outer sidewall of the first rack gear part 223a, a 1-1$^{th}$ limit switch LS11 contacting one side of the first switch contact portion SCP1, and a 1-2$^{th}$ limit switch LS12 contacting the other side of the first switch contact portion SCP1.

The first switch contact portion SCP1 may include a concave portion (or a convex portion) formed on an outer sidewall of the first rack gear bar RGB1 adjacent to the 1-2$^{th}$ rack gear RG12 of the first rack gear part 223a. For example, the first switch contact portion SCP1 may be concavely formed on the outer sidewall of the first rack gear bar RGB1 to have a trapezoid structure.

One side of the first switch contact portion SCP1 may be formed to be inclined by a certain angle from the outer sidewall of the first rack gear bar RGB1. For example, the one side of the first switch contact portion SCP1 may be a 1-1$^{th}$ stopper SP11 which is formed to include an inclined surface and contacts the 1-1$^{th}$ limit switch LS11 based on a rectilinear motion Y– of the first rack gear bar RGB1.

The other side of the first switch contact portion SCP1 may be formed to be inclined by a certain angle from the outer sidewall of the first rack gear bar RGB1 spaced apart from the one side of the first switch contact portion SCP1 in the second direction Y. For example, the other side of the first switch contact portion SCP1 may be a 1-2$^{th}$ stopper SP12 which is formed to include an inclined surface and contacts the 1-2$^{th}$ limit switch LS12 based on a rectilinear motion Y+ of the first rack gear bar RGB1.

When the 1-1$^{th}$ limit switch LS11 physically contacts the 1-1$^{th}$ stopper SP11 provided at the first rack gear part 223a which performs a rectilinear motion along the second rectilinear direction Y–, the 1-1$^{th}$ limit switch LS11 may generate a 1-1$^{th}$ limit signal and may provide the 1-1$^{th}$ limit signal to the curvature variation control circuit. The curvature variation control circuit may stop a rotation of the rotary motors 222a and 222b in response to the 1-1$^{th}$ limit signal provided from the 1-1$^{th}$ limit switch LS11.

When the 1-2$^{th}$ limit switch LS12 physically contacts the 1-2$^{th}$ stopper SP12 provided at the first rack gear part 223a which performs a rectilinear motion along the first rectilinear direction Y+, the 1-2$^{th}$ limit switch LS12 may generate a 1-2$^{th}$ limit signal and may provide the 1-2$^{th}$ limit signal to the curvature variation control circuit. The curvature variation control circuit may stop a rotation of the rotary motors 222a and 222b in response to the 1-2$^{th}$ limit signal provided from the 1-2$^{th}$ limit switch LS12.

The second limit switch portion 228b may limit a maximum rectilinear motion distance of the second rack gear part 223b performing a rectilinear motion along the second direction Y. The second limit switch portion 228b may limit a maximum rotational angle of the second arc member 213, or may limit a maximum curvature of the display device 100.

The second limit switch portion 228b according to an aspect of the present disclosure may include a second switch contact portion SCP2 formed on an outer sidewall of the second rack gear part 223b, a 2-1$^{th}$ limit switch LS21 contacting one side of the second switch contact portion SCP2, and a 2-2$^{th}$ limit switch LS22 contacting the other side of the second switch contact portion SCP2.

The second switch contact portion SCP2 may include a concave portion (or a convex portion) formed on an outer sidewall of the second rack gear bar RGB2 adjacent to the 2-2$^{th}$ rack gear RG22 of the second rack gear part 223b. For example, the second switch contact portion SCP2 may be concavely formed on the outer sidewall of the second rack gear bar RGB2 to have a trapezoid structure.

One side of the second switch contact portion SCP2 may be formed to be inclined by a certain angle from the outer sidewall of the second rack gear bar RGB2. For example, the one side of the second switch contact portion SCP2 may be a 2-1$^{th}$ stopper SP21 which is formed to include an inclined surface and contacts the 2-1$^{th}$ limit switch LS21 based on a rectilinear motion Y– of the second rack gear bar RGB2.

The other side of the second switch contact portion SCP2 may be formed to be inclined by a certain angle from the outer sidewall of the second rack gear bar RGB2 spaced apart from the one side of the second switch contact portion SCP2 in the second direction Y. For example, the other side of the second switch contact portion SCP2 may be a 2-2$^{th}$ stopper SP22 which is formed to include an inclined surface and contacts the 2-2$^{th}$ limit switch LS22 based on a rectilinear motion Y+ of the second rack gear bar RGB2.

When the 2-1$^{th}$ limit switch LS21 physically contacts the 2-1$^{th}$ stopper SP21 provided at the second rack gear part 223b which performs a rectilinear motion along the first rectilinear direction Y+, the 2-1$^{th}$ limit switch LS21 may generate a 2-1$^{th}$ limit signal and may provide the 2-1$^{th}$ limit signal to the curvature variation control circuit. The curvature variation control circuit may stop a rotation of the rotary motors 222a and 222b in response to the 2-1$^{th}$ limit signal provided from the 2-1$^{th}$ limit switch LS11.

When the 2-2$^{th}$ limit switch LS22 physically contacts the 2-2$^{th}$ stopper SP22 provided at the second rack gear part 223b which performs a rectilinear motion along the second rectilinear direction Y–, the 2-2$^{th}$ limit switch LS22 may generate a 2-2$^{th}$ limit signal and may provide the 2-2$^{th}$ limit signal to the curvature variation control circuit. The curvature variation control circuit may stop a rotation of the rotary motors 222a and 222b in response to the 2-2$^{th}$ limit signal provided from the 2-2$^{th}$ limit switch LS22.

The driver 220 of the curvature variation device 200 according to an aspect of the present disclosure may further include a sliding guider part 229.

The sliding guider part 229 may be implemented to perform a rectilinear motion in the second direction Y without the partial detachment of the rectilinear driver 223.

The sliding guider part 229 according to an aspect of the present disclosure may include a pair of first sliding guiders 229a and a pair of second sliding guiders 229b.

The pair of first sliding guiders 229a may be disposed at the supporting plate 221 with the first rack gear part 223a therebetween. Each of the pair of first sliding guiders 229a may cover a periphery portion of a top surface and an outer sidewall of the first rack gear part 223a. For example, each of the pair of first sliding guiders 229a may include a sidewall portion covering the outer sidewall of the first rack gear part 223a and a front portion covering the periphery portion of the top surface of the first rack gear part 223a. The pair of first sliding guiders 229a may guide a rectilinear motion of the first rack gear part 223a through the sidewall portion thereof and may prevent the partial detachment of the first rack gear part 223a performing a rectilinear motion through the front portion thereof.

The pair of second sliding guiders 229b may be disposed on the supporting plate 221 with the second rack gear part 223b therebetween. Each of the pair of second sliding guiders 229b may cover a periphery portion of a top surface and an outer sidewall of the second rack gear part 223b. For example, each of the pair of second sliding guiders 229b may include a sidewall portion covering the outer sidewall of the second rack gear part 223b and a front portion covering the periphery portion of the top surface of the second rack gear part 223b. The pair of second sliding guiders 229b may guide a rectilinear motion of the second rack gear part 223b through the sidewall portion thereof and may prevent the partial detachment of the second rack gear part 223b performing a rectilinear motion through the front portion thereof.

According to another aspect of the present disclosure, the curvature variation device 200 may further include a gear box cover 290.

The gear box cover 290 may be coupled to the supporting plate 221 to cover a center portion of the driver 220. The gear box cover 290 may be supported by or hung at a post of a stand.

Figure 12A:
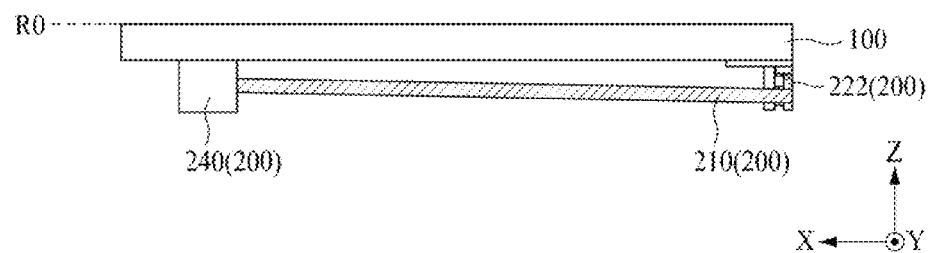
FIG. 12A is a cross-sectional view illustrating a flat shape of a display apparatus according to an aspect of the present disclosure.
Figure 12B:
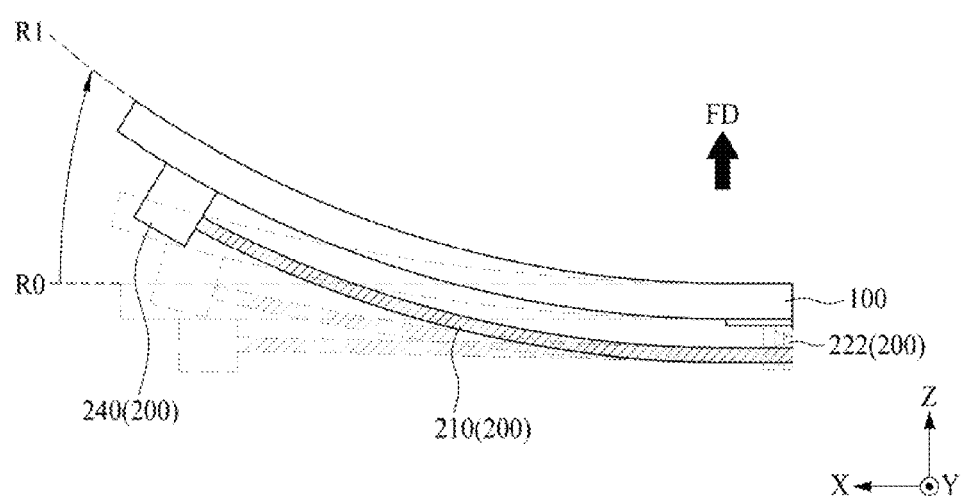
FIG. 12B is a cross-sectional view illustrating a curvature variation state of a display apparatus according to an aspect of the present disclosure.

FIG. 12A is a cross-sectional view illustrating a flat shape of a display apparatus according to an aspect of the present disclosure, and FIG. 12B is a cross-sectional view illustrating a curvature variation state of a display apparatus according to an aspect of the present disclosure.

With reference to FIG. 12A, in a display apparatus according to an aspect of the present disclosure, a display device 100 may be disposed (or implemented) in a flat shape having a curvature R0 of 0 (zero). For example, as illustrated in FIGS. 9 to 11, the rotary motors 222a and 222b of the curvature variation device 200 may stop a rotational motion based on a 1-1$^{th}$ limit signal of the first limit switch part 228a and a 2-1$^{th}$ limit signal of the second limit switch part 228b.

In response to manipulation of a user, as illustrated in FIGS. 1, 2, and 12B, the display device 100 having a flat shape may be disposed (or implemented) in a curved shape having a curvature R1 other than 0 (zero). For example, the arc member 210 of the curvature variation device 200 may rotate by a maximum of 90 degrees at a fixed position based on rotational motions of the rotary motors 222a and 222b based on manipulation of the user in a state which is laid in parallel with the rear surface of the display device 100 and thus may stand in the thickness direction Z of the display device 100, and moreover, a pressing force generated in an end of the arc member 210 standing through rotation may be applied to the display device 100 through the fixing bracket 240, whereby both side portions of the display device 100 may protrude in a forward direction FD with respect to a center portion of the display apparatus. As a result, the both side portions of the display device 100 may protrude in the forward direction FD with respect to the center portion of the display apparatus based on a rotational motion of the arc member 210 standing in the thickness direction Z of the display device 100, and thus, the display device 100 may be changed to a curved shape having the curvature R1 other than 0 (zero). For example, as illustrated in FIGS. 9 to 11, the rotary motors 222a and 222b of the curvature variation device 200 which changes a shape of the display device 100 to a curved shape may stop a rotational motion based on a 1-2$^{th}$ limit signal of the first limit switch part 228a and a 2-2$^{th}$ limit signal of the second limit switch part 228b.

On the other hand, the arc member 210 of the curvature variation device 200 may rotate by a maximum of 90 degrees at a fixed position based on rotational motions of the rotary motors 222a and 222b based on manipulation of the user in a state which stands in the thickness direction Z of the display device 100, and thus, may be laid in parallel with the rear surface of the display device 100, whereby the display device 100 may be disposed (or implemented) in a flat shape having a curvature R0 of 0 (zero) one basis of an elastic restoring force.

Figure 13:
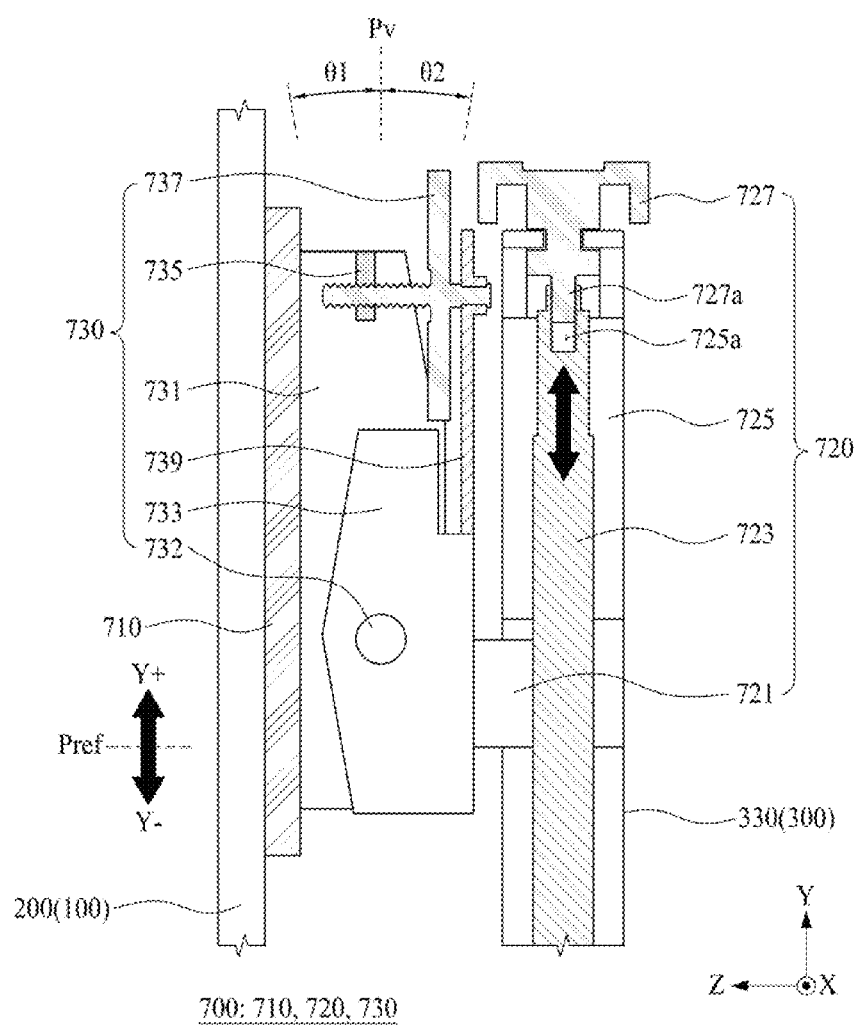
FIG. 13 is a diagram for describing a position control device in a display apparatus according to an aspect of the present disclosure.

FIG. 13 is a diagram for describing a position control device in a display apparatus according to an aspect of the present disclosure.

With reference to FIG. 13, in the display apparatus according to an aspect of the present disclosure, a position control device 700 according to an aspect may be implemented to raise (Y+) or lower (Y−) a height of the display device 100 mounted on the stand 300.

The position control device (or a position control unit) 700 may include a supporting bracket 710 and a display elevation device 720.

The supporting bracket 710 may be coupled to the rear surface of the display device 100. The supporting bracket 710 according to an aspect may be coupled to the gearbox cover 290 of the curvature variation device 200 disposed at the rear surface of the display device 100 illustrated in FIGS. 5, 6, and 9. For example, the supporting bracket 710 may be coupled to the gear box cover 290 by a fastening member such as a screw or a bolt, or may support the gear box cover 290.

The display elevation device (or a display elevation unit) 720 may be disposed at the post 330 of the stand 300 and may be connected to the supporting bracket 710. The display elevation device 720 may raise (Y+) or lower (Y−) the supporting bracket 710 based on manipulation of a user performed on an elevation control knob 727 to adjust a height of the display device 100 mounted on the supporting bracket 710. For example, the display elevation device 720 may elevate (or lift) the supporting bracket 710 using a ball screw manner to elevate (or raise or lower) a height of the display device 100 at a reference position Pref.

The display elevation device 720 according to an aspect may include a connection frame 721, an elevation shaft 723, an elevation guider 725, and an elevation control knob 727.

The connection frame 721 may be disposed in the thickness direction Z of the display device 100, and may pass through an inner sidewall of the post 330 of the stand 300 and may be coupled to the supporting bracket 710.

The elevation shaft 723 may be elevatedly disposed inside the post 330 in parallel with the second direction Y to be raised and lowered and may be coupled to the connection frame 721.

The elevation guider 725 may be disposed in the post 330 in parallel with the second direction Y and may guide elevating (or the raising or lowering) of the elevation shaft 723. For example, the elevation guider 725 may include a guide rail which guides the elevating (or raising or lowering) of the elevation shaft 723. In this case, the elevation shaft 723 may include a guide groove into which the guide rail of the elevation guider 725 is inserted and may be elevated (or raised or lowered) in the second direction Y along the guide rail of the elevation guider 725.

The elevation control knob 727 may be rotatably disposed on a top surface of the post 330 and may be connected to an upper portion of the elevation shaft 723. The elevation control knob 727 may rotate in the first rotational direction to raise (Y+) the elevation shaft 723 based on manipulation of a user and may rotate in the second rotational direction to lower (Y−) the elevation shaft 723 based on manipulation of the user. To this end, the elevation control knob 727 may include a screw thread portion 727a, and the elevation shaft 723 may include a screw hole 725a which is disposed at an upper portion thereof and is connected (or engaged) to the screw thread portion 727a of the elevation control knob 727.

The screw thread portion 727a of the elevation control knob 727 may rotate based on a rotation of the elevation control knob 727 to allow the elevation shaft 723 to perform a rectilinear motion in the second direction Y. For example, when the elevation control knob 727 rotates in the first rotational direction, the screw thread portion 727a may rotate in the first rotational direction to rectilinearly move (or raise) the elevation shaft 723 in the second direction Y. On the other hand, when the elevation control knob 727 rotates in the second rotational direction, the screw thread portion 727a may rotate in the second rotational direction to rectilinearly move (or lower) the elevation shaft 723 in the second direction Y.

The position control device 700 according to an aspect of the present disclosure may be implemented to tilt the display device 100, having a vertical state Pv which is mounted on the stand 300, at a certain angle (θ1, θ2). To this end, the position control device 700 may further include a display tilt device 730.

The display tilt device 730 may be disposed between the supporting bracket 710 and the display elevation device 720 and may tilt the display device 100 at a certain angle (θ1, θ2) based on manipulation of the user.

The display tilt device 730 according to an aspect may include a tilt housing 731, a supporting frame 733, a ball nut 735, a tilt control knob 737, and a knob supporting part 739.

The tilt housing 731 may be coupled to a rear surface of the supporting bracket 710. For example, the tilt housing 731 may be coupled to the rear surface of the supporting bracket 710, between the supporting bracket 710 and the post 330 of the stand 300.

The supporting frame 733 may be supported by (or coupled to) the connection frame 721 of the display elevation device 720 and may rotatably support the tilt housing 731. The tilt housing 731 may be rotatably supported by the supporting frame 733 with respect to a tilt shaft 732.

The ball nut 735 (or a ball screw nut) may be fixed to an internal upper portion of the tilt housing 731.

The tilt control knob 737 may be disposed on a rear surface of the tilt housing 731 and may be connected (or engaged) to the ball nut 735. The tilt control knob 737 may include a ball screw which passes through the rear surface of the tilt housing 731 and is connected (or engaged) to the ball nut 735.

The tilt control knob 737 may rotate in the first rotational direction based on manipulation of the user to forward move the ball nut 735 in the thickness direction Z of the display device 100, and thus, may tilt the tilt housing 731 by a first angle θ1 with respect to the tilt shaft 732 corresponding to a rotational shaft. For example, in the display device 100 having the vertical state Pv, when the tilt control knob 737 rotates in the first rotational direction, an upper portion, greater than a lower portion, of the display device 100 may protrude in a forward direction with respect to the display apparatus, and thus, the display device 100 may be tilted by the first angle θ1 from the vertical state Pv.

On the other hand, the tilt control knob 737 may rotate in the second rotational direction based on manipulation of the user to backward move the ball nut 735 in the thickness direction Z of the display device 100, and thus, may restore the tilt housing 731 from the vertical state Pv to an original state or may tilt the tilt housing 731 by a second angle θ2, with respect to the tilt shaft 732 corresponding to a rotational shaft. For example, in the display device 100 having the vertical state Pv, when the tilt control knob 737 rotates in the second rotational direction, the lower portion, greater than the upper portion, of the display device 100 may protrude in the forward direction with respect to the display apparatus, and thus, the display device 100 may be tilted by the second angle θ2 from the vertical state Pv.

The knob supporting part 739 may be coupled to an upper portion of the supporting frame 733 or may protrude from the upper portion of the supporting frame 733 and may rotatably support the tilt control knob 737. The knob supporting part 739 may rotatably support a protrusion shaft protruding from a rear surface of the tilt control knob 737. Accordingly, the tilt control knob 737 may not perform a rectilinear motion but may perform a rotational motion at a fixed position with respect to the knob supporting part 739 corresponding to a supporter or a prop, thereby allowing the ball nut 735 to perform a rectilinear motion.

As described above, in a display apparatus including the position control device 700 according to the present aspect, a height and an angle of the display device 100 may be controlled based on manipulation of a user, thereby providing a viewing height and a viewing angle suitable for a preference of the user.

Figure 14:
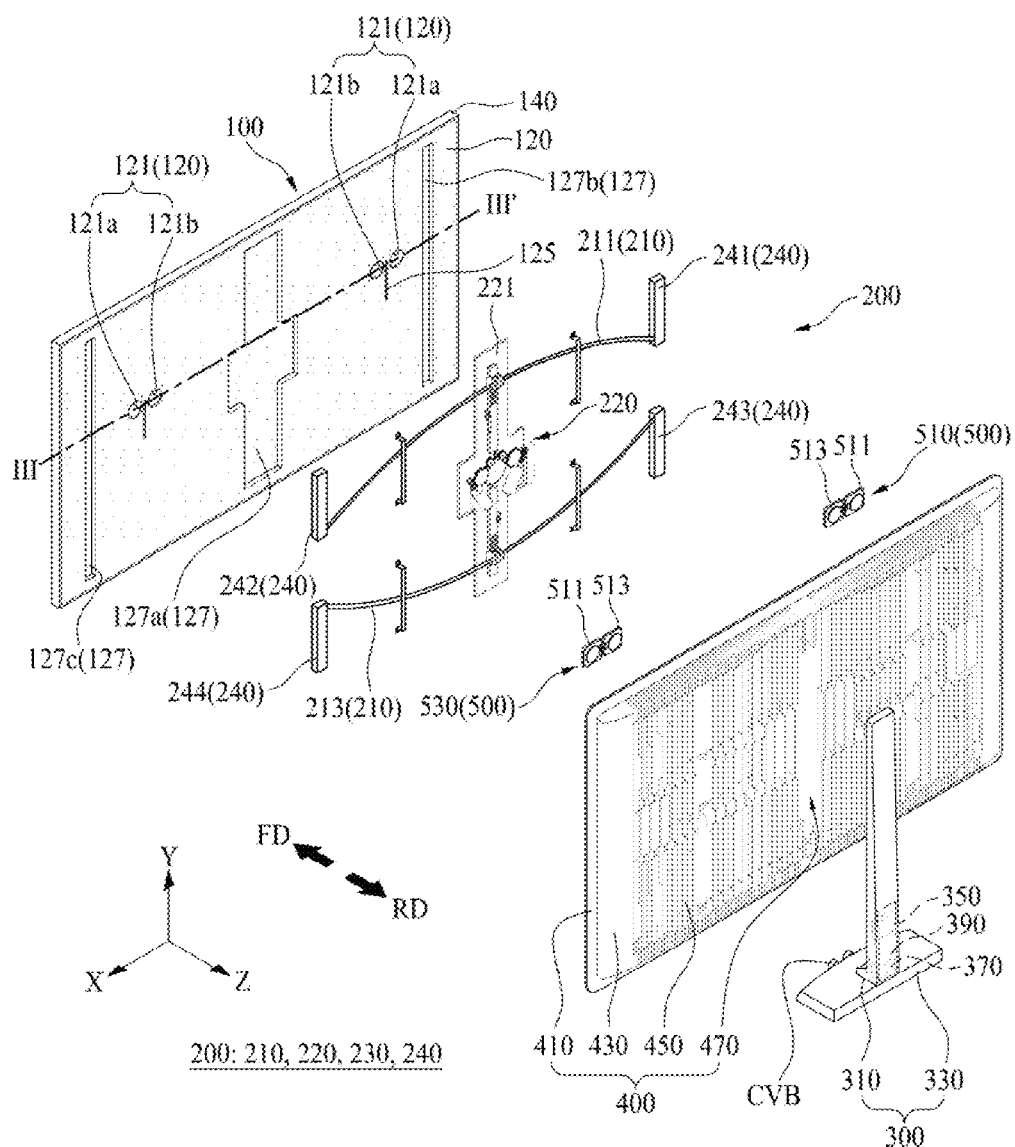
FIG. 14 is an exploded perspective view illustrating a display apparatus according to another aspect of the present disclosure.
Figure 15:
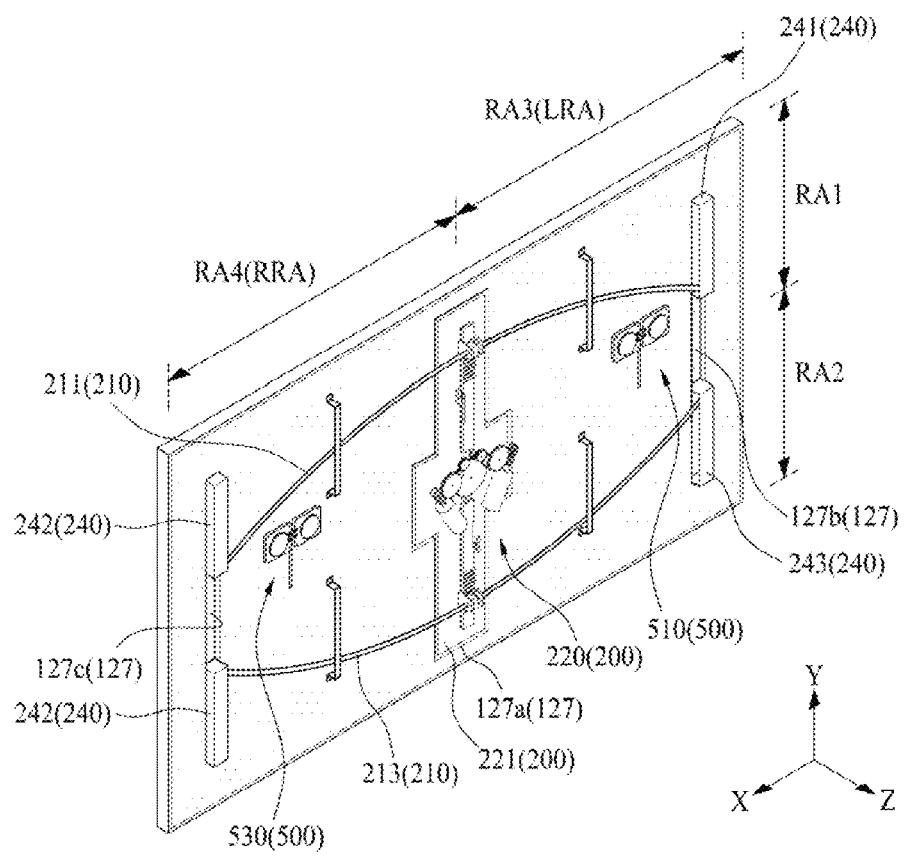
FIG. 15 illustrates a curvature variation device and a vibration device disposed on a rear surface of a display device illustrated in FIG. 14.
Figure 16:
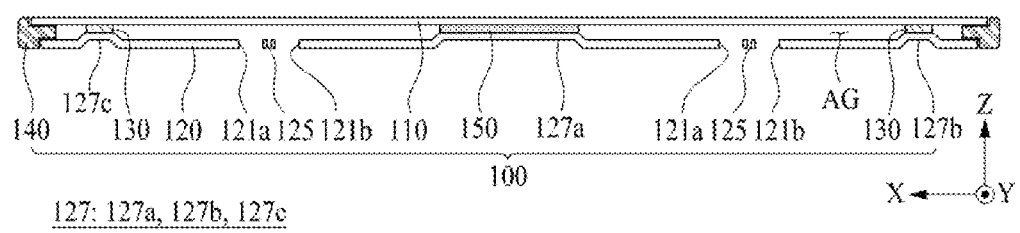
FIG. 16 is a cross-sectional view taken along line III-III' illustrated in FIG. 14.

FIG. 14 is an exploded perspective view illustrating a display apparatus according to another aspect of the present disclosure, FIG. 15 illustrates a curvature variation device and a vibration device disposed on a rear surface of a display device illustrated in FIG. 14, and FIG. 16 is a cross-sectional view taken along line III-III' illustrated in FIG. 14. The FIGS. 14 to 16 illustrate an example where a structure of the display device of the display apparatus illustrated in FIGS. 1 to 13 is modified. In the following description, in elements other than a display device, like reference numerals refer to like elements, and their repeated descriptions are omitted or will be briefly given.

With reference to FIGS. 14 to 16, in the display apparatus according to another aspect of the present disclosure, a display device 100 may further include a groove portion 127 which accommodates a curvature variation device 200.

The groove portion 127 may be formed to be concave from a rear surface of the display device 100 and may be implemented to accommodate the curvature variation device 200. For example, the groove portion 127 may accommodate the curvature variation device 200, thereby decreasing a thickness of a display apparatus.

The groove portion 127 according to an aspect of the present disclosure may include a first groove 127a which is implemented to be concave from the rear surface of the display device 100 and to overlap the curvature variation device 200.

The first groove 127a may be formed to be concave from the back cover 120 overlapping a driver 220 of the curvature variation device 200. For example, the first groove 127a may protrude from a back cover 120 to a rear surface of a display panel 110, and thus, may be concavely formed in the back cover 120. The groove portion 127 may protrude from the back cover 120 to the rear surface of the display panel 110 to have a shape which extends long along a second direction Y, and thus, may reinforce the stiffness of the display device 100 without adversely affecting a curvature variation of the display device 100 where both side portions of the display device 100 protrude in a forward direction FD of the display apparatus instead of a center portion thereof, with respect to a first direction X. For example, in a case where the groove portion 127 is formed to extend long in the first direction X instead of the second direction Y, the groove portion 127 may reinforce the stiffness of the display device 100, and thus, a curvature of the display device 100 may not vary or may be difficult to vary. The first groove 127a may be referred to as a concave portion, an engraved portion, an accommodating portion, a receiving portion, a stiffness reinforcement portion, a space division portion, or a forming portion, but aspects of the present disclosure are not limited thereto.

The first groove 127a may have the same shape as a supporting plate 221 of the curvature variation device 200. A distance (or a height) between a floor portion of the first groove 127a and a rear surface of the back cover 120 may be greater than or equal to a height (or a thickness) of the supporting plate 221 of the curvature variation device 200. For example, the distance (or the height) between the floor portion of the first groove 127a and the rear surface of the back cover 120 may be greater than or equal to the height (or the thickness) of the supporting plate 221 of the curvature variation device 200, within a shortest distance between the display panel 110 and the back cover 120.

The supporting plate 221 of the curvature variation device 200 according to an aspect of the present disclosure may be disposed on (or coupled to) the rear surface of the back cover 120 by a plate fixing member. For example, the plate fixing member may be a screw or a bolt. As another example, the plate fixing member may include an adhesive resin, a double-sided tape, or a double-sided adhesive foam pad, which has elasticity for absorbing an impact. When the plate fixing member has elasticity, the transfer of a vibration, generated based on driving of the curvature variation device 200, to the back cover 120 may be prevented or minimized.

The first groove 127a may be connected or coupled to the rear surface of the display panel 110 through an intermediate member 150. For example, the intermediate member 150 may be disposed or interposed between the first groove 127a and the display panel 110.

The first groove 127a may spatially divide a rear region of the display device 100 into a left rear region LRA and a right rear region RRA, with respect to a direction facing (or viewing) the rear surface of the display device 100. For example, the first groove 127a may spatially divide the rear region of the display device 100 into the left rear region LRA and the right rear region RRA along with the intermediate member 150 to spatially divide a first vibration region and a second vibration region of the display panel 110, and thus, may prevent or minimize interference between the first vibration region and the second vibration region, thereby enhancing a characteristic of a sound generated based on a vibration of the display panel 110. The first groove 127a and the intermediate member 150 may be referred to as a space division portion, a partition, or a partition member, but aspects of the present disclosure are not limited thereto.

The groove portion 127 according to an aspect of the present disclosure may further include a second groove 127b and a third groove 127c, which are implemented to be concave from the rear surface of the display device 100 and to overlap a fixing bracket 240 of the curvature variation device 200.

The second groove 127b may be formed to be concave from the back cover 120 overlapping first and third fixing brackets 241 and 243 of the curvature variation device 200. For example, the second groove 127b may protrude from the back cover 120 to the rear surface of the display panel 110, and thus, may be concavely formed in the back cover 120. For example, the second groove 127b may be formed to be concave from a first rear periphery portion of the back cover 120 in the second direction Y to accommodate all of the first and third fixing brackets 241 and 243, and thus, may reinforce the stiffness of a periphery portion of the display device 100 without adversely affecting a curvature variation of the display device 100.

A distance (or a height) between a floor portion of the second groove 127b and the rear surface of the back cover 120 may be the same as the distance (or the height) between the floor portion of the first groove 127a and the rear surface of the back cover 120, or may be substantially the same within a process error range. For example, a center portion of the arc member 210 disposed on the rear surface of the back cover 120 may get close to the rear surface of the back cover 120 by an insertion depth by which the driver 220 of the curvature variation device 200 is inserted into the first groove 127a. Accordingly, each of the first and third fixing brackets 241 and 243 may be inserted into the second groove 127b, and thus, a distance between each of a center portion and one end of an arc member 210 and the rear surface of the back cover 120 may be maintained to be constant, or the center portion and the one end of the arc member 210 may be parallel.

The third groove 127c may be formed to be concave from the back cover 120 overlapping second and fourth fixing brackets 242 and 244 of the curvature variation device 200. For example, the third groove 127c may protrude from the back cover 120 to the rear surface of the display panel 110, and thus, may be concavely formed in the back cover 120. For example, the third groove 127c may be formed to be concave from a second rear periphery portion of the back cover 120 in the second direction Y to accommodate all of the second and fourth fixing brackets 242 and 244, and thus, may reinforce the stiffness of a periphery portion of the display device 100 without adversely affecting a curvature variation of the display device 100.

A distance (or a height) between a floor portion of the third groove 127c and the rear surface of the back cover 120 may be the same as the distance (or the height) between the floor portion of the first groove 127a and the rear surface of the back cover 120, or may be substantially the same within a process error range. For example, the center portion of the arc member 210 disposed on the rear surface of the back cover 120 may get close to the rear surface of the back cover 120 by an insertion depth by which the driver 220 of the curvature variation device 200 is inserted into the first groove 127a. Accordingly, each of the second and fourth fixing brackets 242 and 244 may be inserted into the third groove 127c, and thus, a distance between each of the center portion and the other end of the arc member 210 and the rear surface of the back cover 120 may be maintained to be constant, or the center portion and the other end of an arc member 210 may be parallel.

Each of the second groove 127b and the third groove 127c may be connected or coupled to the rear surface of the display panel 110 through a cover connection member 130. For example, the cover connection member 130 may be disposed or interposed between each of the second groove 127b and the third groove 127c and the display panel 110.

The display apparatus according to another aspect of the present disclosure, like the display apparatus illustrated in FIGS. 1 to 13, may maximize the immersion of a user (or a viewer) watching an image by using the display device 100 (or a display screen) which is curved in a curved shape and may maximize the immersion of the user (or the viewer) through a sound generated based on a vibration of the display panel 110. Also, the display apparatus according to another aspect of the present disclosure may further include the groove portion 127 which accommodates the curvature variation device 200, and thus, may have a thin thickness and may reinforce the stiffness of the display device 100. Also, in the display apparatus according to another aspect of the present disclosure, the first vibration region and the second vibration region of the display panel 110 may be spatially divided by the groove portion 127 and the intermediate member 150, thereby enhancing a characteristic of a sound generated based on a vibration of the display panel 110 and realizing a stereo sound.

Figure 17:
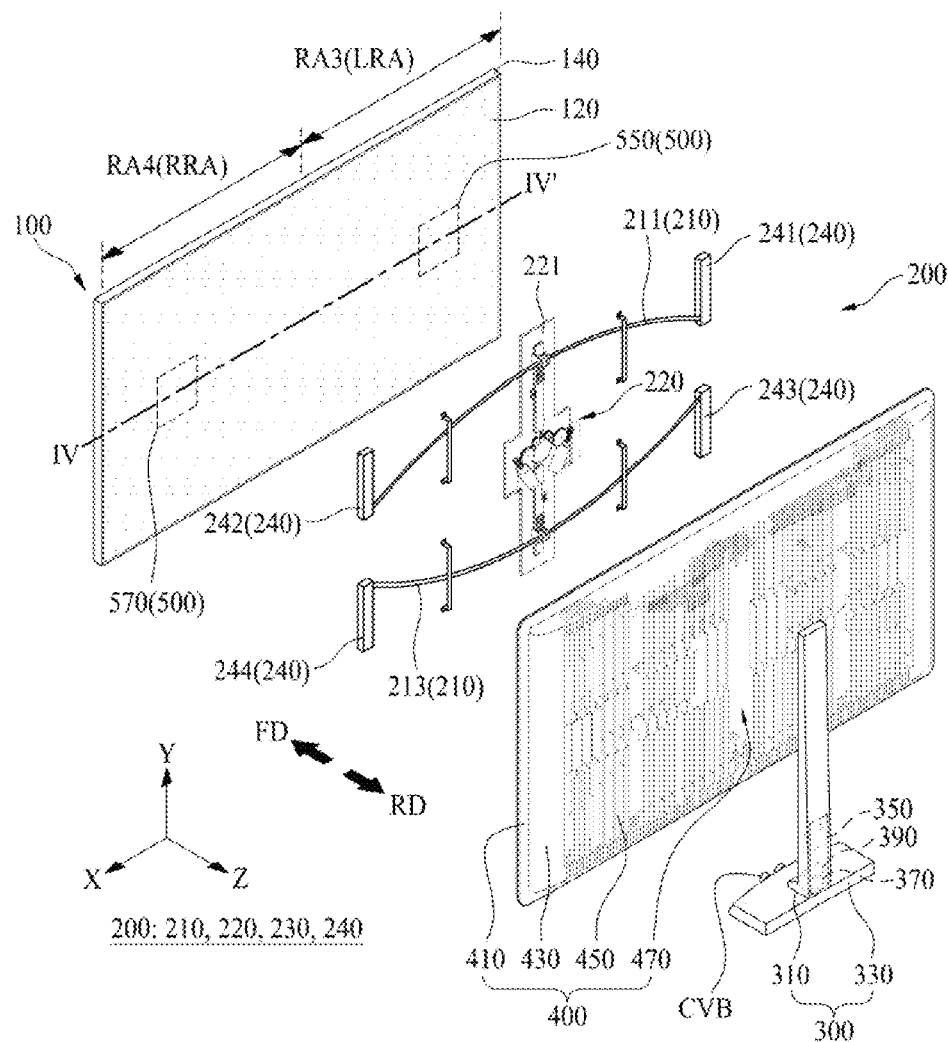
FIG. 17 is an exploded perspective view illustrating a display apparatus according to another aspect of the present disclosure.
Figure 18:
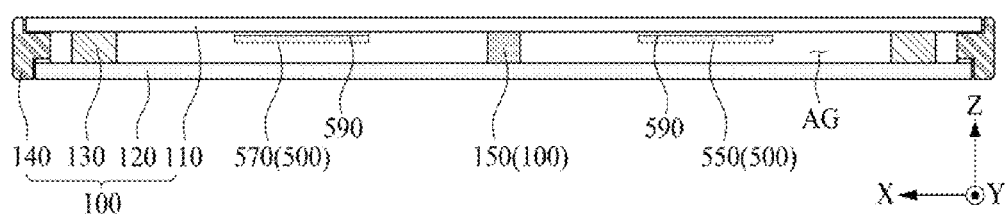
FIG. 18 is a cross-sectional view taken along line IV-IV' illustrated in FIG. 17.

FIG. 17 is an exploded perspective view illustrating a display apparatus according to another aspect of the present disclosure, and FIG. 18 is a cross-sectional view taken along line IV-IV' illustrated in FIG. 17. The FIGS. 17 and 18 illustrate an example where a structure of the vibration device of the display apparatus illustrated in FIGS. 1 to 13 is modified. In the following description, in elements other than a vibration device, like reference numerals refer to like elements, and their repeated descriptions are omitted or will be briefly given.

With reference to FIGS. 1, 17, and 18, in the display apparatus according to another aspect of the present disclosure, a vibration device 500 may be implemented inside a display device 100.

The vibration device 500 may be implemented so that a sound PVS generated based on a vibration of a display panel 110 is output in a forward direction FD of the display apparatus by using the display panel 110 as a vibration plate. The vibration device 500 according to an aspect of the present disclosure may include a film structure using a piezoelectric device (or a piezoelectric material) having a piezoelectric characteristic (or a piezoelectric effect). For example, the vibration device 500 may be referred to as a vibration unit, a film speaker, a film twitter, a piezoelectric film actuator, a sound film actuator, a film exciter, a piezoelectric film speaker, a sound film speaker, a sound film twitter, or a piezoelectric film twitter, but aspects of the present disclosure are not limited thereto.

The vibration device 500 may be disposed or implemented in an air gap AG between the display panel 110 and a back cover 120 and may vibrate the display panel 110.

The vibration device 500 according to an aspect of the present disclosure may be connected (or coupled) to a rear surface of the display panel 110 and may vibrate the display panel 110 to output the sound PVS. For example, the vibration device 500 may directly vibrate the display panel 110. Optionally, the vibration device 500 may be disposed in the back cover 120 facing the rear surface of the display panel 110 to generate a sound pressure level in the air gap AG and may vibrate the display panel 110 based on the sound pressure level. For example, the vibration device 500 may indirectly vibrate the display panel 110.

The vibration device 500 may repeatedly expand and contract based on a piezoelectric effect (or a piezoelectric characteristic) based on a sound signal (or a voice signal) applied from the outside and may vibrate the display panel 110 based on the vibration, thereby generating the sound PVS based on the vibration of the display panel 110.

The vibration device 500 may be connected (or coupled) to the rear surface of the display panel 110 by using an adhesive member 590. The adhesive member 590 may include a double-sided tape, a double-sided foam tape, a double-sided foam pad, a double-sided foam pad tape, a double-sided adhesive pad, a double-sided adhesive gap pad, or a double-sided foam pad, which includes an adhesive resin or an adhesive layer, but aspects of the present disclosure are not limited thereto. For example, the adhesive resin or the adhesive layer of the adhesive member 590 may include an acryl-based or urethane-based adhesive material, but aspects of the present disclosure are not limited thereto. For example, the adhesive resin or the adhesive layer of the adhesive member 590 may include the acryl-based adhesive material which is relatively higher in hardness than the urethane-based adhesive material having a relatively ductile characteristic, so that a vibration of the vibration device 500 is well transferred to the display panel 110 without being lost.

The vibration device 500 according to an aspect of the present disclosure may include a first vibration generator 550 and a second vibration generator 570.

The first vibration generator 550 may be implemented to vibrate a first vibration region LRA of the display panel 110. For example, the first vibration generator 550 may be connected (or coupled) to a rear surface of the display panel 110 corresponding to the first vibration region LRA of the display panel 110.

The first vibration generator 550 may include a piezoelectric element (or a piezoelectric material) having a piezoelectric characteristic and may be implemented to vibrate the first vibration region LRA of the display panel 110. For example, the first vibration generator 550 may be connected (or coupled) to the rear surface of the display panel 110 corresponding to the first vibration region LRA of the display panel 110 by using the adhesive member 590. The first vibration generator 550 may vibrate the first vibration region LRA of the display panel 110 and may output a first sound (or a left sound), generated based on the vibration of the first vibration region LRA of the display panel 110, in the forward direction FD of the display apparatus.

The second vibration generator 570 may be implemented to vibrate the second vibration region RRA of the display panel 110. For example, the second vibration generator 570 may be connected (or coupled) to a rear surface of the display panel 110 corresponding to the second vibration region RRA of the display panel 110 by using the adhesive member 590.

The second vibration generator 570 may include a piezoelectric device (or a piezoelectric material) having a piezoelectric characteristic and may be implemented to vibrate the second vibration region RRA of the display panel 110. For example, the second vibration generator 570 may be connected (or coupled) to the rear surface of the display panel 110 corresponding to the second vibration region RRA of the display panel 110 by using the adhesive member 590. The second vibration generator 570 may vibrate the second vibration region RRA of the display panel 110 and may output a second sound (or a right sound), generated based on the vibration of the second vibration region RRA of the display panel 110, in the forward direction FD of the display apparatus.

The left rear region LRA and the right rear region RRA of the display panel 110 may be spatially divided by the intermediate member 150 described above, and thus, may prevent or minimize interference between the first sound and the second sound, thereby enhancing a characteristic of a sound generated based on a vibration of the display panel 110.

The display apparatus according to another aspect of the present disclosure may have the same effect as that of the display apparatus illustrated in FIGS. 1 to 13. Also, because the vibration device 500 is implemented inside the display device 100, the display apparatus according to another aspect of the present disclosure may have a thin thickness and may prevent the occurrence of mechanical interference between the vibration device 500 and the curvature variation device 200, thereby enhancing the degree of design freedom of each of the vibration device 500 and the curvature variation device 200. Also, the display apparatus according to another aspect of the present disclosure may include the vibration device 500 having a film structure, and thus, may reduce a load of the display device 100 which is applied to the curvature variation device 200 when a curvature of the display device 100 varies, thereby enhancing the reliability of each element configuring the curvature variation device 200.

Figure 19:
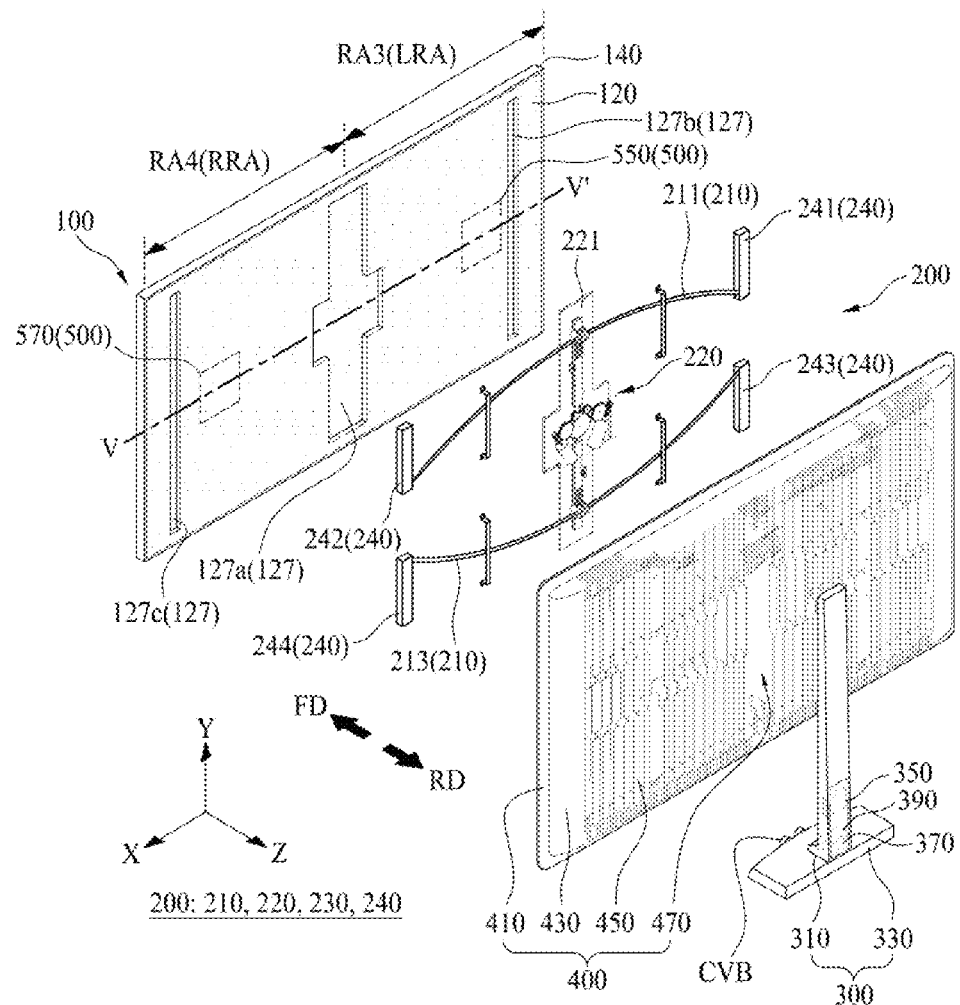
FIG. 19 is an exploded perspective view illustrating a display apparatus according to another aspect of the present disclosure.
Figure 20:
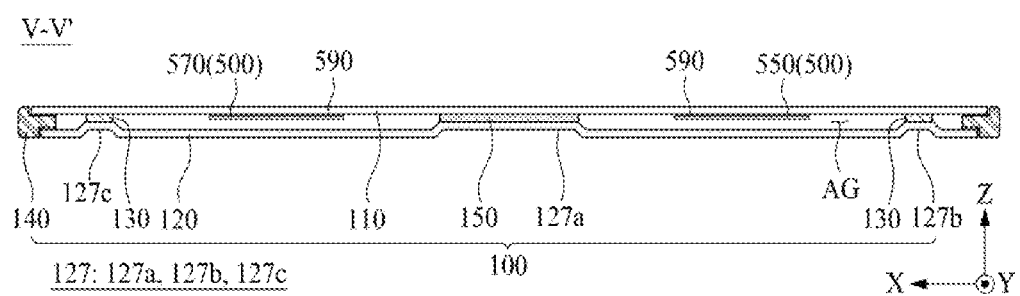
FIG. 20 is a cross-sectional view taken along line V-V' illustrated in FIG. 19.

FIG. 19 is an exploded perspective view illustrating a display apparatus according to another aspect of the present disclosure, and FIG. 20 is a cross-sectional view taken along line V-V' illustrated in FIG. 19. The FIGS. 19 and 20 illustrate an example where a structure of the vibration device of the display apparatus illustrated in FIGS. 14 to 16 is modified. In the following description, in elements other than a vibration device, like reference numerals refer to like elements, and their repeated descriptions are omitted or will be briefly given.

With reference to FIGS. 1, 19, and 20, in the display apparatus according to another aspect of the present disclosure, a vibration device 500 may be implemented inside the display device 100.

The vibration device 500 may be implemented so that a sound PVS generated based on a vibration of a display panel 110 is output in a forward direction FD of the display apparatus by using the display panel 110 as a vibration plate. The vibration device 500 may be substantially the same as the vibration device 500 described above with reference to FIGS. 17 and 18, and thus, its repeated description is omitted or will be briefly given below.

The vibration device 500 according to an aspect of the present disclosure may include a first vibration generator 550 and a second vibration generator 570.

The first vibration generator 550 may be implemented to vibrate a first vibration region LRA of the display panel 110. For example, the first vibration generator 550 may be connected (or coupled) to a rear surface of the display panel 110 corresponding to the first vibration region LRA of the display panel 110 by using an adhesive member 590. The first vibration generator 550 may be substantially the same as the first vibration generator 550 described above with reference to FIGS. 17 and 18, and thus, its repeated description is omitted or will be briefly given below.

The second vibration generator 570 may be implemented to vibrate a second vibration region RRA of the display panel 110. For example, the second vibration generator 570 may be connected (or coupled) to a rear surface of the display panel 110 corresponding to the second vibration region RRA of the display panel 110 by using the adhesive member 590. The second vibration generator 570 may be substantially the same as the second vibration generator 570 described above with reference to FIGS. 17 and 18, and thus, its repeated description is omitted or will be briefly given below.

The first rear region LRA and the second rear region RRA of the display panel 110 may be spatially divided by a first groove 127a of a groove portion 127 described above and the intermediate member 150 between the first groove 127a and the display panel 110, and thus, may prevent or minimize interference between a first sound and a second sound, thereby enhancing a characteristic of a sound generated based on a vibration of the display panel 110.

The display apparatus according to another aspect of the present disclosure may have the same effect as that of the display apparatus illustrated in FIGS. 14 to 16. Also, the display apparatus according to another aspect of the present disclosure may additionally have the same effect as that of the display apparatus illustrated in FIGS. 17 and 18. Also, the display apparatus according to another aspect of the present disclosure may further include a groove portion 127 which accommodates the curvature variation device 200, and thus, may have a thin thickness and may reinforce the stiffness of the display device 100. Also, in the display apparatus according to another aspect of the present disclosure, the first vibration region LRA and the second vibration region RRA of the display panel 110 may be spatially divided by the groove portion 127 and the intermediate member 150, thereby enhancing a characteristic of a sound generated based on a vibration of the display panel 110 and realizing a stereo sound.

Figure 21:
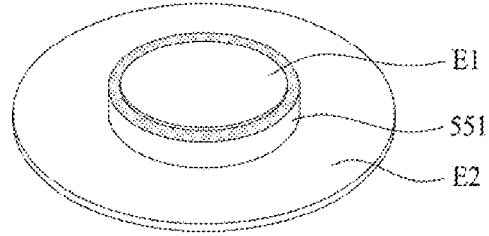
FIG. 21 illustrates a vibration generator according to an aspect of the present disclosure.

FIG. 21 illustrates a vibration generator according to an aspect of the present disclosure and is a diagram for describing the first and second vibration generators illustrated in FIGS. 17 to 20.

With reference to FIG. 21, each of the first vibration generator 550 and the second vibration generator 570 according to an aspect of the present disclosure may be include a piezoelectric vibration portion 551, a first electrode portion E1, and a second electrode portion E2.

The piezoelectric vibration portion 551 may include a piezoelectric device (or a piezoelectric material) having a piezoelectric characteristic (or a piezoelectric effect). For example, the piezoelectric material may have a characteristic where pressure or twisting (or bending) is applied to a crystalline structure by an external force, a potential difference occurs due to dielectric polarization caused by a relative position change of a positive (+) ion and a negative (−) ion, and a vibration is generated by an electric field based on a voltage applied thereto. The piezoelectric vibration portion 551 may be referred to as a vibration layer, a piezoelectric layer, a piezoelectric material layer, an electroactive layer, a vibration portion, a piezoelectric material portion, an electroactive portion, a piezoelectric structure, an inorganic material layer, or an inorganic material portion, but aspects of the present disclosure are not limited thereto.

The piezoelectric vibration portion 551 may be formed of a transparent, semitransparent, or opaque piezoelectric material (or an electroactive material), and may be transparent, semitransparent, or opaque. The piezoelectric vibration portion 551 may be formed of a ceramic-based material for generating a relatively high vibration, or may be formed of piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". Here, A may include a divalent metal element, and B may include a tetravalent metal element. For example, in the chemical formula "$ABO_3$", A and B may be cations, and O may be anions. For example, the perovskite crystalline structure may include at least one or more of $PbTiO_3$, $PbZrO_3$, $PbZrTiO_3$, $BaTiO_3$, and $SrTiO_3$, but aspects of the present disclosure are not limited thereto.

The piezoelectric vibration portion 551 according to an aspect of the present disclosure may include a lead zirconate titanate (PZT)-based material including lead (Pb), zirconium (Zr), and titanium (Ti) or may include a lead zirconate nickel niobate (PZNN)-based material including lead (Pb), zirconium (Zr), nickel (Ni), and niobium (Nb), but aspects of the present disclosure are not limited thereto. Also, the piezoelectric vibration portion 551 may include at least one or more of $CaTiO_3$, $BaTiO_3$, and $SrTiO_3$ without Pb, but aspects of the present disclosure are not limited thereto.

The piezoelectric vibration portion 551 according to an aspect of the present disclosure may be configured in a circular shape, an ellipse shape, or a polygonal shape, but aspects of the present disclosure are not limited thereto.

The first electrode portion E1 may be disposed at a first surface (or a top surface or an upper surface or a front surface) of the piezoelectric vibration portion 551, and electrically connected to the first surface of the piezoelectric vibration portion 551. For example, the first electrode portion E1 may have a single-body electrode type which is disposed at a whole first surface of the piezoelectric vibration portion 551. For example, the first electrode portion may have the same shape as the piezoelectric vibration portion 551, but aspects of the present disclosure are not limited thereto. The first electrode portion E1 according to an aspect of the present disclosure may be formed of a transparent conductive material, a semitransparent conductive material, or an opaque conductive material. For example, examples of the transparent conductive material or the semitransparent conductive material may include indium tin oxide (ITO) or indium zinc oxide (IZO), but aspects of the present disclosure are not limited thereto. Examples of the opaque conductive material may include aluminum (Al), copper (Cu), gold (Au), silver (Ag), molybdenum (Mo), and Mg or an alloy thereof, but aspects of the present disclosure are not limited thereto.

The second electrode portion E2 may be disposed at a second surface (or a bottom surface or a lower surface or a rear surface), which is opposite to the first surface, of the piezoelectric vibration portion 551, and electrically connected to the second surface of the piezoelectric vibration portion 551. For example, the second electrode portion E2 may have a single-body electrode type which is disposed at a whole second surface of the piezoelectric vibration portion 551. For example, the second electrode portion E2 may have a larger size than that of the piezoelectric vibration portion 551, and may have the same shape as the piezoelectric vibration portion 551, but aspects of the present disclosure are not limited thereto. The second electrode portion E2 according to an aspect of the present disclosure may be formed of a transparent conductive material, a semitransparent conductive material, or an opaque conductive material. For example, the second electrode portion E2 may be formed of the same material as the first electrode portion E1, but aspects of the present disclosure are not limited thereto. In another example, the second electrode portion E2 may be formed of a different material than the first electrode portion E1.

The piezoelectric vibration portion 551 may be polarized (or poling) by a certain voltage applied to the first electrode portion E1 and the second electrode portion E2 in a certain temperature atmosphere, or a temperature atmosphere that may be changed from a high temperature to a room temperature. Aspects of the present disclosure are not limited to these examples. The piezoelectric vibration portion 551 may vibrate by alternately and/or repeatedly contract and expand based on a piezoelectric effect (or a piezoelectric characteristic) according to a sound signal (or a voice signal) applied to the first electrode portion E1 and the second electrode portion E2 from the outside.

Each of the first vibration generator 550 and the second vibration generator 570 according to an aspect of the present disclosure may further include a first protection member and a second protection member.

The first protection member may be disposed at the first electrode portion E1 and protect the first electrode portion E1. For example, the first protection member may be formed of a plastic material, a fiber material, or wood material, but aspects of the present disclosure are not limited thereto.

The second protection member may be disposed at the second electrode portion E2 and protect the second electrode portion E2. For example, the second protection member may be formed of a plastic material, a fiber material, or wood material, but aspects of the present disclosure are not limited thereto. For example, the first protection member may be formed of the same or different material as the second protection member. Any one of the first protection member and the second protection member may be attached to or coupled to the display panel via an adhesive member.

Figure 22:
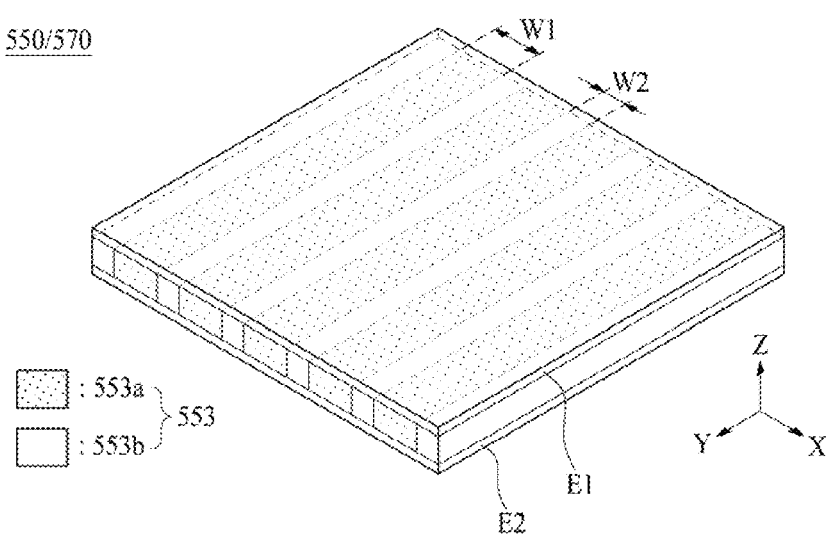
FIG. 22 illustrates a vibration generator according to another aspect of the present disclosure.

FIG. 22 illustrates a vibration generator according to another aspect of the present disclosure and is a diagram for describing the first and second vibration generators illustrated in FIGS. 17 to 20.

With reference to FIG. 22, each of the first vibration generator 550 and the second vibration generator 570 according to an aspect of the present disclosure may be referred to as a flexible vibration generator, a flexible actuator, a flexible speaker, a flexible piezoelectric speaker, a film actuator, a film piezoelectric composite actuator, a film speaker, a film piezoelectric speaker, or film piezoelectric composite speaker, but aspects of the present disclosure are not limited thereto.

Each of the first vibration generator 550 and the second vibration generator 570 according to another aspect of the present disclosure may include a piezoelectric vibration portion 553, a first electrode portion E1, and a second electrode portion E2.

The piezoelectric vibration portion 553 may include a piezoelectric material, a composite piezoelectric material, or an electroactive material, and the piezoelectric material, the composite piezoelectric material and the electroactive material may have a piezoelectric effect. The piezoelectric vibration portion 553 may be referred to as a vibration layer, a piezoelectric layer, a piezoelectric material layer, an electroactive layer, a vibration portion, a piezoelectric material portion, an electroactive portion, a piezoelectric structure, a piezoelectric composite layer, a piezoelectric composite, or a piezoelectric ceramic composite, but aspects of the present disclosure are not limited thereto. The piezoelectric vibration portion 553 may be formed of a transparent, semitransparent, or opaque piezoelectric material, and may be transparent, semitransparent, or opaque.

The piezoelectric vibration portion 553 according to an aspect of the present disclosure may include a plurality of first portions 553a and a plurality of second portions 553b. For example, the plurality of first portions 553a and the plurality of second portions 553b may be alternately and repeatedly arranged in a first direction X (or a second direction Y). For example, the first direction X may be a widthwise direction or a first horizontal direction of the piezoelectric vibration portion 553. The second direction Y may be a lengthwise direction or a second horizontal direction of the piezoelectric vibration portion 553. An aspect of the present disclosure is not limited thereto, and the first direction X may be the lengthwise direction or the second horizontal direction of the piezoelectric vibration portion 553, and the second direction Y may be the widthwise direction or the first horizontal direction of the piezoelectric vibration portion 553.

Each of the plurality of first portions 553a may be configured as an inorganic material portion. The inorganic material portion may include the above-described piezoelectric material. For example, each of the plurality of first portions 553a may include a piezoelectric material which is be substantially the same as the piezoelectric vibration portion 551 described above with reference to FIG. 21, and thus, their repetitive descriptions may be omitted.

Each of the plurality of first portions 553a according to an aspect of the present disclosure may be disposed between the plurality of second portions 553b. For example, the plurality of first portions 553a may have a first width W1 parallel to the first direction X (or the second direction Y) and a length parallel to the second direction Y (or the first direction X). Each of the plurality of second portions 553b may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 553a and the second portion 553b may include a line shape or a stripe shape which has the same size or different sizes. Therefore, the piezoelectric vibration portion 553 may include a 2-2 composite structure and thus may have a resonance frequency of 20 kHz or less, but aspects are not limited thereto and a resonance frequency of the piezoelectric vibration portion 553 may vary based on one or more of a shape, a length, and a thickness.

In the piezoelectric vibration portion 553, each of the plurality of first portions 553a and the plurality of second portions 553b may be disposed (or arranged) at the same plane (or the same layer) in parallel. Each of the plurality of second portions 553b may be connected or attached to a second portion 553b adjacent thereto. For example, each of the plurality of second portions 553b may be configured to fill a gap between two adjacent first portions of the plurality of first portions 553a and may be connected or attached to a second portion 553b adjacent thereto. The piezoelectric vibration portion 553 may extend by a desired size or length based on the side coupling (or connection) of the first portion 553a and the second portion 553b.

In the piezoelectric vibration portion 553, a width (or a size) W2 of each of the plurality of second portions 553b may progressively decrease in a direction from a center portion to both peripheries (or both ends) of the piezoelectric vibration portion 553.

According to an aspect of the present disclosure, a second portion 553b, having a largest width W2 among the plurality of second portions 553b, may be located at a portion at which a highest stress may concentrate when the piezoelectric vibration portion 553 is vibrating in a vertical direction Z (or a thickness direction). A second portion 553b having a smallest width W2 among the plurality of second portions 553b may be located at a portion where a relatively low stress may occur when the piezoelectric vibration portion 553 is vibrating in the vertical direction Z. For example, the second portion 553b having the largest width W2 among the plurality of second portions 553b may be disposed at the center portion of the piezoelectric vibration portion 553, and the second portion 553b having the smallest width W2 among the plurality of second portions 553b may be disposed at the both edges or peripheries of the piezoelectric vibration portion 553. Therefore, when the piezoelectric vibration portion 553 is vibrating in the vertical direction Z, interference of a sound wave or overlapping of a resonance frequency, occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure and a lowest sound pressure.

In the piezoelectric vibration portion 553, each of the plurality of first portions 553a may have different sizes (or widths). For example, a size (or a width) of each of the plurality of first portions 553a may progressively decrease or increase in a direction from the center portion to the both peripheries (or both ends) of the piezoelectric vibration portion 553. For example, in the piezoelectric vibration portion 553, a sound pressure level characteristic of a sound may be enhanced and a sound reproduction band may increase, based on various natural vibration frequencies according to a vibration of each of the plurality of first portions 553a having different sizes.

Each of the plurality of second portions 553b may be disposed between the plurality of first portions 553a. Therefore, in the piezoelectric vibration portion 553, vibration energy by a link in a device lattice of the first portion 553a may increase by a corresponding second portion 553b. Thus, a vibration may increase, and a piezoelectric characteristic and flexibility may be secured. For example, the second portion 553b may include at least one or more of an epoxy-based polymer, an acryl-based polymer, and a silicone-based polymer, but aspects of the present disclosure are not limited thereto.

The plurality of second portions 553b according to an aspect of the present disclosure may be configured as an organic material portion. For example, the organic material portion may be disposed between the inorganic material portions and may absorb an impact applied to the inorganic material portion (or the first portion), may release a stress concentrating on the inorganic material portion to enhance the total durability of the piezoelectric vibration portion 553, and may provide flexibility to the piezoelectric vibration portion 553.

The plurality of second portions 553b according to an aspect of the present disclosure may have modulus and viscoelasticity that are lower than those of the first portion 553a, and thus, the second portion 553b may enhance the reliability of the first portion 553a vulnerable to an impact due to a fragile characteristic. For example, the second portion 553b may include a material having a loss coefficient of about 0.01 to about 1.0 and modulus of about 0.1 GPa to about 10 GPa.

The organic material portion included in the second portion 553b may include one or more of an organic material, an organic polymer, an organic piezoelectric material, and an organic non-piezoelectric material that has a flexible characteristic in comparison with the inorganic material portion of the first portions 553a. For example, the second portion 553b may be referred to as an adhesive portion, an elastic portion, a bending portion, a damping portion, or a flexible portion, but aspects of the present disclosure are not limited thereto. For example, the adhesive portion, the elastic portion, the bending portion, the damping portion, or the flexible portion may have flexibility.

The plurality of first portions 553a and the second portion 553b may be disposed on (or connected to) the same plane, and thus, the piezoelectric vibration portion 553 according to this aspect of the present disclosure may have a single thin film-type. For example, the piezoelectric vibration portion 553 may have a structure in which a plurality of first portions 553a are connected to one side. For example, the plurality of first portions 553a may have a structure connected to a whole the piezoelectric vibration portion 553. For example, the piezoelectric vibration portion 553 may be vibrated in a vertical direction (or a thickness direction) by the first portion 553a having a vibration characteristic and may be bent in a curved shape by the second portion 553b having flexibility. Also, in the piezoelectric vibration portion 553 according to this aspect of the present disclosure, a size of the first portion 553a and a size of the second portion 553b may be adjusted based on a piezoelectric characteristic and flexibility needed for the piezoelectric vibration portion 553. For example, when the piezoelectric vibration portion 553 needs a piezoelectric characteristic rather than flexibility, a size of the first portion 553a may be adjusted to be greater than that of the second portion 553b. As another example, when the piezoelectric vibration portion 553 needs flexibility rather than a piezoelectric characteristic, a size of the second portion 553b may be adjusted to be greater than that of the first portion 553a. For example, the size of the second portion 553b and the size of the first portion 553a may be one or more of a width, a length, and a thickness. Accordingly, a size of the piezoelectric vibration portion 553 may be adjusted based on a characteristic needed therefor, and thus, the piezoelectric vibration portion 553 may be easy to design.

The first electrode portion E1 may be disposed at a first surface (or an upper surface) of the piezoelectric vibration portion 553. The first electrode portion E1 may be disposed at or coupled to a first surface of each of a plurality of first portions 553a and a first surface of each of a plurality of second portions 553b in common and may be electrically connected to the first surface of each of the plurality of first portions 553a. For example, the first electrode portion E1 may be a single-body electrode type which is disposed at a whole first surface of the piezoelectric vibration portion 553. For example, the first electrode portion E1 may have the same shape as that of the piezoelectric vibration portion 553, but aspects of the present disclosure are not limited thereto. The first electrode portion E1 according to an aspect of the present disclosure may include a transparent conductive material, a semitransparent conductive material, or an opaque conductive material.

The second electrode portion E2 may be disposed at a second surface (or a rear surface) opposite to the first surface of the piezoelectric vibration portion 553. The second electrode portion E2 may be disposed at or coupled to a second surface of each of a plurality of first portions 553a and the second surface of each of a plurality of second portions 553b in common and may be electrically connected to a second surface of each of the plurality of first portions 553a. For example, the second electrode portion E2 may be a single-body electrode type which is disposed on the whole second surface of the piezoelectric vibration portion 553. For example, the second electrode portion E2 may have the same shape as that of the piezoelectric vibration portion 553, but aspects of the present disclosure are not limited thereto. The second electrode portion E2 according to an aspect of the present disclosure may include a transparent conductive material, a semitransparent conductive material, or an opaque conductive material.

The piezoelectric vibration portion 553 may be polarized (or poling) by a certain voltage applied to the first electrode portion E1 and the second electrode portion E2 in a certain temperature atmosphere, or a temperature atmosphere that may be changed from a high temperature to a room temperature, but aspects of the present disclosure are not limited thereto. For example, the piezoelectric vibration portion 553 may alternately and repeatedly contract and expand based on an inverse piezoelectric effect according to a sound signal (or voice signal) applied to the first electrode portion E1 and the second electrode portion E2 from the outside to vibrate.

For example, the piezoelectric vibration portion 553 may vibrate based on a vertical-direction (or a thickness direction Z) vibration d33 and a horizontal-direction (or a planar direction) vibration d31 by the first electrode portion E1 and the second electrode portion E2. The piezoelectric vibration portion 553 may increase the displacement of the display panel by contraction and expansion in the horizontal-direction, thereby further improving the vibration.

Each of the first vibration generator 550 and the second vibration generator 570 according to an aspect of the present disclosure may further include a first protection member and a second protection member.

The first protection member may be disposed on the first electrode portion E1 and may protect the first electrode portion E1. For example, the first protection member may include a plastic material, a fiber material, or a wood material.

The second protection member may be disposed on the second electrode portion E2 and may protect the second electrode portion E2. For example, the second protection member may include a plastic material, a fiber material, or a wood material. For example, the first protection member may include a material which is the same as or different from that of the second protection member. Any one of the first protection member and the second protection member may be attached or coupled to the display panel by an adhesive member.

Figure 23:
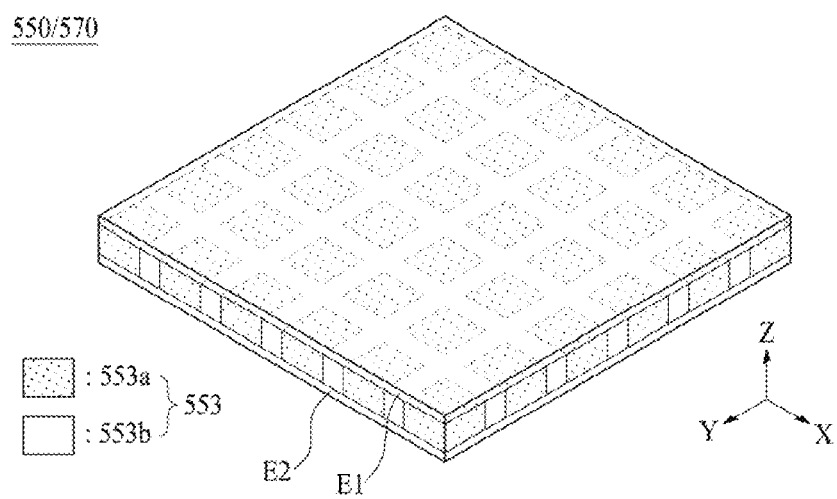
FIG. 23 illustrates a vibration generator according to another aspect of the present disclosure.

FIG. 23 illustrates a vibration generator according to another aspect of the present disclosure and illustrates an aspect where the piezoelectric vibration portion illustrated in FIG. 22 is modified. Hereinafter, therefore, repetitive descriptions of elements other than the piezoelectric vibration portion may be omitted or will be briefly given.

With reference to FIG. 23, in each of the first vibration generator 550 and the second vibration generator 570 according to another aspect of the present disclosure, the piezoelectric vibration portion 553 may include a plurality of first portions 553a, which are spaced apart from one another along a first direction X and a second direction Y, and a second portion 553b disposed between the plurality of first portions 553a.

Each of the plurality of first portions 553a may be disposed to be spaced apart from one another along each of the first direction X and the second direction Y. For example, each of the plurality of first portions 553a may have a hexahedral shape (or a six-sided object shape) having the same size and may be disposed in a lattice shape. For example, each of the plurality of first portions 553a may include a piezoelectric material which is be substantially the same as the first portion 553a described above with reference to FIG. 22, and thus, like reference numerals refer to like elements and their repetitive descriptions may be omitted.

The second portion 553b may be disposed between the plurality of first portions 553a along each of the first direction X and the second direction Y. The second portion 553b may be configured to fill a gap or a space between two adjacent first portions 553a or to surround each of the plurality of first portions 553a, and thus, may be connected or attached to an adjacent first portion 553a. According to an aspect of the present disclosure, a width of a second portion 553b disposed between two first portions 553a adjacent to each other along the first direction X may be the same as or different from that of the first portion 553a, and a width of a second portion 553b disposed between two first portions 553a adjacent to each other along the second direction Y may be the same as or different from that of the first portion 553a. For example, the second portion 553b may include an organic material which is be substantially the same as the second portion 553b described above with reference to FIG. 22, and thus, like reference numerals refer to like elements and their repetitive descriptions may be omitted.

Therefore, in each of the first vibration generator 550 and the second vibration generator 570 according to this aspect of present disclosure, the piezoelectric vibration portion 553 may include a 1-3 composite structure and thus may have a resonance frequency of 30 MHz or less, but aspects of the present disclosure are not limited thereto and a resonance frequency of the piezoelectric vibration portion 553 may vary based on one or more of a shape, a length, and a thickness.

Figure 24:
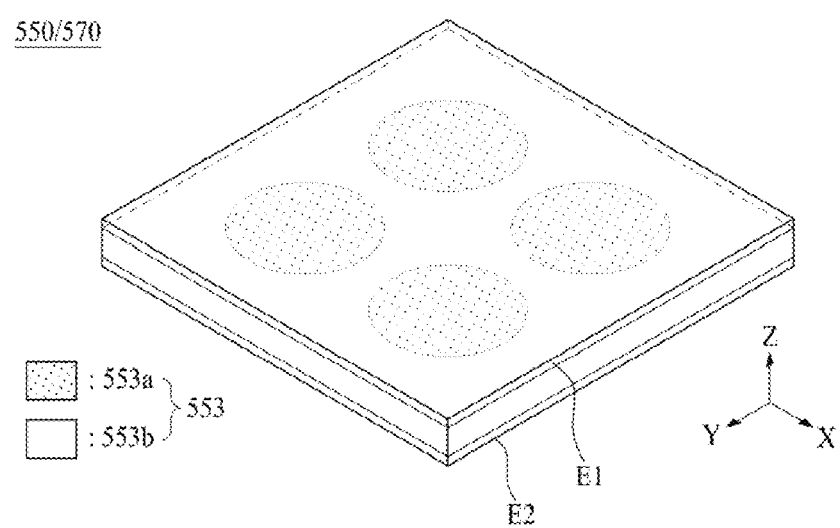
FIG. 24 illustrates a vibration generator according to another aspect of the present disclosure.

FIG. 24 illustrates a vibration generator according to another aspect of the present disclosure and illustrates an aspect where the piezoelectric vibration portion illustrated in FIG. 22 is modified. Hereinafter, therefore, repetitive descriptions of elements other than the piezoelectric vibration portion may be omitted or will be briefly given.

With reference to FIG. 24, in each of the first vibration generator 550 and the second vibration generator 570 according to another aspect of the present disclosure, the piezoelectric vibration portion 553 may include a plurality of first portions 553a, which are spaced apart from one another along a first direction X and a second direction Y, and a second portion 553b disposed between the plurality of first portions 553a.

Each of the plurality of first portions 553a according to another aspect of the present disclosure may have a flat structure of a circular shape. For example, each of the plurality of first portions 553a may have a circular plate shape, but aspects of the present disclosure are not limited thereto. For example, each of the plurality of first portions 553a may have a dot shape including an oval shape, a polygonal shape, or a donut shape.

The second portion 553b may be disposed between the plurality of first portions 553a along each of the first direction X and the second direction Y. The second portion 553b may be configured to surround each of the plurality of first portions 553a, and thus, may be connected to or attached on a side surface of each of the plurality of first portions 553a. Each of the plurality of first portions 553a and the second portion 553b may be disposed (or arranged) in parallel on the same plane (or the same layer).

In the piezoelectric vibration portion 553 of each of the first vibration generator 550 and the second vibration generator 570 according to another aspect of the present disclosure, each of the plurality of first portions 553a may have a flat structure of a triangular shape instead of a flat structure of a circular shape. For example, each of the plurality of first portions 553a may have a triangular plate shape.

According to an aspect of the present disclosure, four adjacent first portions 553a among the plurality of first portions 553a may be adjacent to one another to form a tetragonal or quadrilateral shape (or a square shape). Vertices of the four adjacent first portions 553a forming a tetragonal shape may be adjacent to one another in a center portion (or a central portion) of the tetragonal shape.

According to another aspect of the present disclosure, six adjacent first portions 553a among the plurality of first portions 553a may be adjacent to one another to form a hexagonal shape (or a regularly hexagonal shape). Vertices of the six adjacent first portions 553a forming a hexagonal shape may be adjacent to one another in a center portion (or a central portion) of the hexagonal shape.

Figure 25:
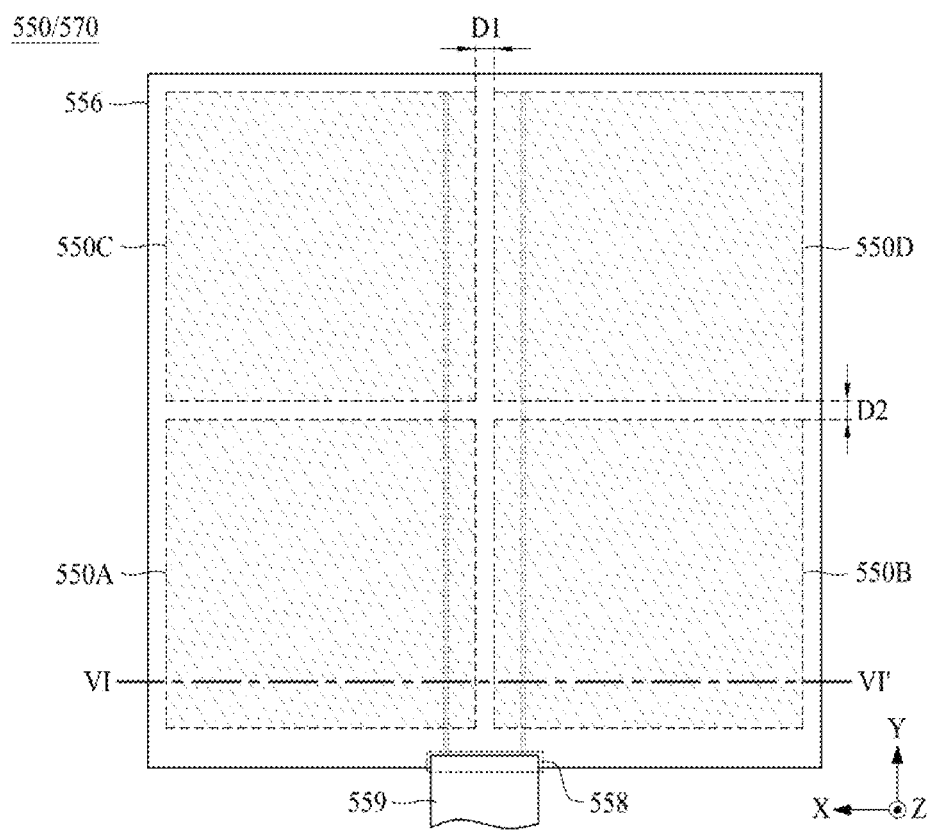
FIG. 25 illustrates a vibration generator according to another aspect of the present disclosure.
Figure 26:
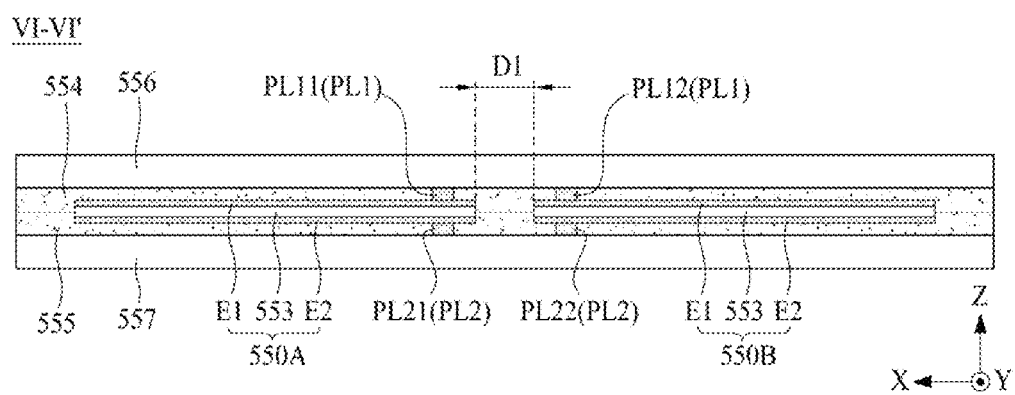
FIG. 26 is a cross-sectional view taken along line VI-VI' illustrated in FIG. 25.

FIG. 25 illustrates a vibration generator according to other aspect of the present disclosure. FIG. 26 is a cross-sectional view taken along line VI-VI' illustrated in FIG. 25. FIGS. 25 and 26 are a diagram illustrating a vibration generator illustrated in FIGS. 17 to 20.

With reference to FIGS. 25 and 26, each of the first vibration generator 550 and the second vibration generator 570 according to another aspect of the present disclosure may include at least one or more vibration generating portion 550A to 550D or a plurality of vibration generating portions 550A to 550D. FIGS. 25 and 26 illustrate an example including four vibration generating portions, and each of the first vibration generator 550 and the second vibration generator 570 according to another aspect of the present disclosure may be configured with two or more vibration generating portions.

The plurality of vibration generating portions (or vibration modules) 550A to 550D may be electrically separated and disposed while being spaced apart from each other along each of a first direction X and a second direction Y.

Each of the plurality of vibration generating portions 550A to 550D may alternately and/or repeatedly contract and expand based on a piezoelectric effect to vibrate. For example, each of the plurality of vibration generating portions 550A to 550D may be arranged or tiled at a certain interval (or distance) along each of the first direction X and the second direction Y. For example, each of the first vibration generator 550 and the second vibration generator 570 in which the plurality of vibration generating portions 550A to 550D are arranged or tiled may be referred to as a sound module, a vibration array, a vibration array portion, a vibration generating array portion, a vibration array structure, a tiling vibration array, a tiling vibration array module, or a tiling vibration film, but aspects of the present disclosure are not limited thereto.

Each of the plurality of vibration generating portions 550A to 550D according to an aspect of the present disclosure may have a tetragonal shape. For example, each of the plurality of vibration generating portions 550A to 550D may have a tetragonal shape having a width of about 5 cm or more, but aspects of the present disclosure are not limited thereto. For example, each of the plurality of vibration generating portions 550A to 550D may have a square shape having a size of 5 cm×5 cm or more, but aspects of the present disclosure are not limited thereto.

Each of the plurality of vibration generating portions 550A to 550D may be arranged or tiled at a certain interval (or distance), and thus, may be implemented as one vibration device (or one vibration element or a single vibration device) which is driven as one complete single-body without being independently driven. According to an aspect of the present disclosure, with respect to the first direction X, a first separation distance (or first distance or first interval) D1 between the plurality of vibration generating portions 550A to 550D may be 0.1 mm or more and smaller than 3 cm, but aspects of the present disclosure are not limited thereto. Also, with respect to the second direction Y, a second separation distance (or second distance or second interval) D2 between the plurality of vibration generating portions 550A to 550D may be 0.1 mm or more and smaller than 3 cm, but aspects of the present disclosure are not limited thereto. For example, the first separation distance D1 may be the same as the second separation distance D2 within a process error range.

According to an aspect of the present disclosure, each of the plurality of vibration generating portions 550A to 550D may be arranged or tiled to have the separation distances (or intervals) D1 and D2 of 0.1 mm or more and smaller than 3 cm, and thus, may be driven as one vibration device, thereby increasing a reproduction band and a sound pressure level characteristic of a sound which is generated based on a single-body vibration of the plurality of vibration generating portions 550A to 550D. For example, the plurality of vibration generating portions 550A to 550D may be arranged at an interval of 0.1 mm or more and smaller than 5 mm, to increase a reproduction band of a sound generated based on a single-body vibration of the plurality of vibration generating portions 550A to 550D and to increase a sound of a low-pitched sound band (for example, a sound pressure level characteristic in 500 Hz or less).

According to an aspect of the present disclosure, when the plurality of vibration generating portions 550A to 550D are arranged at the intervals D1 and D2 of smaller than 0.1 mm or without the intervals D1 and D2, the reliability of the vibration generating portions 550A to 550D or each of the first vibration generator 550 and the second vibration generator 570 may be reduced due to damage or a crack caused by a physical contact therebetween which occurs when each of the vibration generating portions 550A to 550D vibrates.

According to an aspect of the present disclosure, when the plurality of vibration generating portions 550A to 550D are arranged at the intervals D1 and D2 of 3 cm or more, the plurality of vibration generating portions 550A to 550D may not be driven as one vibration device due to an independent vibration of each of the plurality of vibration generating portions 550A to 550D. Therefore, a reproduction band and a sound pressure level characteristic of a sound which is generated based on vibrations of the plurality of vibration generating portions 550A to 550D may be reduced. For example, when the plurality of vibration generating portions 550A to 550D are arranged at the intervals D1 and D2 of 3 cm or more, a sound characteristic and a sound pressure level characteristic of the low-pitched sound band (for example, in 500 Hz or less) may each be reduced.

According to an aspect of the present disclosure, when the plurality of vibration generating portions 550A to 550D are arranged at an interval of 5 mm, each of the plurality of vibration generating portions 550A to 550D may not be perfectly driven as one vibration device, and thus, a sound characteristic and a sound pressure level characteristic of the low-pitched sound band (for example, in 200 Hz or less) may each be reduced.

According to another aspect of the present disclosure, when the plurality of vibration generating portions 550A to 550D are arranged at an interval of 1 mm, each of the plurality of vibration generating portions 550A to 550D may be driven as one vibration device, and thus, a reproduction band of a sound may increase and a sound of the low-pitched sound band (for example, a sound pressure level characteristic in 500 Hz or less) may increase. For example, when the plurality of vibration generating portions 550A to 550D are arranged at an interval of 1 mm, each of the first vibration generator 550 and the second vibration generator 570 may be implemented as a large-area vibrator which is enlarged based on optimization of a separation distance between the plurality of vibration generating portions 550A to 550D. Therefore, each of the first vibration generator 550 and the second vibration generator 570 may be driven as a large-area vibrator based on a single-body vibration of the plurality of vibration generating portions 550A to 550D, and thus, a sound characteristic and a sound pressure level characteristic may each increase or enhance in the low-pitched sound band and a reproduction band of a sound generated based on a large-area vibration of each of the first vibration generator 550 and the second vibration generator 570.

Therefore, to implement a single-body vibration (or one vibration device) of the plurality of vibration generating portions 550A to 550D, a separation distance between the plurality of vibration generating portions 550A to 550D may be adjusted to 0.1 mm or more and smaller than 3 cm. Also, to implement a single-body vibration (or one vibration device) of the plurality of vibration generating portions 550A to 550D and to increase a sound pressure level characteristic of a sound of the low-pitched sound band, the separation distance between the plurality of vibration generating portions 550A to 550D may be adjusted to 0.1 mm or more and smaller than 5 mm.

Each of the first vibration generator 550 and the second vibration generator 570 according to another aspect of the present disclosure may include first to fourth vibration generating portions 550A to 550D which are electrically disconnected (or separated) and/or structurally separated from one another and are disposed spaced apart from one another along each of the first direction X and the second direction Y. For example, the first to fourth vibration generating portions 550A to 550D may be arranged or tiled in 2×2 form.

According to an aspect of the present disclosure, the first and second vibration generating portions 550A and 550B may be spaced apart from each other along the first direction X. The third and fourth vibration generating portions 550C and 550D may be spaced apart from each other in the first direction X and may be spaced apart from each of the first and second vibration generating portions 550A and 550B along the second direction Y. The first and third vibration generating portions 550A and 550C may be spaced apart from each other along the second direction Y to face each other. The second and fourth vibration generating portions 550B and 550D may be spaced apart from each other along the second direction Y to face each other.

Each of the first to fourth vibration generating portions 550A to 550D according to an aspect of the present disclosure may include a piezoelectric vibration portion 553, a first electrode portion E1, and a second electrode portion E2.

The piezoelectric vibration portion 553 may include a ceramic-based material capable of realizing a relatively high vibration. For example, the piezoelectric vibration portion 553 may include a 1-3 composite structure having a piezoelectric characteristic of a 1-3 vibration mode or a 2-2 composite structure having a piezoelectric characteristic of a 2-2 vibration mode. For example, the piezoelectric vibration portion 553 may include the piezoelectric ceramic similar to the piezoelectric vibration portion 551 described above with reference to FIG. 21, or may include the first portions 553a and the second portion 553b similar to the piezoelectric vibration portion 553 described above with reference to any one of FIGS. 22 to 24, and thus, like reference numerals refer to like elements and their repetitive descriptions may be omitted.

According to an aspect, the piezoelectric vibration portion 551 may be formed of a transparent, semitransparent, or opaque piezoelectric material (or an electroactive material), and may be transparent, semitransparent, or opaque.

The first electrode portion E1 may be disposed at a first surface of the piezoelectric vibration portion 553 and may be electrically connected to the first surface of the piezoelectric vibration portion 553. For example, the first electrode portion E1 may be substantially the same as the first electrode portion E1 described above with reference to any one of FIGS. 21 to 24, and thus, like reference numerals refer to like elements and their repetitive descriptions may be omitted.

The second electrode portion E2 may be disposed at a second surface of the piezoelectric vibration portion 553, and may be electrically connected to the second surface of the piezoelectric vibration portion 553. For example, the second electrode portion E2 may be substantially the same as the second electrode portion E2 described above with reference to any one of FIGS. 21 to 24, and thus, like reference numerals refer to like elements and their repetitive descriptions may be omitted.

Each of the first vibration generator 550 and the second vibration generator 570 according to another aspect of the present disclosure may further include a first protection member 556 and a second protection member 557.

The first protection member 556 may be disposed on a first surface of each of the first vibration generator 550 and the second vibration generator 570. For example, the first protection member 556 may cover the first electrode portion E1 disposed on a first surface of each of the plurality of vibration generating portions 550A to 550D. Thus, the first protection member 556 may be connected to the first surface of each of the plurality of vibration generating portions 550A to 550D in common or may support the first surface of each of the plurality of vibration generating portions 550A to 550D in common. Accordingly, the first protection member 556 may protect the first surface of each of the plurality of vibration generating portions 550A to 550D or the first electrode portion E1.

The first protection member 556 according to an aspect of the present disclosure may be disposed at the first surface of each of the plurality of vibration generating portions 550A to 550D by the first adhesive layer 554. For example, the first protection member 556 may be directly disposed at the first surface of each of the plurality of vibration generating portions 550A to 550D by a film laminating process using the first adhesive layer 554. Accordingly, the plurality of vibration generating portions 550A to 550D may be integrated (or disposed) or tiled with the first protection member 556 to have the certain intervals D1 and D2.

The second protection member 557 may be disposed on a second surface of each of the first vibration generator 550 and the second vibration generator 570. For example, the second protection member 557 may cover the second electrode portion E2 disposed on a second surface of each of the plurality of vibration generating portions 550A to 550D. Thus, the second protection member 557 may be connected to the second surface of each of the plurality of vibration generating portions 550A to 550D in common or may support the second surface of each of the plurality of vibration generating portions 550A to 550D in common. Accordingly, the second protection member 557 may protect the second surface of each of the plurality of vibration generating portions 550A to 550D or the second electrode portion E2.

The second protection member 557 according to an aspect of the present disclosure may be disposed at the second surface of each of the plurality of vibration generating portions 550A to 550D by the second adhesive layer 555. For example, the second protection member 557 may be directly disposed at the second surface of each of the plurality of vibration generating portions 550A to 550D by a film laminating process by the second adhesive layer 555. Accordingly, the plurality of vibration generating portions 550A to 550D may be integrated (or disposed) or tiled with the second protection member 557 to have the certain intervals D1 and D2.

Each of the first protection member 556 and the second protection member 557 according to an aspect of the present disclosure may include a plastic material, a fiber material, or a wood material. Any one of the first protection member 556 and the second protection member 557 may be attached or coupled to the display panel by an adhesive member.

The first adhesive layer 554 may be disposed at the first surface of each of the plurality of vibration generating portions 550A to 550D, and between the plurality of vibration generating portions 550A to 550D. For example, the first adhesive layer 554 may be formed at a rear surface (or an inner surface) of the first protection member 556 facing the first surface of each of the first vibration generator 550 and the second vibration generator 570, disposed at the first surface of each of the plurality of vibration generating portions 550A to 550D, and filled between the plurality of vibration generating portions 550A to 550D.

The second adhesive layer 555 may be disposed at the second surface of each of the plurality of vibration generating portions 550A to 550D, and between the plurality of vibration generating portions 550A to 550D. For example, the second adhesive layer 555 may be formed at a front surface (or an inner surface) of the second protection member 557 facing the second surface of each of the first vibration generator 550 and the second vibration generator 570, disposed at the second surface of each of the plurality of vibration generating portions 550A to 550D, and filled between the plurality of vibration generating portions 550A to 550D.

The first and second adhesive layers 554 and 555 may be connected or coupled to each other between the plurality of vibration generating portions 550A to 550D. Therefore, each of the plurality of vibration generating portions 550A to 550D may be surrounded by the first and second adhesive layers 554 and 555. For example, the first and second adhesive layers 554 and 555 may entirely surround the whole plurality of vibration generating portions 550A to 550D. For example, the plurality of vibration generating portions 550A to 550D may be embedded between the first and second adhesive layers 554 and 555. For example, the first and second adhesive layers 554 and 555 may be referred to as a cover member, but aspects of the present disclosure are not limited thereto. When the first and second adhesive layers 554 and 555 are a cover member, the first protection member 556 may be disposed at a first surface of the cover member, and the second protection member 557 may be disposed at a second surface of the cover member.

Each of the first and second adhesive layers 554 and 555 according to an aspect of the present disclosure may include an electric insulating material which has adhesiveness and is capable of compression and decompression. For example, each of the first and second adhesive layers 554 and 555 may include an epoxy resin, an acryl resin, a silicone resin, or a urethane resin, but aspects of the present disclosure are not limited thereto. For example, each of the first and second adhesive layers 554 and 555 may be configured to be transparent, semitransparent, or opaque.

Each of the first vibration generator 550 and the second vibration generator 570 according to another aspect of the present disclosure may further include a first power supply line PL1 disposed at the first protection member 556, a second power supply line PL2 disposed at the second protection member 557, and a pad part 558 electrically connected to the first power supply line PL1 and the second power supply line PL2.

The first power supply line PL1 may be disposed at a rear surface of the first protection member 556 facing the first surface of each of the first vibration generator 550 and the second vibration generator 570. The first power supply line PL1 may be electrically connected to the first electrode portion E1 of each of the plurality of vibration generating portions 550A to 550D. For example, the first power supply line PL1 may be directly and electrically connected to the first electrode portion E1 of each of the plurality of vibration generating portions 550A to 550D. For example, the first power supply line PL1 may be electrically connected to the first electrode portion E1 of each of the plurality of vibration generating portions 550A to 550D by an anisotropic conductive film. As another example of the present disclosure, the first power supply line PL1 may be electrically connected to the first electrode portion E1 of each of the plurality of vibration generating portions 550A to 550D by a conductive material (or particle) included in the first adhesive layer 554.

The first power supply line PL1 according to an aspect of the present disclosure may include first and second upper power lines PL11 and PL12 disposed along a second direction Y. For example, the first upper power line PL11 may be electrically connected to the first electrode portion E1 of each of the first and third vibration generating portions 550A and 550C (or a first group or a first array group) arranged at a first column parallel to the second direction Y among the plurality of vibration generating portions 550A to 550D. The second upper power line PL12 may be electrically connected to the first electrode portion E1 of each of the second and fourth vibration generating portions 550B and 550D (or a second group or a second array group) arranged at a second column parallel to the second direction Y among the plurality of vibration generating portions 550A to 550D.

The second power supply line PL2 may be disposed at a front surface of the second protection member 557 facing the second surface of each of the first vibration generator 550 and the second vibration generator 570. The second power supply line PL2 may be electrically connected to the second electrode portion E2 of each of the plurality of vibration generating portions 550A to 550D. For example, the second power supply line PL2 may be directly and electrically connected to the second electrode portion E2 of each of the plurality of vibration generating portions 550A to 550D. For example, the second power supply line PL2 may be electrically connected to the second electrode portion E2 of each of the plurality of vibration generating portions 550A to 550D by an anisotropic conductive film. As another example, the second power supply line PL2 may be electrically connected to the second electrode portion E2 of each of the plurality of vibration generating portions 550A to 550D by a conductive material (or particle) included in the second adhesive layer 555.

The second power supply line PL2 according to an aspect of the present disclosure may include first and second lower power lines PL21 and PL22 disposed along a second direction Y. For example, the first lower power line PL21 may be electrically connected to the second electrode portion E2 of each of the first and third vibration generating portions 550A and 550C (or a first group or a first array group) arranged at the first column parallel to the second direction Y among the plurality of vibration generating portions 550A to 550D. The second lower power line PL22 may be electrically connected to the second electrode portion E2 of each of the second and fourth vibration generating portions 550B and 550D (or a second group or a second array group) arranged at the second column parallel to the second direction Y among the plurality of vibration generating portions 550A to 550D.

The pad part 558 may be disposed at each of the first vibration generator 550 and the second vibration generator 570 to be electrically connected to one portion (or one end or one side) of at least one or more among the first power supply line PL1 and the second power supply line PL2. The pad part 558 according to an aspect of the present disclosure may include a first pad electrode electrically connected to one portion of the first power supply line PL1 and a second pad electrode electrically connected to one portion of the second power supply line PL2.

The first pad electrode may be connected to one portion of each of the first and second upper power lines PL11 and PL12 of the first power supply line PL1. For example, the one portion of each of the first and second upper power lines PL11 and PL12 may branch from the first pad electrode.

The second pad electrode may be connected to one portion of each of the first and second lower power lines PL21 and PL22 of the second power supply line PL2. For example, the one portion of each of the first and second lower power lines PL21 and PL22 may branch from the second pad electrode.

According to an aspect of the present disclosure, each of the first power supply line PL1, the second power supply line PL2, and the pad part 558 may be configured to be a transparent conductive material, a semitransparent conductive material, or an opaque conductive material to be transparent, translucent, or opaque.

Each of the first vibration generator 550 and the second vibration generator 570 according to another aspect of the present disclosure may further include a flexible cable 559.

The flexible cable 559 may be electrically connected to the pad part 558 disposed at each of the first vibration generator 550 and the second vibration generator 570 and may supply each of the first vibration generator 550 and the second vibration generator 570 with one or more vibration driving signals (or a sound signal) provided from a sound processing circuit. The flexible cable 559 according to an aspect of the present disclosure may include a first terminal electrically connected to the first pad electrode of the pad part 558 and a second terminal electrically connected to the second pad electrode of the pad part 558. For example, the flexible cable 559 may be a flexible printed circuit cable or a flexible flat cable, but aspects of the present disclosure are not limited thereto.

The sound processing circuit may generate an alternating current (AC) vibration driving signal including a first vibration driving signal and a second vibration driving signal based on a sound source. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode portion E1 of each of the plurality of vibration generating portions 550A to 550D through a first terminal of the flexible cable 559, the first pad electrode of the pad part 558, and the first power supply line PL1. The second vibration driving signal may be supplied to the second electrode portion E2 of each of the plurality of vibration generating portions 550A to 550D through a second terminal of the flexible cable 559, the second pad electrode of the pad part 558, and the second power supply line PL2.

According to an aspect of the present disclosure, the flexible cable 559 may be configured to be transparent, translucent, or opaque.

Therefore, each of the first vibration generator 550 and the second vibration generator 570 according to an aspect of the present disclosure may include the plurality of vibration generating portions 550A to 550D which are arranged (or tiled) at a certain interval D1 and D2 to be implemented as a single vibrator without being independently driven, and thus, may be driven as a large-area vibrator based on a single-body vibration of the plurality of vibration generating portions 550A to 550D. Accordingly, a large area of display panel may vibrate or vibrate by itself in a large-area, thereby increasing or enhancing a sound characteristic and a sound pressure level characteristic in the low-pitched sound band and a reproduction band of a sound output from the display panel.

Figure 27:
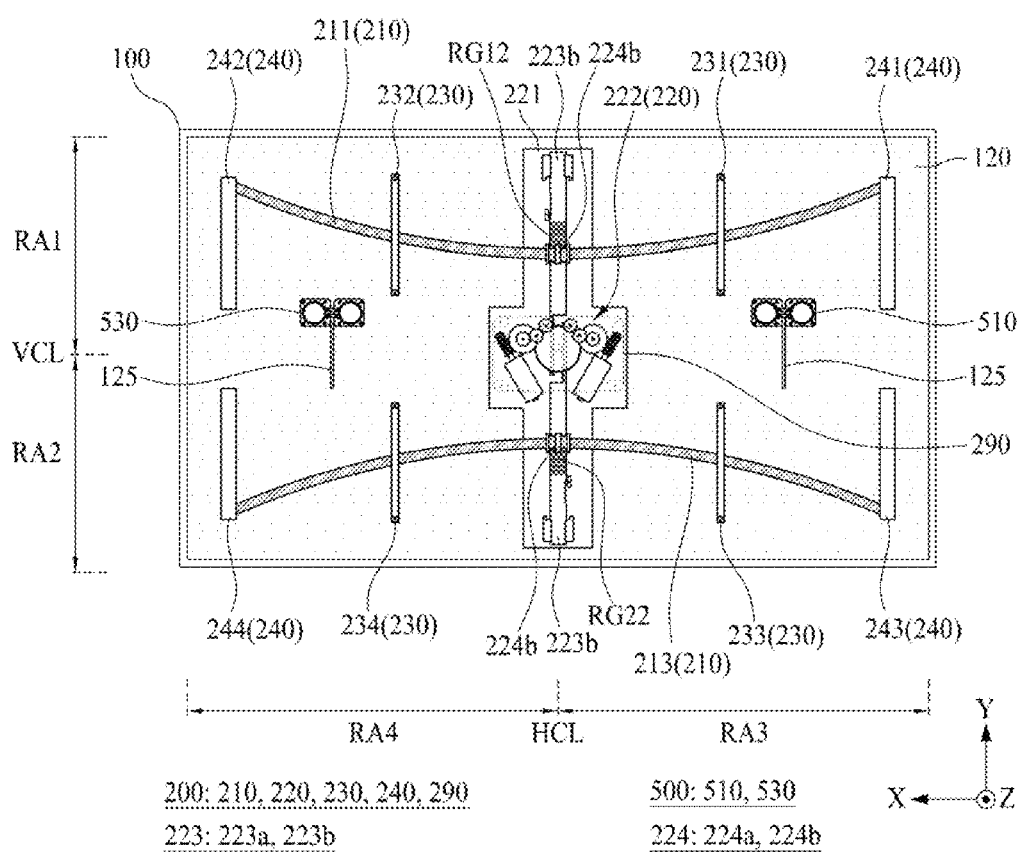
FIG. 27 is a diagram for describing a modification aspect of a curvature variation device in a display apparatus according to an aspect of the present disclosure.

FIG. 27 is a diagram for describing a modification aspect of a curvature variation device in a display apparatus according to an aspect of the present disclosure and illustrates an example which is implemented by modifying the arc member and the rectilinear driver illustrated in each of FIGS. 4 to 6, 14, and 15. In the following description, in elements other than an arc member and a rectilinear driver, like reference numerals refer to like elements, and their repeated descriptions are omitted or will be briefly given.

With reference to FIG. 27, in a curvature variation device 200 according to a modification aspect of the present disclosure, an arc member 210 may include a first arc member 211 and a second arc member 213.

The first arc member 211 may be disposed in a first rear region RA1 of a display device 100 parallel to a first direction X. The first arc member 211 may have a curved shape. The first arc member 211 may have a curved shape which is convex toward a center portion of a rear surface of the display device 100. A center portion (or a length center portion) of the first arc member 211 may be adjacent to the center portion of the rear surface of the display device 100, and both ends (or both side portions) of the first arc member 211 may be adjacent to left and right upper corner portions, where each of a first short side and a second short side is connected to a first long side, of the display device 100. For example, one end (or a first end) of the first arc member 211 may be adjacent to the right upper corner portion of the display device 100, and the other end (or a second end) of the first arc member 211 may be adjacent to the left upper corner portion of the display device 100.

The second arc member 213 may be disposed in a second rear region RA2 of the display device 100 parallel to the first direction X. The second arc member 213 may have a curved shape. The second arc member 213 may have a curved shape which is convex toward the center portion of the rear surface of the display device 100. A center portion (or a length center portion) of the second arc member 213 may be adjacent to the center portion of the rear surface of the display device 100, and both ends (or both side portions) of the second arc member 213 may be adjacent to left and right lower corner portions, where each of the first short side and the second short side is connected to a second long side, of the display device 100. For example, one end (or a first end) of the second arc member 213 may be adjacent to the right lower corner portion of the display device 100, and the other end (or a second end) of the second arc member 213 may be adjacent to the left lower corner portion of the display device 100.

The first arc member 211 and the second arc member 213 may be symmetrically disposed on a rear surface of the display device 100 with a rear center region or a vertical center line VCL of the display device 100 therebetween. Here, the vertical center line VCL of the display device 100 may be disposed on a center portion of a short-side length (or a lengthwise length) of the display device 100.

A rectilinear driver 223 may be disposed on a supporting plate 221 and may perform a rectilinear motion based on a rotational motion of the rotation driver 222 to rotate a rotation link part 224. The rectilinear driver 223 according to an aspect of the present disclosure may include a first rack gear part 223a and a second rack gear part 223b.

The first rack gear part 223a, as described above, may include a first rack gear bar, a $1\text{-}1^{th}$ rack gear, and a $1\text{-}2^{th}$ rack gear RG12. Except for that the $1\text{-}2^{th}$ rack gear RG12 is provided at a center portion of the first rack gear bar to overlap a center portion of the first arc member 211 at the other (or upper) periphery portion of the first rack gear bar, the first rack gear part 223a may be the same as the above-described first rack gear part 223a, and thus, their repetitive descriptions may be omitted.

The second rack gear part 223b, as described above, may include a second rack gear bar, a $2\text{-}1^{th}$ rack gear, and a $2\text{-}2^{th}$ rack gear RG22. Except for that the $2\text{-}2^{th}$ rack gear RG22 is provided at a center portion of the second rack gear bar to overlap a center portion of the second arc member 213 at the other (or upper) periphery portion of the second rack gear bar, the second rack gear part 223b may be the same as the above-described second rack gear part 223b, and thus, thus, their repetitive descriptions may be omitted.

The rotation link part 224 may perform a rotational motion based on a rectilinear motion of the rectilinear driver 223 to rotate the arc member 210. The rotation link part 224 may be rotatably fixed to a center portion of the arc member 210 and may perform a rotational motion based on a rectilinear motion of the rectilinear driver 223 to rotate the arc member 210.

The rotation link part 224 according to an aspect of the present disclosure may include a first rotation link gear 224a and a second rotation link gear 224b.

The first rotation link gear 224a may be fixed to a center portion of the first arc member 211 of the arc member 210 and may perform a rotational motion based on a rectilinear motion of the first rack gear part 223a of the rectilinear driver 223 to rotate the first arc member 211.

The second rotation link gear 224b may be fixed to a center portion of the second arc member 213 of the arc member 210 and may perform a rotational motion based on a rectilinear motion of the second rack gear part 223b of the rectilinear driver 223 to rotate the second arc member 213.

In the display apparatus including the curvature variation device 200 according to a modification example of the present disclosure, each of the first arc member 211 and the second arc member 213 may have a curved shape which is convex toward a center portion of a rear surface of the display device 100, and thus, a space corresponding to a center region of a first rear region RA1 of the display device 100 may be secured, whereby an assembly process such as a cable connection between the display device 100 and a system board may be easily performed in the first rear region RA1 of the display device 100.

Optionally, the curvature variation device 200 illustrated in FIG. 27 may be identically applied to the curvature variation device 200 of the display apparatus according to another aspect of the present disclosure illustrated in FIGS. 17 to 19, and thus, its repeated description is omitted. For example, the arc member 210, the rectilinear driver 223, and the rotation link part 224 of the curvature variation device 200 illustrated in FIG. 17 or 19 may be respectively changed to the arc member 210, the rectilinear driver 223, and the rotation link part 224 of the curvature variation device 200 illustrated in FIG. 27.

In the curvature variation device 200 according to an aspect of the present disclosure, an arrangement structure of each of the first arc member 211 and the second arc member 213 of the arc member 210 is not limited to an arrangement structure illustrated in each of FIGS. 6 and 27. For example, the arc member 210 may include the first arc member 211 illustrated in FIG. 6 and the second arc member 213 illustrated in FIG. 27. As another example, the arc member 210 may include the first arc member 211 illustrated in FIG. 27 and the second arc member 213 illustrated in FIG. 6.

A display apparatus according to the present disclosure will be described below.

A display apparatus according to an aspect of the present disclosure may include a display device including a display panel configured to display an image and a back cover disposed at a rear surface of the display panel, and a curvature variation device disposed at the back cover to vary a curvature of the display device. The curvature variation device may include an arc member disposed at a rear region of the display device parallel to a first direction, a supporting plate disposed at the rear region of the display device, a rotation driver disposed at the supporting plate, a rectilinear driver disposed on the supporting plate to perform a rectilinear motion in a second direction intersecting with the first direction based on a rotation of the rotation driver, a rotation link part coupled to a center portion of the arc member on the supporting plate to perform a rotational motion based on a rectilinear motion of the rectilinear driver to rotate the center portion of the arc member, and a holder part rotatably supporting the center portion of the arc member on the supporting plate.

According to some aspects of the present disclosure, the arc member may include a first arc member and a second arc member respectively disposed at a first rear region and a second rear region of the display device parallel to the first direction, and the rotation link part may include a first rotation link gear coupled to a center portion of the first arc member on the supporting plate to perform a rotational motion based on the rectilinear motion of the rectilinear driver to rotate the first arc member, and a second rotation link gear coupled to a center portion of the second arc member on the supporting plate to perform a rotational motion based on the rectilinear motion of the rectilinear driver to rotate the second arc member.

According to some aspects of the present disclosure, a display apparatus may include a display device, and a curvature variation device disposed on a rear surface of the display device to vary a curvature of the display device. The display device may include a display panel configured to display an image, a back cover disposed on the rear surface of the display panel to support the curvature variation device, and a groove portion formed to be concave from the back cover overlapping the curvature variation device and to accommodate the curvature variation device.

According to some aspects of the present disclosure, the display apparatus may further include an intermediate member disposed between the groove portion of the back cover and the rear surface of the display panel overlapping the curvature variation device.

According to some aspects of the present disclosure, the curvature variation device may include an arc member disposed at a rear region of the display device parallel to a first direction, a supporting plate accommodated into the groove portion of the back cover, a rotation driver disposed at the supporting plate, a rectilinear driver disposed on the supporting plate to perform a rectilinear motion in a second direction intersecting with the first direction based on a rotation of the rotation driver, a rotation link part coupled to a center portion of the arc member on the supporting plate to perform a rotational motion based on a rectilinear motion of the rectilinear driver to rotate the center portion of the arc member, and a holder part rotatably supporting the center portion of the arc member on the supporting plate.

According to some aspects of the present disclosure, the arc member may include a first arc member and a second arc member respectively disposed in a first rear region and a second rear region of the display device parallel to the first direction, and the rotation link part may include a first rotation link gear coupled to a center portion of the first arc member on the supporting plate to perform a rotational motion based on the rectilinear motion of the rectilinear driver to rotate the first arc member, and a second rotation link gear coupled to a center portion of the second arc member on the supporting plate to perform a rotational motion based on the rectilinear motion of the rectilinear driver to rotate the second arc member.

According to some aspects of the present disclosure, the first arc member and the second arc member each may be configured to have a curved shape and rotate in directions opposite to each other based on a rotation of the rotation link part.

According to some aspects of the present disclosure, each of the first arc member and the second arc member may be configured to have a curved shape, each of a center portion of the first arc member and a center portion of the second arc member may be configured to be disposed at a center portion of a rear region of the display device, each of one end of the first arc member and one end of the second arc member may be configured to be disposed at a first rear periphery portion of the display device, and each of the other end of the first arc member and the other end of the second arc member may be configured to be disposed at a second rear periphery portion of the display device.

According to some aspects of the present disclosure, the curvature variation device may further include a fixing bracket movably supporting the one end and the other end of the first arc member and the one end and the other end of the second arc member, and the fixing bracket may be configured to be disposed at the first rear periphery portion and the second rear periphery portion of the display device.

According to some aspects of the present disclosure, the curvature variation device may further include a first fixing bracket disposed at the first rear periphery portion of the display device to movably support the one end of the first arc member, a second fixing bracket disposed at the second rear periphery portion of the display device to movably support the other end of the first arc member, a third fixing bracket disposed at the first rear periphery portion of the display device to movably support the one end of the second arc member, and a fourth fixing bracket disposed at the second rear periphery portion of the display device to movably support the other end of the second arc member.

According to some aspects of the present disclosure, the curvature variation device may further include a guider disposed at the rear region of the display device to movably support each of the first arc member and the second arc member, and the guider may movably support a portion between the one end and the center portion of the first arc member, a portion between the other end and the center portion of the first arc member, a portion between the one end and the center portion of the second arc member, and a portion between the other end and the center portion of the second arc member.

According to some aspects of the present disclosure, the rectilinear driver may include a first rack gear part performing a rectilinear motion in the second direction based on a rotational motion of the rotation driver to rotate the first rotation link gear, and a second rack gear part performing a rectilinear motion in a direction opposite to the first rack gear part along the second direction based on the rotational motion of the rotation driver to rotate the second rotation link gear.

According to some aspects of the present disclosure, the first rack gear part may include a first rack gear bar disposed at the supporting plate to slide in the second direction, a $1$-$1^{th}$ rack gear connected to the rotation driver at one side of the first rack gear bar, and a $1$-$2^{th}$ rack gear connected to the first rotation link gear at the other side of the first rack gear bar, and the second rack gear part may include a second rack gear bar disposed on the supporting plate to slide in the second direction, a $2$-$1^{th}$ rack gear connected to the rotation driver at the other side of the second rack gear bar, and a $2$-$2^{th}$ rack gear connected to the second rotation link gear at one side of the second rack gear bar.

According to some aspects of the present disclosure, the rotation driver may include at least one rotary motor, a pinion gear allowing the rectilinear driver to perform a rectilinear motion, and a rotation transfer part connected between the rotary motor and the pinion gear.

According to some aspects of the present disclosure, the curvature variation device may further include a fixing bracket movably supporting each of the one end and the other end of the first arc member and the one end and the other end of the second arc member, the fixing bracket may be configured to be disposed at the first rear periphery portion and the second rear periphery portion of the display device, and the groove portion may include a first groove formed to be concave from the back cover overlapping the supporting plate and to accommodate the supporting plate, and a second groove formed to be concave from the back cover overlapping the fixing bracket and to accommodate the fixing bracket.

According to some aspects of the present disclosure, the display apparatus may further include a vibration device disposed at the display device to vibrate the display panel so that a sound is output based on a vibration of the display panel.

According to some aspects of the present disclosure, the vibration device may include a bobbin and a coil wound around the bobbin, and the bobbin may pass through the back cover and be configured to be connected to a rear surface of the display panel.

According to some aspects of the present disclosure, the vibration device may include a pair of sound generating devices coupled to the back cover to vibrate the display panel, and the back cover may include a slit disposed between the pair of sound generating devices.

According to some aspects of the present disclosure, the vibration device may be configured to be disposed between the display panel and the back cover.

According to some aspects of the present disclosure, the vibration device may include a piezoelectric vibration portion having a piezoelectric characteristic, a first electrode portion disposed on a first surface of the piezoelectric vibration portion, and a second electrode portion disposed on a second surface, which is opposite to the first surface, of the piezoelectric vibration portion.

According to some aspects of the present disclosure, the vibration device may include a piezoelectric vibration portion including a plurality of inorganic material portions having a piezoelectric characteristic and an organic material portion between the plurality of inorganic material portions, a first electrode portion disposed on a first surface of the piezoelectric vibration portion, and a second electrode portion disposed on a second surface, which is opposite to the first surface, of the piezoelectric vibration portion.

According to some aspects of the present disclosure, the display panel may include a first vibration region and a second vibration region, and the vibration device may include a first vibration generator disposed at the first vibration region of the display panel including a piezoelectric vibration portion, and a second vibration generator disposed at the second vibration region of the display panel including a piezoelectric vibration portion.

According to some aspects of the present disclosure, the piezoelectric vibration portion of each of the first vibration generator and the second vibration generator may include a plurality of vibration generating portions, and each of the plurality of vibration generating portions may be configured to be arranged spaced apart from one another by a certain interval along the first direction and the second direction, on the same plane.

According to some aspects of the present disclosure, each of the plurality of vibration generating portions may include a plurality of inorganic material portions having a piezoelectric characteristic, an organic material portion connected between the plurality of inorganic material portions, a first electrode portion disposed on a first surface of each of the plurality of inorganic material portions and the organic material portion, and a second electrode portion disposed on a second surface, which is opposite to the first surface, of each of the plurality of inorganic material portions and the organic material portion.

According to some aspects of the present disclosure, the display apparatus may further include a vibration device disposed at the display device to vibrate the display panel so that a sound is output based on a vibration of the display panel, the display panel may include a first vibration region and a second vibration region divided by the groove portion and the intermediate member, and the vibration device may include a first vibration device coupled to the back cover to vibrate the first vibration region of the display panel, and a second vibration device coupled to the back cover to vibrate the second vibration region of the display panel.

According to some aspects of the present disclosure, the display apparatus may further include a rear curtain device disposed on a rear surface of the display device to cover the curvature variation device, and a stand passing through the rear curtain device and supporting the curvature variation device.

According to some aspects of the present disclosure, the stand may include at least one of a speaker device, a power supply board supplying power to each of the display device and the curvature variation device, and a system board controlling each of the display device and the curvature variation device.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:
 a display device having a display panel configured to display an image;
 a curvature variation device having a plurality of fixing bracket movably supporting an arc member disposed at a rear region of the display device; and
 a sound generating device disposed on the display panel to vibrate the display panel and disposed between the plurality of fixing bracket.

2. The display apparatus of claim 1, wherein the arc member comprises a first arc member and a second arc member respectively disposed at a first rear region and a second rear region of the display device.

3. The display apparatus of claim 2, wherein the first arc member and the second arc member are configured to be symmetrical with each other with respect to a rear center region of the display device.

4. The display apparatus of claim 3, wherein the first arc member and the second arc member respectively have a curved shape curved in opposite directions.

5. The display apparatus of claim 1, wherein the plurality of fixing bracket is movably supported the one end and the another end of the arc member.

6. The display apparatus of claim 1, wherein the plurality of fixing bracket is disposed at a first rear periphery portion and a second rear periphery portion of the display device.

7. The display apparatus of claim 1, further comprising a back cover disposed at a rear surface of the display panel and supporting the curvature variation device.

8. The display apparatus of claim 7, further comprising a groove portion formed to be concave from the back cover overlapping with the curvature variation device and accommodating the curvature variation device.

9. The display apparatus of claim 7, wherein the sound generating device comprises a bobbin and a coil wound around the bobbin, and
 wherein the bobbin passes through the back cover and is connected to the rear surface of the display panel.

10. The display apparatus of claim 7, wherein the back cover comprises a slit overlapping the sound generating device.

11. The display apparatus of claim 7, wherein the sound generating device is disposed between the display panel and the back cover.

12. The display apparatus of claim 1, wherein the sound generating device comprises:
 a piezoelectric vibration portion having a piezoelectric characteristic;
 a first electrode portion disposed on a first surface of the piezoelectric vibration portion; and
 a second electrode portion disposed on a second surface, which is opposite to the first surface, of the piezoelectric vibration portion.

13. The display apparatus of claim 1, wherein the sound generating device comprises:
 a piezoelectric vibration portion including a plurality of inorganic material portions having a piezoelectric characteristic and an organic material portion between the plurality of inorganic material portions;
 a first electrode portion disposed on a first surface of the piezoelectric vibration portion; and
 a second electrode portion disposed on a second surface, which is opposite to the first surface, of the piezoelectric vibration portion.

14. The display apparatus of claim 7, wherein the sound generating device comprises a pair of sound generating devices coupled to the back cover to vibrate the display panel, and
 wherein the back cover comprises a slit disposed between the pair of sound generating devices.

15. The display apparatus of claim 7, wherein the display panel comprises a first vibration region and a second vibration region divided by an intermediate member.

16. The display apparatus of claim 15, wherein the sound generating device comprises:
 a first sound generating device vibrating the first vibration region of the display panel; and
 a second sound generating device vibrating the second vibration region of the display panel.

17. The display apparatus of claim 16, wherein the display panel further comprising a groove portion formed to be concave from the back cover overlapping with the curvature variation device and accommodating the curvature variation device.

18. The display apparatus of claim 17, wherein the intermediate member is disposed between the groove portion and the display panel.

* * * * *